US009298857B2

(12) United States Patent
Mineno

(10) Patent No.: US 9,298,857 B2
(45) Date of Patent: Mar. 29, 2016

(54) INFORMATION INTEGRATING APPARATUS, METHOD, AND COMPUTER PRODUCT

(71) Applicant: FUJITSU LIMITED, Kawasaki-shi, Kanagawa (JP)

(72) Inventor: Kazuo Mineno, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 13/672,180

(22) Filed: Nov. 8, 2012

(65) Prior Publication Data

US 2013/0066892 A1 Mar. 14, 2013

Related U.S. Application Data

(63) Continuation of application No. 12/828,707, filed on Jul. 1, 2010, now abandoned.

(30) Foreign Application Priority Data

Jul. 2, 2009 (JP) .................................. 2009-158301

(51) Int. Cl.
*G06F 17/30* (2006.01)
*G06F 17/50* (2006.01)

(52) U.S. Cl.
CPC .......... *G06F 17/50* (2013.01); *G06F 17/30412* (2013.01); *G06F 17/30489* (2013.01); *G06F 17/30563* (2013.01); *G06F 17/30566* (2013.01); *G06F 2217/06* (2013.01)

(58) Field of Classification Search
CPC .................... G06F 17/30477; G06F 17/30427; G06F 17/30604; G06F 17/30557; G06F 17/3056; G06F 17/30563; G06F 17/30566; G06F 17/30634; G06F 17/30864; G06F 17/3066; G06F 17/30545; G06F 17/30424; G06F 17/30389; G06F 17/30522; G06F 17/30964; G06F 17/30386; G06F 17/30926; G06F 17/30395; G06F 17/30412; G06F 17/30539; G06F 17/30607; G06F 9/5066
USPC ................................................ 707/705–780
See application file for complete search history.

(56) References Cited

U.S. PATENT DOCUMENTS 6,014,670 A    1/2000   Zamanian et al.
6,339,775 B1   1/2002   Zamanian et al.

(Continued)

FOREIGN PATENT DOCUMENTS

JP    2001-101065    4/2001
WO   2007/083371    7/2007

OTHER PUBLICATIONS

Kitagawa, H., *Stream Data Management Based on Integration of a Stream Processing Engine and Databases*, 2007 IFIP International Conference on Network and Parallel Computing—Workshops, pp. 18-22.

(Continued)

*Primary Examiner* — Michelle Owyang
(74) *Attorney, Agent, or Firm* — Staas & Halsey LLP

(57) ABSTRACT

A processing system that implements physical integration, virtual integration, and stream integration by defining meta-information correlating a physical model on an information source side and a logical model on a user-side and by selectively executing push-type information integration of returning to the user-side, an integration result according to information input from the information source side and pull-type information integration of returning to the user-side, an integration result according a query from the user-side.

15 Claims, 92 Drawing Sheets

(56) References Cited

U.S. PATENT DOCUMENTS

| | | | |
|---|---|---|---|
| 6,694,306 | B1 | 2/2004 | Nishizawa et al. |
| 7,293,010 | B2 | 11/2007 | Angele et al. |
| 7,693,900 | B2 | 4/2010 | Wilmering et al. |
| 7,836,078 | B2* | 11/2010 | Dettinger et al. ............ 707/783 |
| 7,840,607 | B2* | 11/2010 | Henigman et al. ........... 707/803 |
| 8,392,402 | B2* | 3/2013 | Mihaila et al. ............... 707/718 |
| 2004/0039730 | A1 | 2/2004 | Saeki |
| 2004/0225763 | A1* | 11/2004 | Carroll et al. .................. 710/36 |
| 2004/0254924 | A1* | 12/2004 | Dettinger ......... G06F 17/30395 |
| 2005/0160076 | A1 | 7/2005 | Kanemasa |
| 2006/0136428 | A1* | 6/2006 | Syeda-Mahmood G06F 17/30286 |
| 2006/0259458 | A1* | 11/2006 | Hunter et al. .................... 707/2 |
| 2006/0282470 | A1* | 12/2006 | Yu et al. ........................ 707/200 |
| 2007/0203893 | A1* | 8/2007 | Krinsky et al. .................. 707/3 |
| 2008/0249981 | A1 | 10/2008 | Norring et al. |
| 2008/0281849 | A1* | 11/2008 | Mineno ......................... 707/101 |
| 2010/0070500 | A1 | 3/2010 | Cui et al. |
| 2010/0125574 | A1* | 5/2010 | Navas ........................... 707/722 |
| 2010/0287185 | A1* | 11/2010 | Cras et al. ..................... 707/769 |
| 2012/0209869 | A1* | 8/2012 | Kulack et al. ................. 707/763 |

OTHER PUBLICATIONS

Dan, Liu, et al. "Study on Information Integration of Condition Monitoring and Fault Diagnosis System in Manufacturing", 2006, Internal Federation for Information Processing, vol. 205, pp. 499. 506.

U.S. Office Action mailed May 8, 2012 in parent U.S. Appl. No. 12/828,707.

U.S. Appl. No. 12/828,707, filed May 8, 2012, Kazuo Mineno, Fujitsu Limited, Kawasaki-shi, Japan.

Japanese Notice of Rejection mailed Jun. 4, 2013 in Japanese Application No. 2009-158301. (note mailing date on translation incorrectly states 2012).

* cited by examiner

FIG.13

| |  |
|---|---|
| <META-DATA> | |
| PHYSICAL MODEL PA | ~1301 |
| PHYSICAL MODEL PB | ~1302 |
| PHYSICAL MODEL PD | ~1303 |
| PHYSICAL MODEL PT | ~1304 |
| PHYSICAL MODEL PS | ~1305 |
| LOGICAL MODEL LC AND MAPPING DEFINITION MD(C) | ~1306 |
| LOGICAL MODEL LE AND MAPPING DEFINITION MD(E) | ~1307 |
| LOGICAL MODEL LN AND MAPPING DEFINITION MD(N) | ~1308 |
| </META-DATA> | |

FIG.14

```
<R_MODEL name="TABLE_A">
 <COLUMN name="EMPLOYEE_NUMBER" keytype="MKey">
  <D_TYPE>Integer</D_TYPE>
 </COLUMN>
 <COLUMN name="EMPLOYEE_NAME">
  <D_TYPE>String</D_TYPE>
  <D_ATTR name="CherCode">S_JIS</D_ATTR>
 </COLUMN>
 <COLUMN name="PHONE_NUMBER">
  <D_TYPE>String</D_TYPE>
 </COLUMN>
</R_MODEL>
```
~1301

FIG.15

```
<R_MODEL name="TABLE_B">
 <COLUMN name="EMPLOYEE_NUMBER" keytype="MKey">
  <D_TYPE>Integer</D_TYPE>
 </COLUMN>
 <COLUMN name="DEPARTMENT" keytype="SKey">
  <D_TYPE>Integer</D_TYPE>
 </COLUMN>
</R_MODEL>
```
— 1302

FIG.16

```
<R_MODEL name="TABLE_D">
 <COLUMN name="DEPARTMENT" keytype="MKey">
  <D_TYPE>Integer</D_TYPE>
 </COLUMN>
 <COLUMN name="NAME">
  <D_TYPE>String</D_TYPE>
  <D_ATTR name="CharCode">JEF</D_ATTR>
 </COLUMN>
</R_MODEL>
```
— 1303

FIG.17

```
<R_MODEL name="TABLE_T">
 <COLUMN name="EXTENSION" keytype="MKey">
  <D_TYPE>Integer</D_TYPE>
 </COLUMN>
 <COLUMN name="DEPARTMENT" keytype="SKey">
  <D_TYPE>Integer</D_TYPE>
 </COLUMN>
</R_MODEL>
```
~1304

FIG.18

```
<R_MODEL name="TABLE_S">
 <COLUMN name="DT" keytype="MKey">
  <D_TYPE>String</D_TYPE>
 </COLUMN>
 <COLUMN name="FROM" keytype="SKey">
  <D_TYPE>Integer</D_TYPE>
 </COLUMN>
 <COLUMN name="TO" keytype="SKey">
  <D_TYPE>Integer</D_TYPE>
 </COLUMN>
</R_MODEL>
```
~1305

FIG.20

```
1307 ─┐
       <V_MODEL name="TABLE_E">
         <COLUMN name="EMPLOYEE_NUMBER" keytype="MKey">
           <D_TYPE>Integer</D_TYPE>
         </COLUMN>
         <COLUMN name="EMPLOYEE_NAME">
           <D_TYPE>String</D_TYPE>
           <D_ATTR name="CharCode">S_JIS</D_ATTR>
         </COLUMN>
         <COLUMN name="DEPARTMENT">
           <D_TYPE>String</D_TYPE>
           <D_ATTR name="CharCode">S_JIS</D_ATTR>
         </COLUMN>                                                                              ⎫
(1)      <MAP_RULE>                                                                             ⎪ LE
           <FROM_COLUMN table="TABLE_A">EMPLOYEE_NUMBER</FROM_COLUMN>                           ⎬
           <TO_COLUMN table="TABLE_E">EMPLOYEE_NUMBER</TO_COLUMN>  </MAP_RULE>                  ⎪
(4)      <MAP_RULE>                                                                             ⎭
           <FROM_COLUMN table="TABLE_A">EMPLOYEE_NAME</FROM_COLUMN>                             ⎫
           <TO_COLUMN table="TABLE_E">EMPLOYEE_NAME</TO_COLUMN>    </MAP_RULE>                  ⎪
(2)      <MAP_RULE>                                                                             ⎪
           <FROM_COLUMN table="TABLE_B">EMPLOYEE_NUMBER</FROM_COLUMN>                           ⎪
           <TO_COLUMN table="TABLE_E">EMPLOYEE_NUMBER</TO_COLUMN>  </MAP_RULE>                  ⎬ MD(E)
(3)      <MAP_RULE>                                                                             ⎪
           <FROM_COLUMN table="TABLE_B">DEPARTMENT</FROM_COLUMN>                                ⎪
           <TO_COLUMN table="TABLE_D">DEPARTMENT</TO_COLUMN>       </MAP_RULE>                  ⎪
(5)      <MAP_RULE>                                                                             ⎪
           <FROM_COLUMN table="TABLE_D">NAME</FROM_COLUMN>                                      ⎪
           <TO_COLUMN table="TABLE_E">DEPARTMENT</TO_COLUMN>       </MAP_RULE>                  ⎭
       </V_MODEL>
```

FIG.21

```
<V_MODEL name="TABLE_N">
  <COLUMN name="DT" keytype="MKey"> <D_TYPE>String</D_TYPE> </COLUMN>
  <COLUMN name="FROM">                <D_TYPE>Integer</D_TYPE> </COLUMN>
  <COLUMN name="FROM_NAME"> <D_TYPE>String</D_TYPE> <D_ATTR name="CharCode">S_JIS</D_ATTR>
  </COLUMN>
  <COLUMN name="TO">                  <D_TYPE>Integer</D_TYPE> </COLUMN>

(1) <MAP_RULE> <FROM_COLUMN table="TABLE_S">DT</FROM_COLUMN>
               <TO_COLUMN table="TABLE_N">DT</TO_COLUMN>                         </MAP_RULE>
(2) <MAP_RULE> <FROM_COLUMN table="TABLE_S">FROM</FROM_COLUMN>
               <TO_COLUMN table="TABLE_N">FROM</TO_COLUMN>                       </MAP_RULE>
(3) <MAP_RULE> <FROM_COLUMN table="TABLE_S">TO</FROM_COLUMN>
               <TO_COLUMN table="TABLE_N">TO</TO_COLUMN>                         </MAP_RULE>
(4) <MAP_RULE> <FROM_COLUMN table="TABLE_S">FROM</FROM_COLUMN>
               <TO_COLUMN table="TABLE_T">EXTENSION</TO_COLUMN>                  </MAP_RULE>
(5) <MAP_RULE> <FROM_COLUMN table="TABLE_T">DEPARTMENT</FROM_COLUMN>
               <TO_COLUMN table="TABLE_D">NAME</TO_COLUMN>                       </MAP_RULE>
(6) <MAP_RULE> <FROM_COLUMN table="TABLE_D">NAME</FROM_COLUMN>
               <TO_COLUMN table="TABLE_N">FROM_NAME</TO_COLUMN>                  </MAP_RULE>
</V_MODEL>
```

1308

LN = lines (1)–(4 header block)
MD(N) = MAP_RULE block (1)–(6)

FIG.22

| From_COLUMN CONSTRAINT (MKey) | 20 POINTS |
|---|---|
| From_COLUMN CONSTRAINT (SKey) | 10 POINTS |
| From_COLUMN CONSTRAINT (NONE) | 0 POINTS |
| To_COLUMN CONSTRAINT (MKey) | 2 POINTS |
| To_COLUMN CONSTRAINT (SKey) | 1 POINT |
| To_COLUMN CONSTRAINT (NONE) | 0 POINTS |

FIG.24

EVALUATION OF MAPPING DEFINITION (TABLE_E)  MD(E)

| | From_COLUMN | From_POINTS | To_COLUMN | To_POINTS | TOTAL |
|---|---|---|---|---|---|
| (1) | TABLE_A.EMPLOYEE_NUMBER | 20 | TABLE_E.EMPLOYEE_NUMBER | 2 | 22 |
| (2) | TABLE_B.EMPLOYEE_NUMBER | 20 | TABLE_E.EMPLOYEE_NUMBER | 2 | 22 |
| (3) | TABLE_B.DEPARTMENT | 10 | TABLE_D.DEPARTMENT | 2 | 12 |
| (4) | TABLE_A.EMPLOYEE_NAME | 0 | TABLE_E.EMPLOYEE_NAME | 0 | 0 |
| (5) | TABLE_D.NAME | 0 | TABLE_E.DEPARTMENT | 0 | 0 |

MAPPING DEFINITION (TABLE_E) SORT RESULTS  MD(E)

| | From_COLUMN | To_COLUMN |
|---|---|---|
| (1) | TABLE_A.EMPLOYEE_NUMBER | TABLE_E.EMPLOYEE_NUMBER |
| (2) | TABLE_B.EMPLOYEE_NUMBER | TABLE_E.EMPLOYEE_NUMBER |
| (3) | TABLE_B.DEPARTMENT | TABLE_D.DEPARTMENT |
| (4) | TABLE_A.EMPLOYEE_NAME | TABLE_E.EMPLOYEE_NAME |
| (5) | TABLE_D.NAME | TABLE_E.DEPARTMENT |

FIG.37

```
<ETL>
  <IN>
  Select * from TABLE_A
  </IN>
  <OUT>
  Select * from TABLE_E
  </OUT>
</ETL>
```
— 3700

FIG.38

```
<EII>
  Select * from TABLE_E Where EMPLOYEE_NUMBER=7002
</EII>
```
— 3800

FIG.39

```
<STREAM>
  <IN>
  <SQL> Select * from TABLE_S Where TO=24200 </SQL>
  <TIMING> 20:20 TO 20:22 </TIMING>
  </IN>
  <OUT>
  Select * from TABLE_N
  </OUT>
</STREAM>
```
— 3900

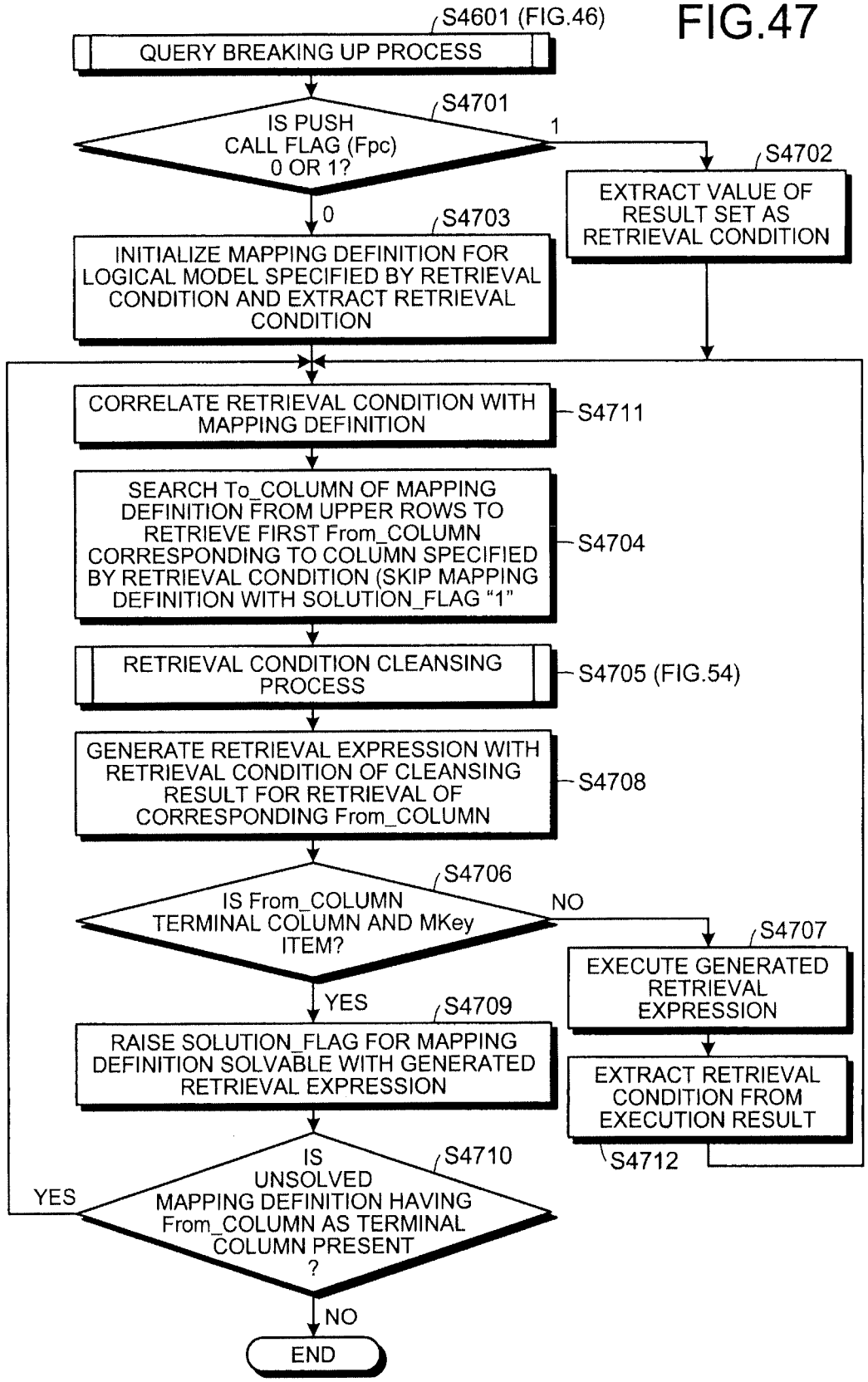

| EMPLOYEE_NUMBER | EMPLOYEE_NAME | DEPARTMENT |
|---|---|---|
| 7001 | ICHIRO TANAKA | |
| 7002 | JIRO SUZUKI | |
| 7003 | SABURO SATO | |

| | From_COLUMN | To_COLUMN | SOLUTION_FLAG |
|---|---|---|---|
| (1) | TABLE_A. EMPLOYEE_NUMBER | TABLE_E. EMPLOYEE_NUMBER | 1 |
| (2) | TABLE_B. EMPLOYEE_NUMBER | TABLE_E. EMPLOYEE_NUMBER | 0 |
| (3) | TABLE_B. DEPARTMENT | TABLE_D. DEPARTMENT | 0 |
| (4) | TABLE_A. EMPLOYEE_NAME | TABLE_E. EMPLOYEE_NAME | 1 |
| (5) | TABLE_D. NAME | TABLE_E. DEPARTMENT | 0 |

| | From_COLUMN | To_COLUMN | SOLUTION_FLAG |
|---|---|---|---|
| (1) | TABLE_A. EMPLOYEE_NUMBER | TABLE_E. EMPLOYEE_NUMBER | 0 |
| (2) | TABLE_B. EMPLOYEE_NUMBER | TABLE_E. EMPLOYEE_NUMBER | 0 |
| (3) | TABLE_B. DEPARTMENT | TABLE_D. DEPARTMENT | 0 |
| (4) | TABLE_A. EMPLOYEE_NAME | TABLE_E. EMPLOYEE_NAME | 0 |
| (5) | TABLE_D. NAME | TABLE_E. DEPARTMENT | 0 |

[GENERATED RETRIEVAL EXPRESSION]
· Select * From TABLE_A Where EMPLOYEE_NUMBER=7002
· Select * From TABLE_B Where EMPLOYEE_NUMBER=7002

FIG.63

MAPPING DEFINITION (TABLE_E)

| | From_COLUMN | To_COLUMN | SOLUTION_FLAG |
|---|---|---|---|
| (1) | TABLE_A. EMPLOYEE_NUMBER | TABLE_E. EMPLOYEE_NUMBER | 1 |
| ➡ (2) | TABLE_B. EMPLOYEE_NUMBER | TABLE_E. EMPLOYEE_NUMBER | <u>1</u> |
| ➡ (3) | TABLE_B. DEPARTMENT | TABLE_D. DEPARTMENT | <u>1</u> |
| (4) | TABLE_A. EMPLOYEE_NAME | TABLE_E. EMPLOYEE_NAME | 1 |
| (5) | TABLE_D. NAME | TABLE_E. DEPARTMENT | 0 |
| (6) | TABLE_D. NAME | TABLE_D. DEPARTMENT | 0 |

[INTEGRATION RESULT SET E]

| EMPLOYEE_NUMBER | EMPLOYEE_NAME | DEPARTMENT |
|---|---|---|
| 7001 | ICHIRO TANAKA | SALES DEPARTMET |
| 7002 | JIRO SUZUKI | MANUFACTURING DEPARTMENT |
| 7003 | SABURO SATO | SALES DEPARTMET |

FIG.67

MAPPING DEFINITION (TABLE_E) SORT RESULTS       MD(E)

|     | From_COLUMN | To_COLUMN | SOLUTION_FLAG |
|-----|---|---|---|
| ➡ (1) | TABLE_A. EMPLOYEE_NUMBER | TABLE_E. EMPLOYEE_NUMBER | 0 |
| (2) | TABLE_B. EMPLOYEE_NUMBER | TABLE_E. EMPLOYEE_NUMBER | 0 |
| (3) | TABLE_B. DEPARTMENT | TABLE_D. DEPARTMENT | 0 |
| (4) | TABLE_A. EMPLOYEE_NAME | TABLE_E. EMPLOYEE_NAME | 0 |
| (5) | TABLE_D. NAME | TABLE_E. DEPARTMENT | 0 |

FIG.68

[RETRIEVAL CONDITION]

TABLE_E. EMPLOYEE_NUMBER=7002   (6801)  →CLEANSING→   TABLE_A. EMPLOYEE_NUMBER=7002   (6802)

FIG.75

[INTEGRATION RESULTS FOR SUBJECT LOGICAL MODEL TABLE_E] E

| EMPLOYEE_NUMBER | EMPLOYEE_NAME | DEPARTMENT |
|---|---|---|
| 7002 | JIRO SUZUKI | 202 |

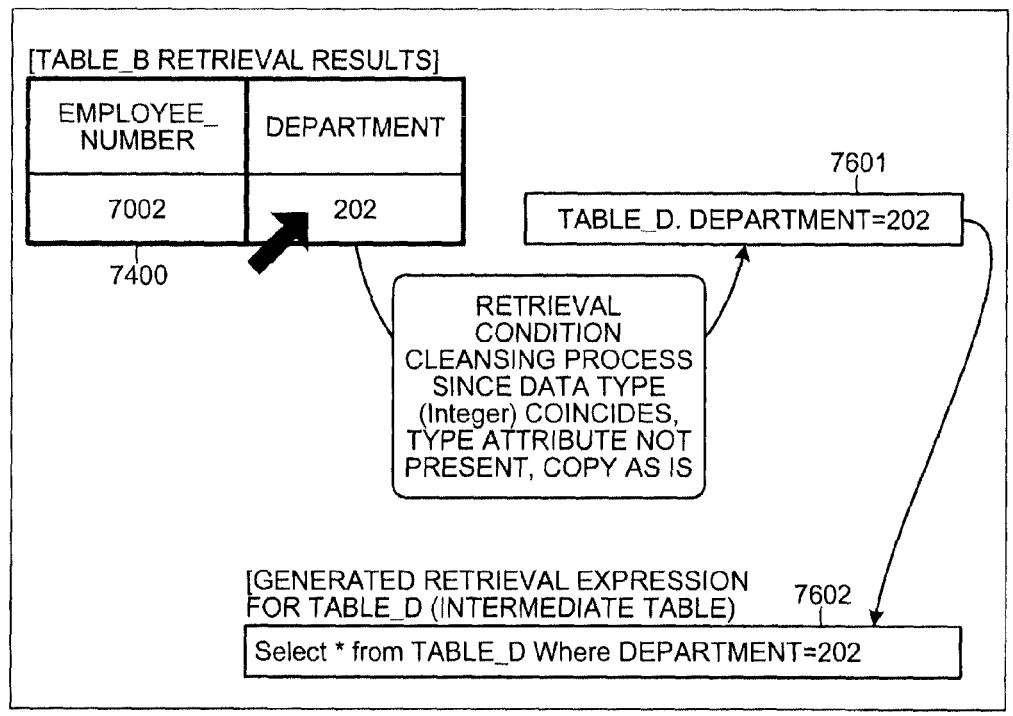

FIG.76

[TABLE_B RETRIEVAL RESULTS]

| EMPLOYEE_NUMBER | DEPARTMENT |
|---|---|
| 7002 | 202 |

7400

7601
TABLE_D. DEPARTMENT=202

RETRIEVAL CONDITION CLEANSING PROCESS SINCE DATA TYPE (Integer) COINCIDES, TYPE ATTRIBUTE NOT PRESENT, COPY AS IS

[GENERATED RETRIEVAL EXPRESSION FOR TABLE_D (INTERMEDIATE TABLE)] 7602

Select * from TABLE_D Where DEPARTMENT=202

FIG.77

[TABLE_D RETRIEVAL RESULTS] 7700

| DEPARTMENT | NAME |
|---|---|
| 202 | MANUFACTURING DEPARTMENT |

FIG.79

[INTEGRATION RESULT SET E]

| EMPLOYEE_NUMBER | EMPLOYEE_NAME | DEPARTMENT |
|---|---|---|
| 7002 | JIRO SUZUKI | MANUFACTURING DEPARTMENT |

INITIALIZED MAPPING DEFINITION (TABLE_N)    MD(N)

| | From_COLUMN | To_COLUMN | SOLUTION_FLAG |
|---|---|---|---|
| (1) | TABLE_S. DT | TABLE_N. DT | 1 |
| (4) | TABLE_S. FROM | TABLE_T. EXTENSION | 1 |
| (5) | TABLE_T. DEPARTMENT | TABLE_D. DEPARTMENT | 0 |
| (2) | TABLE_S. FROM | TABLE_N. FROM | 1 |
| (3) | TABLE_S. TO | TABLE_N. TO | 1 |
| (6) | TABLE_D. NAME | TABLE_N. FROM_NAME | 0 |

TABLE_S EXTRACTION RESULTS

| DT | FROM | TO |
|---|---|---|
| 2009.2.28 20:20:00 | 14100 | 24200 |
| 2009.2.28 20:21:00 | 14100 | 24200 |
| 2009.2.28 20:22:00 | 14100 | 24200 |

FIG.89

[INTEGRATION RESULT SET N]    N

| DT | FROM | FROM_NAME | TO |
|---|---|---|---|
| 2009.2.28 20:20:00 | 14100 | SALES DEPARTMENT | 24200 |
| 2009.2.28 20:21:00 | 14100 | SALES DEPARTMENT | 24200 |
| 2009.2.28 20:22:00 | 14100 | SALES DEPARTMENT | 24200 |

FIG.90

```
<ETL>
 <IN>
 Select * from TABLE_A
 </IN>
 <IN>
 Select * from TABLE_B
 </IN>
 <OUT>
 Select * from TABLE_E
 </OUT>
</ETL>
```
—9000

FIG.91

MD(E) (before):

| | From_COLUMN | To_COLUMN | SOLUTION_FLAG |
|---|---|---|---|
| (1) | TABLE A. EMPLOYEE_NUMBER | TABLE E. EMPLOYEE_NUMBER | 1 |
| (2) | TABLE B. EMPLOYEE_NUMBER | TABLE E. EMPLOYEE_NUMBER | 0 |
| (3) | TABLE B. DEPARTMENT | TABLE D. DEPARTMENT | 0 |
| (4) | TABLE A. EMPLOYEE_NAME | TABLE E. EMPLOYEE_NAME | 1 |
| (5) | TABLE D. NAME | TABLE E. DEPARTMENT | 0 |

MD(E) (after):

| | From_COLUMN | To_COLUMN | SOLUTION_FLAG |
|---|---|---|---|
| (1) | TABLE A. EMPLOYEE_NUMBER | TABLE E. EMPLOYEE_NUMBER | 1 |
| (2) | TABLE B. EMPLOYEE_NUMBER | TABLE E. EMPLOYEE_NUMBER | 1 |
| (3) | TABLE B. DEPARTMENT | TABLE D. DEPARTMENT | 1 |
| (4) | TABLE A. EMPLOYEE_NAME | TABLE E. EMPLOYEE_NAME | 1 |
| (5) | TABLE D. NAME | TABLE E. DEPARTMENT | 0 |

FIG.92

TABLE_A EXTRACTION RESULTS

| EMPLOYEE_NUMBER | EMPLOYEE_NAME | PHONE_NUMBER |
|---|---|---|
| 7001 | ICHIRO TANAKA | 03-111-1111 |
| 7002 | JIRO SUZUKI | 096-222-2222 |
| 7003 | SABURO SATO | 055-333-3333 |

TABLE_B EXTRACTION RESULTS

| EMPLOYEE_NUMBER | DEPARTMENT |
|---|---|
| 7001 | 101 |
| 7002 | 202 |
| 7003 | 101 |

SUBJECT DATA REFLECTING PROCESS (STEP S4504) (FIRST TIME: REFLECT TABLE_A)

[INTEGRATION RESULT SET E]

| EMPLOYEE_NUMBER | EMPLOYEE_NAME | DEPARTMENT |
|---|---|---|
| 7001 | ICHIRO TANAKA | |
| 7002 | JIRO SUZUKI | |
| 7003 | SABURO SATO | |

FIG.96

| | From_COLUMN | To_COLUMN | SOLUTION_FLAG | [RETRIEVAL CONDITION] |
|---|---|---|---|---|
| (1) | TABLE_A. EMPLOYEE_NUMBER | TABLE_E. EMPLOYEE_NUMBER | 0 | =7002 |
| (2) | TABLE_B. EMPLOYEE_NUMBER | TABLE_E. EMPLOYEE_NUMBER | 0 | =7002 |
| (3) | TABLE_B. DEPARTMENT | TABLE_D. DEPARTMENT | 0 | |
| (4) | TABLE_A. EMPLOYEE_NAME | TABLE_E. EMPLOYEE_NAME | 0 | |
| (5) | TABLE_D. NAME | TABLE_E. DEPARTMENT | 0 | |

FIG.107

```
<V_MODEL name="M">
  <COLUMN name="DT.ID" keytype="MKey" ref="DT[@id]"> <D_TYPE>Integer</D_TYPE> </COLUMN>
  <COLUMN name="FROM.ID" ref="./FROM/ID">            <D_TYPE>Integer</D_TYPE> </COLUMN>
  <COLUMN name="FROM.NAME" ref="./FROM/NAME">
                                                     <D_TYPE>String</D_TYPE>
         <D_ATTR name="CharCode">SJIS</D_ATTR>
  </COLUMN>
  <COLUMN name="TO.ID" ref="./TO/ID">                <D_TYPE>Integer</D_TYPE> </COLUMN>

(1) <MAP_RULE> <FROM_COLUMN table="TABLE_S">DT</FROM_COLUMN>
               <TO_COLUMN   table="M">DT.ID</TO_COLUMN>         </MAP_RULE>
(2) <MAP_RULE> <FROM_COLUMN table="TABLE_S">FROM</FROM_COLUMN>
               <TO_COLUMN   table="M">FROM.ID</TO_COLUMN>       </MAP_RULE>
(3) <MAP_RULE> <FROM_COLUMN table="TABLE_S">TO</FROM_COLUMN>
               <TO_COLUMN   table="M">TO.ID</TO_COLUMN>         </MAP_RULE>
(4) <MAP_RULE> <FROM_COLUMN table="TABLE_T">EXTENSION</FROM_COLUMN>
               <TO_COLUMN   table="M">FROM.ID</TO_COLUMN>       </MAP_RULE>
(5) <MAP_RULE> <FROM_COLUMN table="TABLE_D">DEPARTMENT</FROM_COLUMN>
               <TO_COLUMN   table="M">DEPARTMENT</TO_COLUMN>    </MAP_RULE>
(6) <MAP_RULE> <FROM_COLUMN table="TABLE_D">NAME</FROM_COLUMN>
               <TO_COLUMN   table="M">FROM.NAME</TO_COLUMN>     </MAP_RULE>

</V_MODEL>
```

MAPPING DEFINITION (rules 1–6)

FIG.109

```
<STREAM>
 <IN>
   <SQL> Select * from TABLE_S Where TO=24200 </SQL>
   <TIMING> 20:20 TO 20:22 </TIMING>
 </IN>
 <OUT>
   ?_xql=//M/DT/FROM/NAME="SALES DEPARTMENT"
 </OUT>
</STREAM>
```

FIG.110

```
<M>
   <DT id="2009.2.28:20:20:00">
     <FROM>
       <ID>14100</ID>
       <NAME>SALES DEPARTMENT</NAME>
     </FROM>
     <TO>
       <ID>24200</ID>
     </TO>
   </DT>
   <DT id="2009.2.28:20:21:00">
     <FROM>
       <ID>14100</ID>
       <NAME>SALES DEPARTMENT</NAME>
     </FROM>
     <TO>
       <ID>24200</ID>
     </TO>
   </DT>
     <DT id="2009.2.28:20:22:00">
       <FROM>
         <ID>14100</ID>
         <NAME>SALES DEPARTMENT</NAME>
       </FROM>
       <TO>
         <ID>24200</ID>
       </TO>
     </DT>
</M>
```

INFORMATION INTEGRATING APPARATUS, METHOD, AND COMPUTER PRODUCT

CROSS REFERENCE TO RELATED APPLICATIONS

This application is a continuation of U.S. patent application Ser. No. 12/828,707 filed Jul. 1, 2010 which is based upon and claims the benefit of priority of the prior Japanese Patent Application No. 2009-158301, filed on Jul. 2, 2009, the entire contents of which are incorporated herein by reference.

FIELD

The embodiments discussed herein are related to information integration.

BACKGROUND

A process of integrating extracted data is called physical integration (Extract/Transform/Loading (ETL)). In physical integration, data extracted from an information source by an extracting function (Extract) is subjected to physical integration (Transformation). Results of the integration are registered to a user-side by a registering function (Loading). Physical integration is applicable to collective processing executed as batch processing. In physical integration, the recency of information is ensured at the extraction of the information. As a result, overlapping management of the information sources and integrated results is apt to occur.

One method of achieving physical integration is carried out in such a way that functions to be integrated are configured into integration components as integration process logic is written preliminarily in an integration process logic description language called Transformation Description Language (TDL) and are registered with a repository, where the integration components are processed sequentially according to the TDL in executing physical integration (see, e.g., U.S. Pat. Nos. 6,014,670 and 6,339,775).

A process of collecting and integrating data present in multiple information sources managed by different systems through real-time processing in response to a request from a user-side is called virtual integration (Enterprise Information Integration (EII)). In virtual integration, necessary information is retrieved and collected from information sources in response to a request from the user-side, and the collected data is integrated and returned as integrated data to the user-side to realize virtual information integration. Virtual integration allows the user-side to acquire real-time information from an information source at the point that the user-side needs the information, thus enables use of fresh information. Used information is discarded to make overlapping information management unnecessary.

For example, a data model representing the data structure of an information source as an integration subject is defined as a physical model while a data model representing a data structure needed by the user-side is defined as a logical model, and the relation between the physical model and the logical model is defined as mapping definition to provide meta-definition, thereby realizing efficient virtual integration (see. e.g., International Patent Publication No. 2007-083371). Such virtual integration does not require integration process logic and thus, offers flexibility that enables response to changes at an information source or the user-side by changing only the meta-definition corresponding to the change. Thus, when data models at the user-side vary, virtual integration can be carried out by merely adding a logical model corresponding to an additional data model.

A process of acquiring and integrating data streaming as stream data is called stream integration. In stream integration, data streaming as part of a data stream (stream data) through a network, etc., is acquired when necessary and is subjected to information integration, and the results of the integration are sent to the data stream. Stream integration accompanies a time axis, and stream data is data sent out actively from an information source. For this reason, stream integration is carried out by a method of integration utterly different from a normal method of information integration, such as physical integration and virtual integration.

One method of stream integration is carried out in such a way that stream data acquired from an information source by a stream wrapper is stored temporarily in a cache, is integrated sequentially, and is sent out in response to a query from a user-side (see, e.g., Kitagawa, Hiroyuki and Watanabe, Yousuke, "Stream Data Management Based on Integration of a Stream Processing Engine and Database", Proc. IFIP International Conference on Network and Parallel Computing Workshops, pp. 18-22, Dalian, China, September 2007). In conventional stream data integration, a procedure of stream data integration is written with heed paid to data from an information source and the data structure to acquire integrated information to be used.

Since the three types of information integration physical integration, virtual integration, and stream integration, are different from each other in function, each is executed by a different processing system.

The physical integration, however, requires the user (or developer) to write and register complete integration process logic, thus posing a problem of heavy workload on the user (developer). Physical integration also requires that each relevant integration process logic be rewritten to cope with a change at an information source or the user-side, thus posing a problem of low flexibility. Physical integration further requires that a complete integration process logic be written in TDL for each data model required by the user-side, thus posing a problem in that trouble in making integration process logics increases when the user-side needs various (types of) data models.

The stream integration requires a user (or developer) to write an integration process logic using relational calculation involving an information source and an expanded function to write "query description language HamQL (Query Language)", an extended version of structured query language (SQL) for streaming processing, and to further register the written integration process logic.

Physical integration, virtual integration, and stream integration are executed by different processing systems. As a result, different development and operation is needed for each integration method, leading to a problem of greater development burden, cost, and increased complexity. When an information source and a user-side are desired to be present together in executing different integration methods, the information source and the user-side cannot be present together because different integration methods require different processing systems.

For example, when three information sources consisting of physically integrated information, data operated by a database management system (DBMS), and stream data are provided, execution of a combination of physical integration, virtual integration, and stream integration on these information sources is difficult. Likewise, when an information source is physically integrated information and a user-side is data stream, execution of a combination of physical integration and stream integration is difficult. In such a case, an individual integration system must be developed for each integration method.

SUMMARY

According to an aspect of an embodiment, an information integrating apparatus includes a storage unit that stores therein physical models that are data models of information sources managed in different systems, logical models that are data models predefined for a user-side that uses integrated information, and a mapping definition indicating corresponding relations between a physical model and a logical model; a detecting unit that detects an instruction for a first integration process of returning to the user-side, an integration result for a logical model that is based on information to be integrated from an information source defined by a physical model, or an instruction for a second integration process of returning to the user-side, an integration result for a logical model that is based on information from each information source corresponding to a query from the user-side input through the physical model; an integrating unit that refers to the mapping definition stored in the storage unit, converts from physical models into corresponding logical models, the information input from the information sources, and integrates the converted information; a breaking up unit that by referring to the mapping definition stored in the storage unit, breaks up into the physical models respectively corresponding to the information sources, a query that is from the user-side and expressed as the logical models obtained through conversion by the integrating unit; a collecting unit that using the physical models obtained by breaking up the query at the breaking up unit, collects the information retrieved from each of the information sources; a control unit that controls the integrating unit to execute the first integration process, if the detecting unit detects the instruction for the first integration process and controls the integrating unit to execute the second integration process of converting from the physical models into the logical models, a data model of the information collected by the collecting unit and integrating the converted information, if the detecting unit detects the instruction for the second integration process; and an output unit that outputs to the user-side, an integration result obtained by the integrating unit and outputs to an origin of the query on the user-side, an integration result obtained through integration control by the control unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 13 is a diagram of an example of the description contents of meta-information 103.
FIG. 14 is a diagram of the description contents of a physical model PA.
FIG. 15 is a diagram of the description contents of a physical model PB.
FIG. 16 is a diagram of the description contents of a physical model PD.
FIG. 17 is a diagram of the description contents of a physical model PT.
FIG. 18 is a diagram of the description contents of a physical model PS.
FIG. 20 is a diagram of the description contents of a logical model LE and a mapping definition MD(E).
FIG. 21 is a diagram of the description contents of a logical model LN and a mapping definition MD(N).
FIG. 22 is a diagram of the contents of an evaluation point table.
FIGS. 23 to 25 are diagrams of the mapping definition MD before and after a sorting process.
FIG. 37 is a diagram of an example of physical integration instruction information 3700.
FIG. 38 is a diagram of an example of virtual integration instruction information 3800.
FIG. 39 is a diagram of an example of stream integration instruction information 3900.

FIG. 47 is a flowchart of a detailed procedure of a query breaking up process (step S4601) depicted in the FIG. 46.

FIG. 48 is a diagram of an integration result set E at step S4702.

FIG. 49 is a diagram of the mapping definition MD(E) at step S4702.

FIG. 50 is a diagram of the mapping definition MD(E) at step S4703.

FIG. 63 is a diagram of an example of updating a solution flag.

FIG. 67 is a diagram of initialization of the mapping definition MD(E) acquired from a retrieval condition 6600.

FIG. 68 is a diagram of an example of the retrieval condition cleansing process.

FIG. 75 is a diagram depicting movement of a process subject record of the integration result set E.

FIG. 76 is a diagram of an example of a retrieval result for TABLE_B in the subject data reflecting process (step S4504).

FIG. 77 is a diagram of a retrieval result 7700 for TABLE_D retrieved as an intermediate table.

FIG. 79 is a diagram of the integration result set E output as a virtual integration result.

FIG. 89 is a diagram of an integration result set N output as a stream integration result.

FIG. 90 is a diagram of an example of physical integration instruction information 9000 in a second embodiment.

FIG. 91 is a diagram of initialization of a mapping definition (step S4501) of the second embodiment.

FIG. 92 is a diagram of the first execution of the subject data reflecting process (reflecting process with respect to the TABLE_A) (step S4504) according to the second embodiment.

FIG. 96 is a diagram of the mapping definition at the initialization (following the process at step S4703) in a first operation example of a query breaking up process (step S4601).

FIG. 107 is a diagram of an example of part of meta-information corresponding to the logical model M having a tree structure.

FIG. 109 is a diagram of stream integration instruction information for the logical model M having a tree structure.

FIG. 110 is a diagram of an example of an information integration result resulting by executing a stream integration instruction to the logical model M depicted in FIG. 109.

DESCRIPTION OF EMBODIMENTS

Embodiments of the present invention will be explained with reference to the accompanying drawings. In the embodiments to be described hereinafter, an information integrating system that realizes an integration process of integrally carrying out physical integration, virtual integration, and stream integration through a common integration engine will be described.

Figure 1:
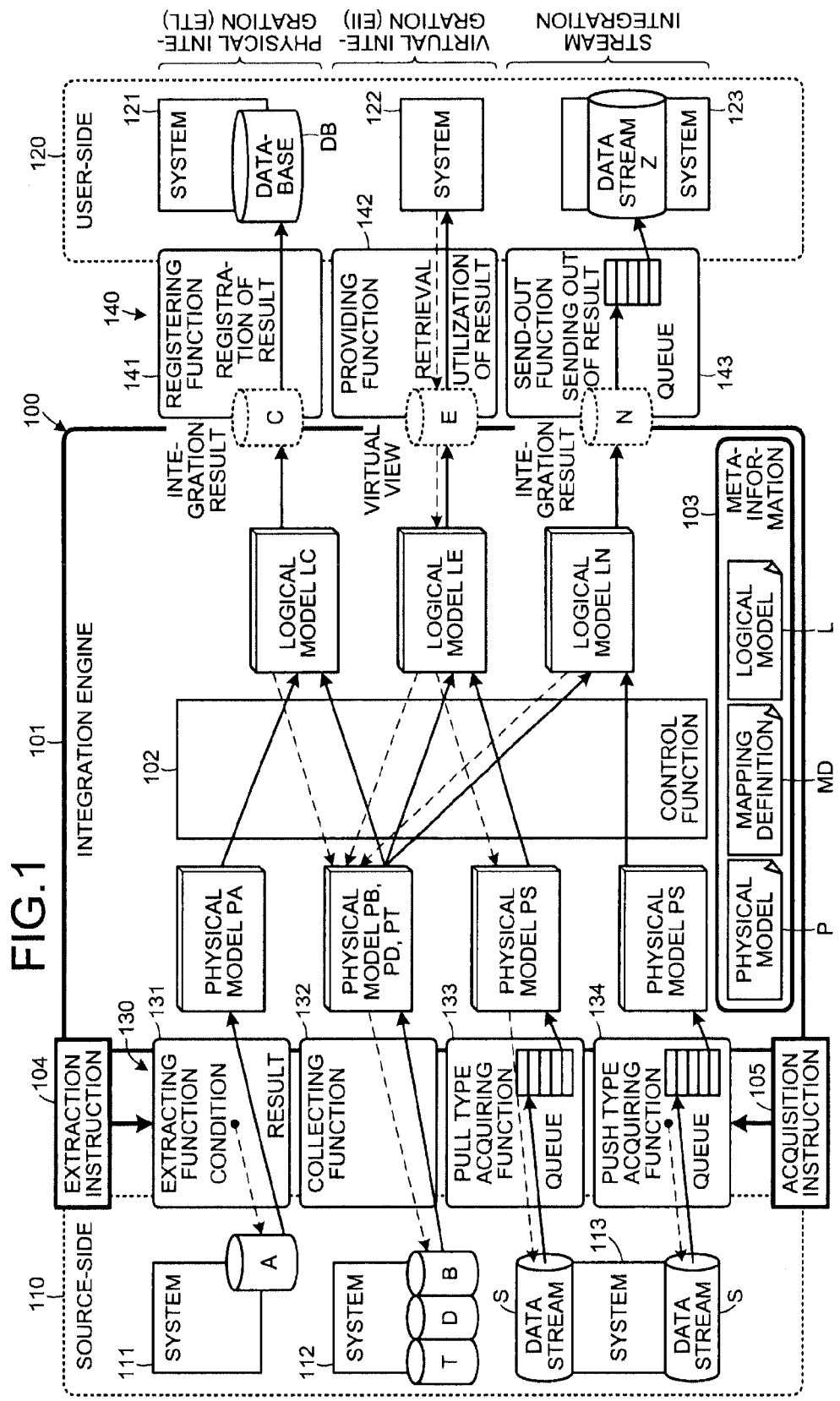
FIG. 1 is a system configuration diagram of an information integrating system according to an embodiment.

FIG. 1 is a system configuration diagram of an information integrating system according to an embodiment. An information integrating system 100 includes an integration engine 101, an source-side 110, and a user-side 120. The integration engine 101 is connected to the source-side 110 and to the user-side 120, and realizes physical integration, virtual integration, and stream integration.

Physical integration enables efficient processing of a large amount of information and thus, is used mainly for batch processing. For example, in the transaction of bank account-settlement information, a physical integration process is executed by batch processing during the night to complete account-settlements by the start of the next business day.

In virtual integration, information from the information source is collected and integrated in real-time and in response to a request from the user-side 120, so that the recency of the integrated result is high. For example, virtual integration is used to cooperate between the transaction processing systems, such as Service Oriented Architecture (SOA), when the master data of another system is referenced as needed.

In stream integration, information integration is carried out in a real-time manner at the time of information reception, transmission, and relay, demanding high real-time performance. Opportunities of using stream integration are increasing and relate to SOA service messages, digital phones, sensor information transfer, and data broadcasting.

The source-side 110 includes information source systems 111 to 113, which are computer systems storing various types of information therein. In this embodiment, for example, the information source system 111 serves as an employee management system, the information source system 112 serves as an organization management system, and the information source system 113 serves as an internal telephone system.

Information A stored in the information source system 111 is, therefore, information related to employees, such as employee numbers, employee names, and telephone numbers. Information B, D, T stored in the information source system 112 is information concerning the organization, such as employee numbers and departments (of employees). Data stream S in the information source system 113 is information concerning phone calls, such as transmission origins, transmission destinations, and transmission dates.

The user-side 120 includes user systems 121 to 123, which are computer systems that receive various types of information. In this embodiment, for example, the user system 121 may be a database server, an application server, a server controlling a client apparatus, or a group of client apparatuses.

In this embodiment, the user system 121 registers an integration result C from the integration engine 101 to a database DB. In response to a query from the user system 122, the user system 122 provides, as a virtual view, an integration results E to an application program and displays the virtual view on a display. The user system 123 sends out an integration result N from the integration engine 101 to a data stream Z.

The integration engine 101 is an information integrating apparatus that has an information input function 130, an information output function 140, meta-information 103, and a control function 102. The information input function 130 inputs information from the source-side 110. Specifically, when an extracting function 131 receives an extraction instruction 104, the extracting function 131 extracts from the information source system 111, a result (information A) meeting a given condition. A collecting function 132 collects from the information source system 112, results (information B, D, T) in response to a query from the control function 102.

Upon receiving an acquisition instruction 105, an PUSH-type acquiring function 134 acquires from the data stream S streaming in the information source system 113, stream data corresponding to the acquisition instruction 105 and queues the stream data in the integration engine 101. Specifically, when an external acquisition instruction is given to the acquiring function 133, the acquiring function 133 acquires data from the data stream S by a PUSH-type information integration process, which will be described later. Upon receiving an instruction from the integration engine 101, the PULL-type acquiring function 133 acquires stream data corresponding to the instruction from the data stream S by a PULL-type information integration process, which will be described later.

The information output function 140 outputs information from the control function 102. Specifically, a registering function 141 registers the integration result C from the control function 102 to the database DB of the user system 121. A providing function 142 transmits a query statement (retrieval expression) for a virtual view E from the user system 122 to the integration engine 101, and provides the integration results E acquired by the integration engine 101 to the user system 122, which then displays the integration results E on the display. A send-out function 143 queues the integration result N on the data stream S when necessary, thereby sending out the integration result N to the data stream Z of the user system 123.

The meta-information 103 includes a physical model P, a logical model L, and a mapping definition MD. The physical model P is defined as a model (scheme) of data managed by the source-side 110. For example, a data model of data in the information source system 111 is a physical model PA, which has, for example, employee-related attributes, such as employee numbers, employee names, and phone numbers.

Data models defined as models of data in the information source system 112 are physical models PB, PD, and PT. The physical model PB has, for example, organization-related attributes, such as employee numbers and departments. The physical model PD has, for example, organization-related attributes, such as departments and names (of department). The physical model PT has, for example, organization-related attributes, such as extensions (number) and corresponding departments.

A data model defining a format of stream data streaming in a data stream in the information source system 113 is the physical model PS. The physical model PS has, for example, call-related attributes, such as transmission origins, transmission destinations, and phone call dates.

The logical model L is a data model that is defined in advance concerning information from the source-side 110 for each user application program. For example, a data model for registrations to the database DB in the user system 121 is a logical model LC that has attributes, which are an integration of employee-related attributes defined by the physical model PA (e.g., employee numbers and employee names) and organization-related attributes defined by the physical model PB (e.g., departments).

A data model defined as a data format required by an application program in the user system 122 is a logical model LE. For example, the logical model LE has attributes that are an integration of employee-related attributes defined by the physical model PA (e.g., employee numbers and employee names) and organization-related attributes defined by the physical models PB and PD (e.g., departments).

A data model defined as a data format of the data stream Z in the user system 123 is a logical model LN. For example, the logical model LN has attributes that are an integration of organization-related attributes defined by the physical model PD (e.g., names of departments) and call-related attributes defined by the physical model PS (e.g., transmission origins, transmission destinations, transmission dates).

The mapping definition MD is a table that defines the corresponding relation between the physical model P and the logical model L. This mapping definition MD enables discerning which attribute in the physical model P is integrated into which attribute of the logical model L.

The control function 102 references the mapping definition MD to integrate information from the source-side 110 in conversions from the physical model P into the logical model L and break up a query from the user-side 120 in conversions from the logical model L into the physical model P, and in doing so, the control function 102 executes various value conversion processes (cleansing process) as needed.

In the information integrating system 100, physical integration is realized from the perspective of the user system 121, virtual integration is realized from the perspective of the user system 122, and stream integration is realized from the perspective of the user system 123. Thus, use of the integration engine 101, enables realization of physical integration, virtual integration, and stream integration by common meta-information, i.e., the meta-information 103.

As a result, defining the meta-information 103 once is sufficient, thereby reducing development burden. Double definition and conversion of definition becomes unnecessary, preventing the occurrence of inconsistency and improving reliability. In addition, three types of information integration processing systems (physical integration, virtual integration, and stream integration) are integrated into one, reducing development costs and improving operation flexibility.

The integration engine 101 allows use of three types of schemes including PULL-type information integration, PUSH-type information integration, and mixed-type information integration.

Figure 2:
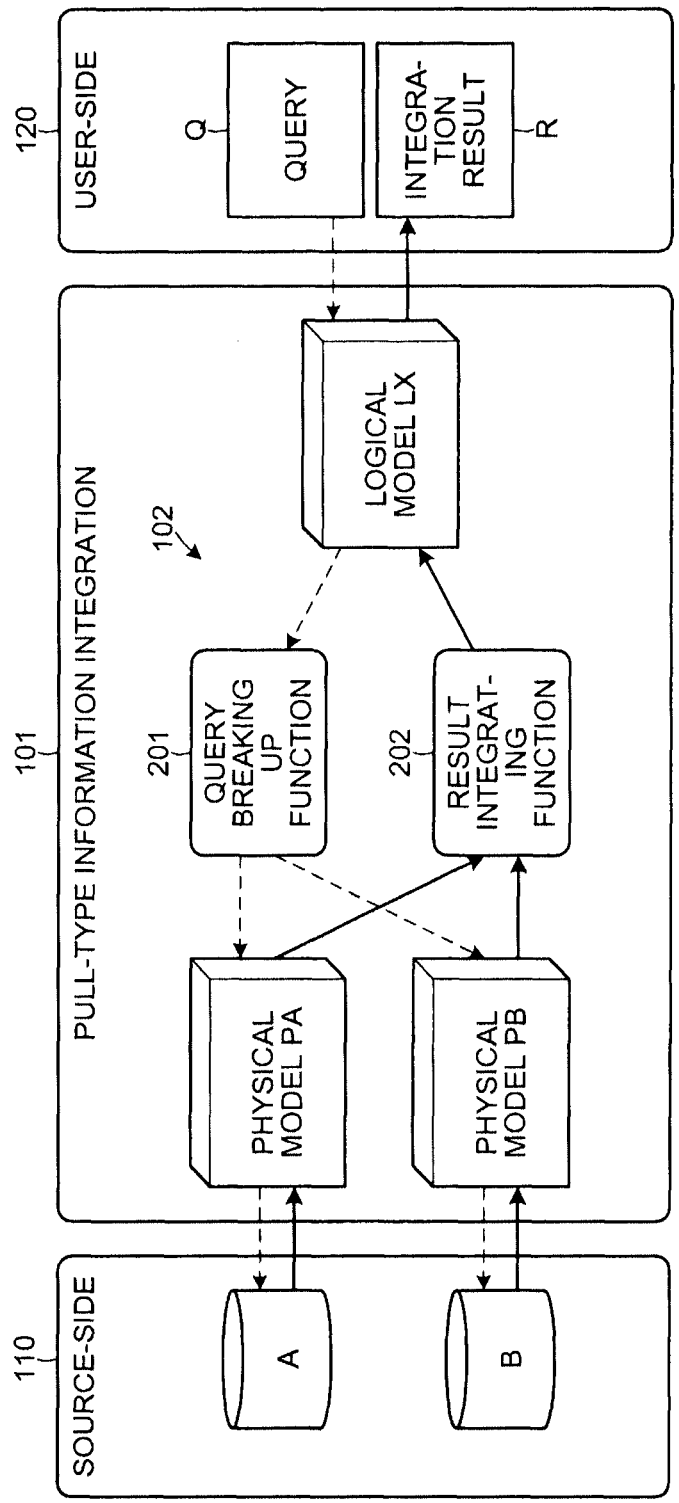
FIG. 2 is a diagram of PULL-type information integration.

FIG. 2 is a diagram of PULL-type information integration. PULL-type information integration is a method of returning an integration result to the user-side 120 in response to a query from the user-side 120. In PULL-type information integration, integration is carried out by a query breaking up function 201 and a result integrating function 202 included in the control function 102. The query breaking up function 201 breaks up a query statement Q that is for a logical model LX and from the user-side 120. The query statement Q is broken up into query statements to physical models PA and PB that correspond to the logical model LX. The query breaking up function 201 further retrieves information A and B. The result integrating function 202 integrates into the logical model LX, retrieval result information PA and PB acquired as the physical models PA and PB and returns an integration result R. PULL-type information integration implements virtual integration.

Figure 3:
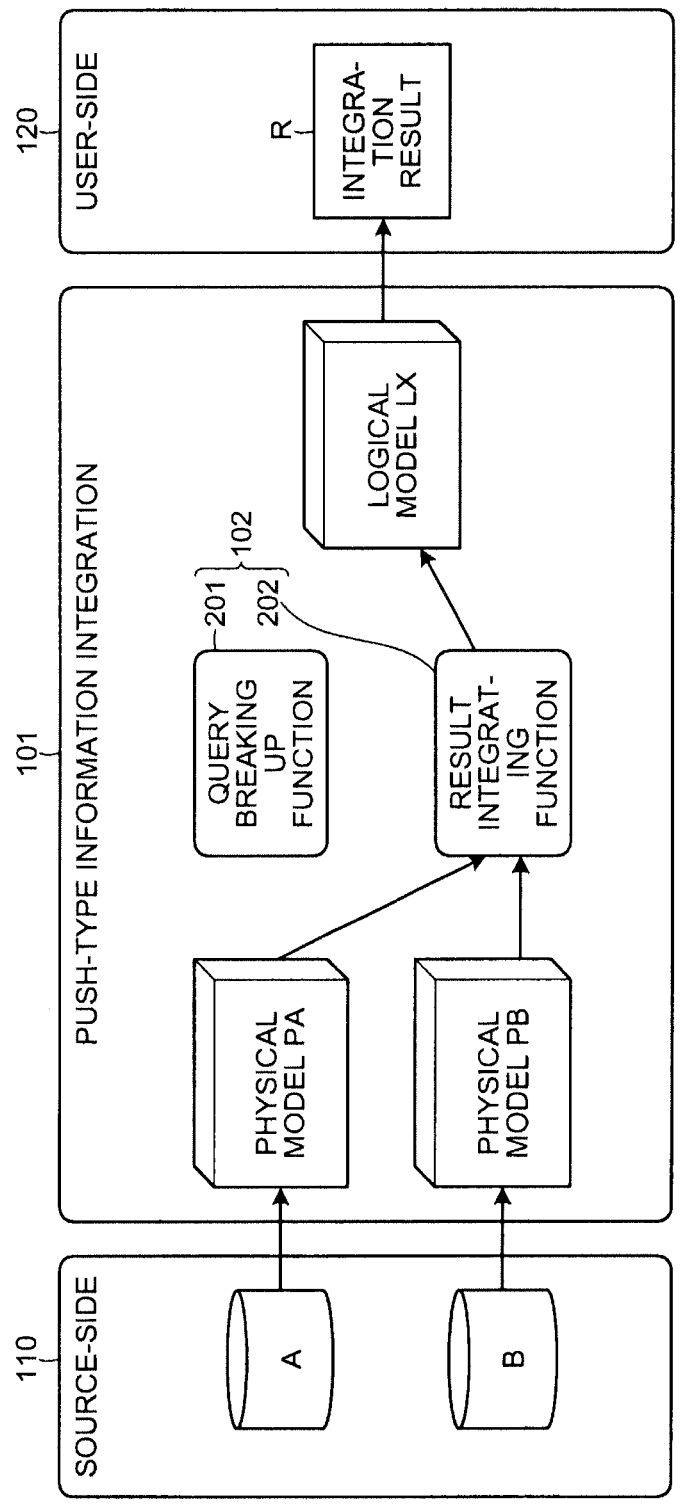
FIG. 3 is a diagram of PUSH-type information integration.

FIG. 3 is a diagram of PUSH-type information integration. PUSH-type information integration is a method of inputting information from the source-side 110 and outputting the integration result R to the user-side 120. In PUSH-type information integration, the result integrating function 202 carries out integration. Information input as the physical models PA and PB from the source-side 110 is integrated into the logical model LX by the result integrating function 202, which outputs the integration result R to the user-side 120. Specifically, PUSH-type information integration is realized by not using (i.e., turning off) the query breaking up function 201. Hence, PULL-type information integration and PUSH-type information integration are realized through a common integration engine, i.e., the integration engine 101.

Figure 4:
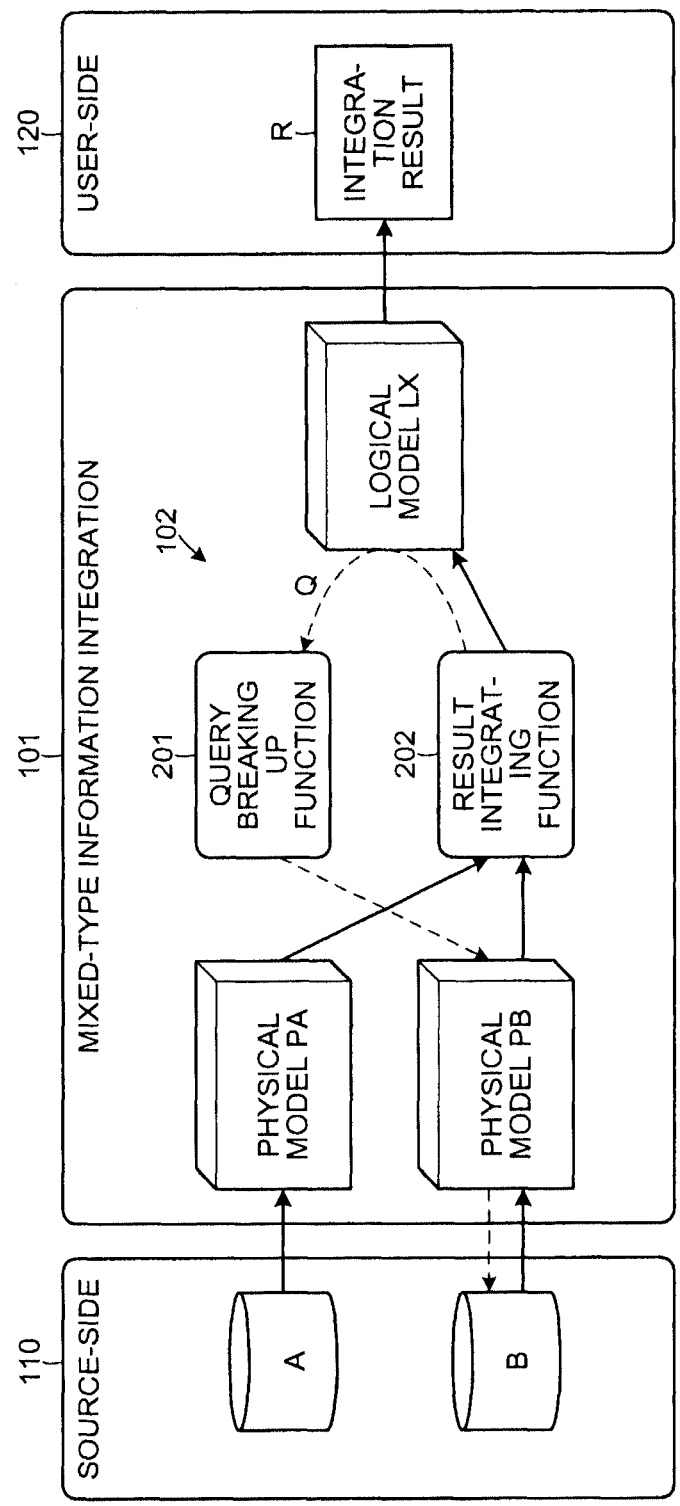
FIG. 4 is a diagram of mixed-type information integration.

FIG. 4 is a diagram of mixed-type information integration. Mixed-type information integration is a method of mixing PULL-type information integration and PUSH-type information integration. Mixed-type information integration is basically PUSH-type information integration of integrating information A input to the physical model PA into the logical model LX and outputting the integration result R to the user-side 120. When information necessary for integration is present in another source-side 110, however, the necessary query statement Q to the physical model PB is made by the query breaking up function 201 to acquire and integrate information B in execution of PULL-type information integration. In FIG. 4, the information A is integrated by PUSH-type integration and the information B is integrated by PULL-type integration, so that the overall process is mixed-type information integration.

Figure 5:
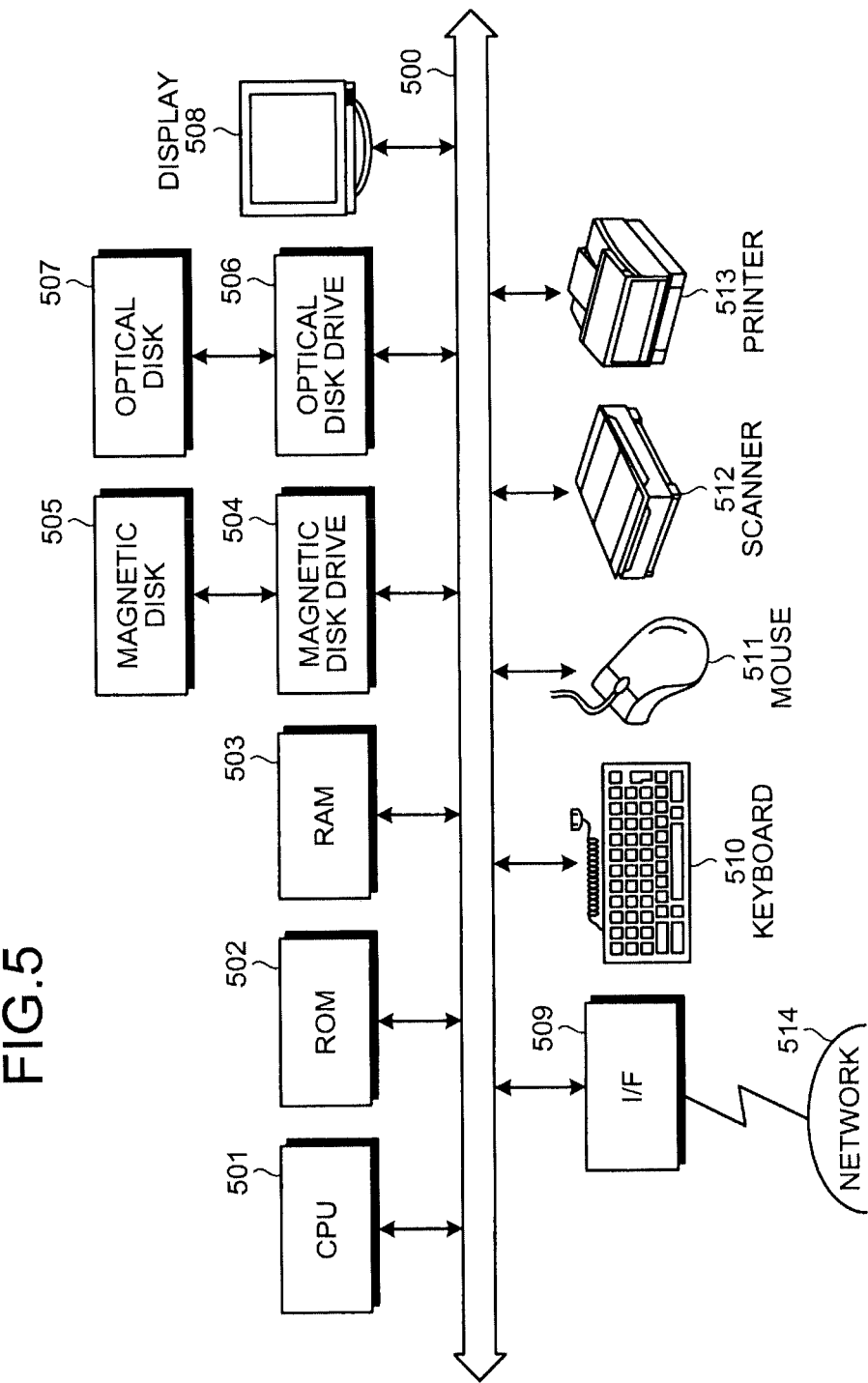
FIG. 5 is a block diagram of a hardware configuration of an information integrating apparatus according to the embodiments.

FIG. 5 is a block diagram of a hardware configuration of an information integrating apparatus according to the embodiments. As depicted in FIG. 5, the information integrating apparatus includes a central processing unit (CPU) 501, a read-only memory (ROM) 502, a random access memory (RAM) 503, a magnetic disk drive 504, a magnetic disk 505, an optical disk drive 506, an optical disk 507, a display 508, an interface (I/F) 509, a keyboard 510, a mouse 511, a scanner 512, and a printer 513, respectively connected by a bus 500.

The CPU 501 governs overall control of the information integrating apparatus. The ROM 502 stores therein programs such as a boot program. The RAM 503 is used as a work area of the CPU 501. The magnetic disk drive 504, under the control of the CPU 501, controls the reading and writing of data with respect to the magnetic disk 505. The magnetic disk 505 stores therein data written under control of the magnetic disk drive 504.

The optical disk drive 506, under the control of the CPU 501, controls the reading and writing of data with respect to the optical disk 507. The optical disk 507 stores therein data written under control of the optical disk drive 506, the data being read by a computer.

The display 508 displays, for example, data such as text, images, functional information, etc., in addition to a cursor, icons, and/or tool boxes. A cathode ray tube (CRT), a thin-film-transistor (TFT) liquid crystal display, a plasma display, etc., may be employed as the display 508.

The I/F 509 is connected to a network 514 such as a local area network (LAN), a wide area network (WAN), and the Internet through a communication line and is connected to other apparatuses through the network 514. The I/F 509 administers an internal interface with the network 514 and controls the input/output of data from/to external apparatuses. For example, a modem or a LAN adaptor may be employed as the I/F 509.

The keyboard 510 includes, for example, keys for inputting letters, numerals, and various instructions and performs the input of data. A touch-panel-type input pad or numeric keypad, etc. may be adopted. The mouse 511 is used to move the cursor, select a region, or move and change the size of windows. A track ball or a joy stick may be adopted provided each respectively has a function similar to a pointing device.

The scanner 512 optically reads an image and takes in the image data into the information integrating apparatus. The scanner 512 may have an optical character recognition (OCR) function as well. The printer 513 prints image data and text data. The printer 513 may be, for example, a laser printer or an ink jet printer.

Each of the functions depicted in FIGS. 1 to 4 is implemented by causing the CPU 501 to execute a program stored in a storage apparatus depicted in FIG. 5, such as the ROM 502, the RAM 503, and the magnetic disk 505. Various types of information in the source-side 110 and at user-side 120 and the meta-information 103 are stored in a storage apparatus such as the ROM 502, the RAM 503, and the magnetic disk 505 depicted in FIG. 5.

The source-side 110 may be provided as information stored in another information system connected via the network 514. The user-side 120 may be provided as other application programs, databases, and data streams that operate under the same environment under which the information integrating apparatus operates or as application programs, databases, and data streams that operate in another information system connected via the network 514. Hardware components excluding the CPU 501 and the RAM 503 are adopted as needed within a range of a configuration necessary for operation of the information integrating apparatus, and therefore do not constitute a prerequisite for the information integrating apparatus.

In this embodiment, as described above, the information source system 111 serves as an employee management system, the information source system 112 serves as an organization management system, and the information source system 113 serves as an internal telephone system.

Figure 6:
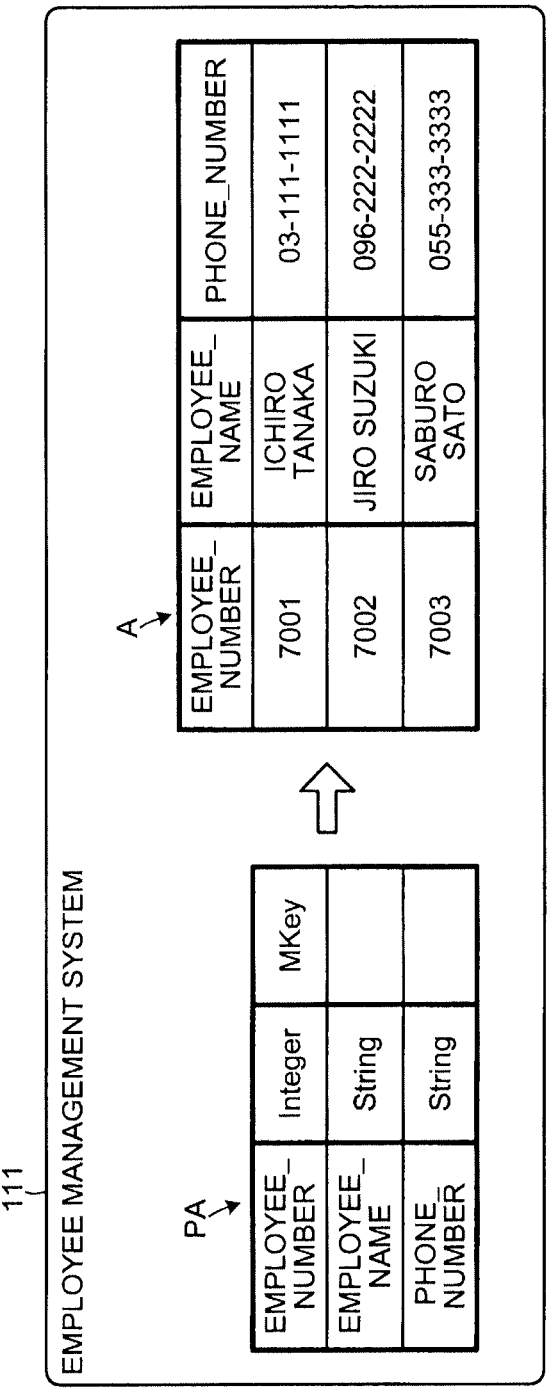
FIG. 6 is a diagram of an example of information A stored in an information source system 111.

FIG. 6 is a diagram of an example of the information A stored in the information source system 111. From the perspective of the information integration engine 101, the physical model PA defines the information A and includes an attribute name, a data type, and a constraint, for each attribute. The attribute name is the name of an attribute, such as employee number, employee name, and phone number, the data type is the type of an attribute, such as integer type (Integer) and character string type (String), and the constraint is used to determine whether an attribute is a primary key attribute (Mkey) or a foreign key attribute (Skey). For example, an employee number is an attribute of an integer type with a primary key constraint. An employee name as well as a phone number is an attribute of a character string type.

The information A, based on the physical model PA, makes up employee number items, employee name items, and phone number items to manage employee information for each record. In FIG. 6, three employees with employee numbers of 7001 to 7003 are registered. Because of an assumption that the information source system 111 runs on a personal computer, a character code system for the information A is determined to be Shift JIS code (S-JIS).

Figure 7:
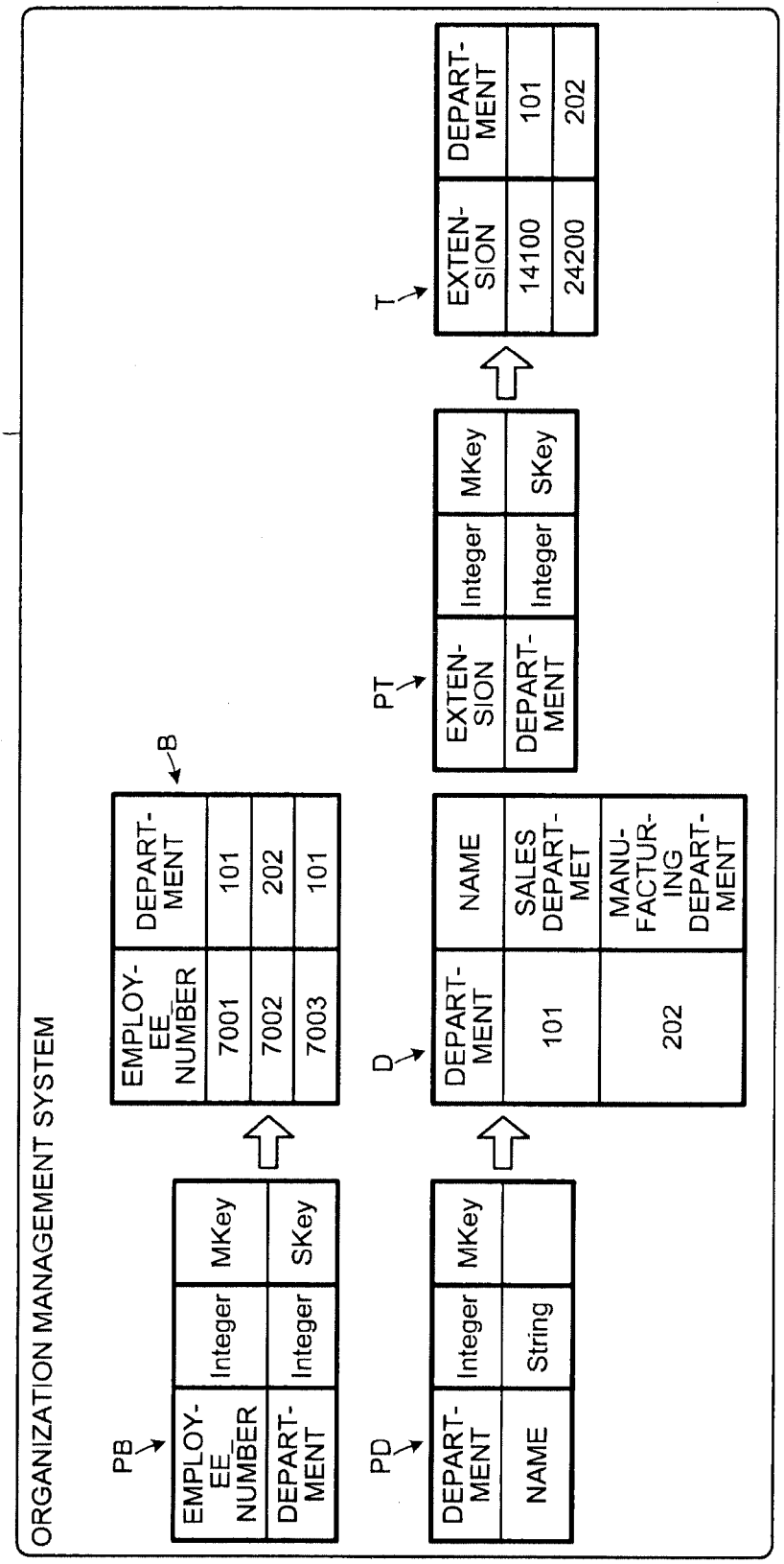
FIG. 7 is a diagram of an example of information B, D, and T stored in an information source system 112.

FIG. 7 is a diagram of an example of information B, D, and T stored in the information source system 112. From the perspective of the information integration engine 101, physical models PB, PD, and PT define the information B, D, and T, and similar to the physical model PA, have an attribute name, a data type, and a constraint, for each attribute. The attribute name is the name of an attribute, such as employee number, department, name, and extension, the data type is the type of an attribute, such as integer type (Integer) and character string type (String), and the constraint is used to determine whether an attribute is a primary key attribute (Mkey) or a foreign key attribute (Skey).

The information B, based on the physical model PB, includes employee number items and department items, organizing employee department information according to record. In FIG. 7, the departments of three employees having employee numbers of 7001 to 7003 are registered. The information D, based on the physical model PD, includes department items and name items, organizing department information according to record. In FIG. 7, two departments are registered as "101: SALES DEPARTMENT" and "102: MANUFACTURING DEPARTMENT".

The information T, based on the physical model PT, includes extension items and department items, organizing extension department information according to record. In FIG. 7, "DEPARTMENT: 101" at "EXTENSION: 14100" and "DEPARTMENT: 202" at "EXTENSION: 24200" are registered. In this example it is assumed that the information source system 112 runs on a mainframe computer, thus a character code system for the information B, D, and T is determined to be Japanese Processing Extended Feature (JEF).

Figure 8:
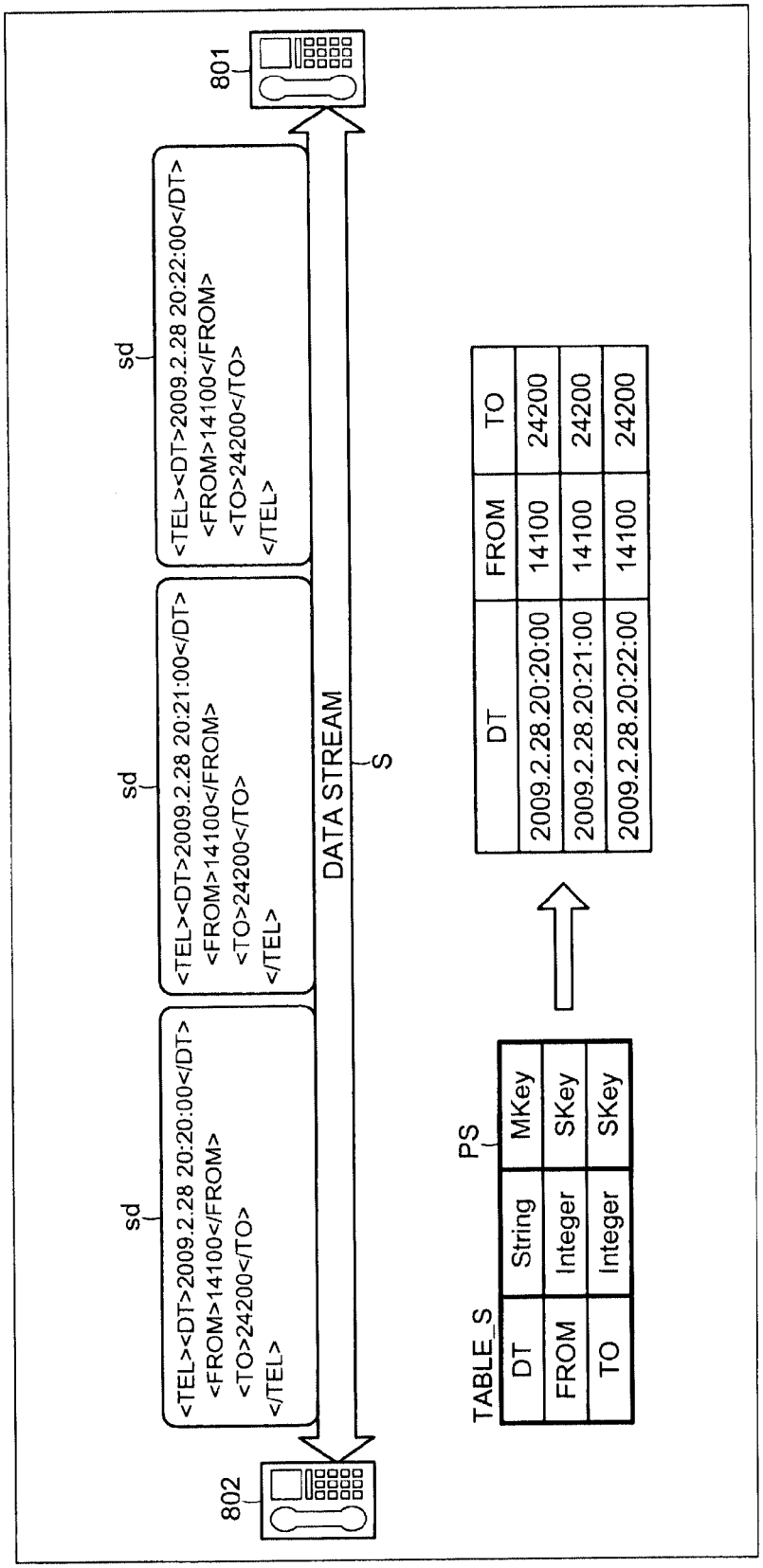
FIG. 8 is a diagram of an example of a stream data sd that stream at data stream S of an information source system 113.

FIG. 8 is a diagram of an example of the stream data sd that streaming to data stream S streaming in the information source system 113. In the information source system 113, a phone call is made from a telephone 801 at "EXTENSION: 14100" to a telephone 802 at "EXTENSION: 24200" to generate the data stream S, which is actually a series of stream data sd. A transmission date (DT), a transmission origin (FROM), and a transmission destination (TO) are defined in the stream data sd.

From the perspective of the information integration engine 101, the physical model PS defines the data stream S and similar to the physical model PA, has an attribute name, a data type, and a constraint, for each attribute. The attribute name is the name of an attribute (DT, FROM, and TO in FIG. 8), and the data type is the type of an attribute, such as integer type (Integer) and character string type (String). The constraint is used to determine whether an attribute is a primary key attribute (Mkey) or a foreign key attribute (Skey).

The data stream S, based on the physical model PS, includes DT items, FROM items, and TO items, indicating phone call information according to record. FIG. 8 depicts phone calls that were made from "EXTENSION: 14100" to "EXTENSION: 24200" three times at 20:20:00, 20:21:00, and 20:22:00 on Feb. 28, 2009.

The physical model P and the logical model L are correlated with each other through the mapping definition MD.

Figure 9:
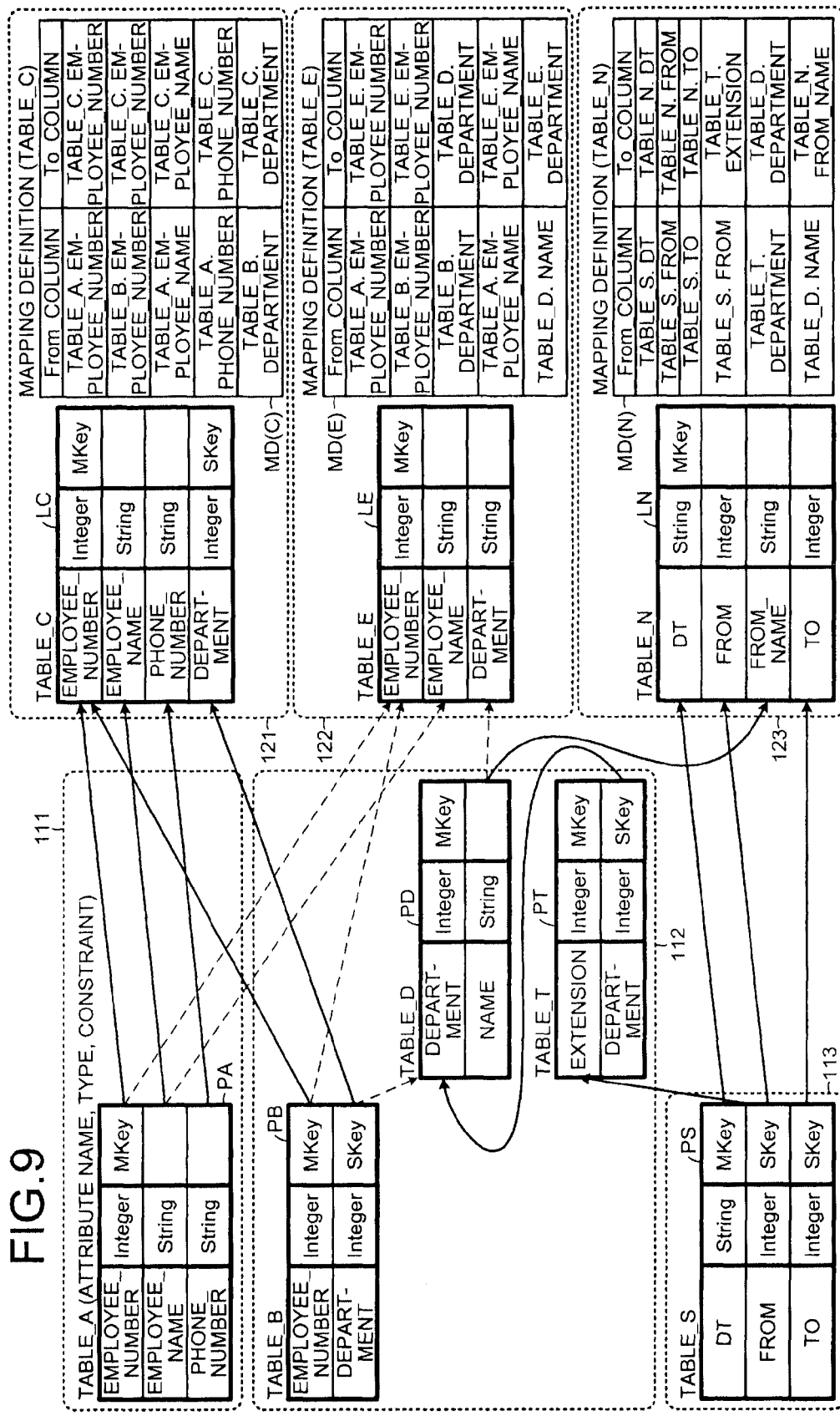
FIG. 9 is a diagram of corresponding relations between a physical model P and a logical model L.

FIG. 9 is a diagram of corresponding relations between the physical model P and the logical model L. In FIG. 9, model names of TABLE_A, TABLE_B, TABLE_D, TABLE_T, and TABLE_S are given respectively to the physical models PA, PB, PD, PT, and PS managed by the information source systems 111 to 113. Each of the user systems 121 to 123 has each logical model L. Each of the logical models LC, LE, and LN depicted in FIG. 9 is made up of attribute names, data types, and constraints in the same manner as the physical model P.

The logical model LC is a data model of an employee list (TABLE_C) having items of employee number, employee name, phone number, and department. The logical model LE is a data model of an employee list (TABLE_E) having items of employee number, employee name, and department. The logical model LN is a data model of a phone call record table (TABLE_N) having items of DT (transmission date), FROM (transmission origin code), FROM_NAME, and TO (transmission destination code).

The mapping definition MD is provided for each of the user systems 121 to 123. Each mapping definition MD has a From_COLUMN item and a To_COLUMN item. The From_COLUMN item has an entry of a model name plus an attribute name of the physical model P, and the To_COLUMN item has an entry of a model name plus an attribute name of the logical model L or of the physical model P.

A mapping definition MD(C) is a table that correlates the physical model P with the logical model LC. A mapping definition MD(E) is a table that correlates the physical model P with the logical model LE. A mapping definition MD(N) is a table that correlates the physical model P with the logical model LN. An item indicated in the From_COLUMN of each mapping definition indicated in the mapping definition MD represents the starting end of an arrow in FIG. 9, that is, a copy origin of result data, while an item indicated in the To_COLUMN of the same represents the termination of the arrow in FIG. 9, that is, a copy destination of the result data. FIG. 9 depicts an operation called "mapping" from a From_COLUMN item to a To_COLUMN item.

Figure 10:
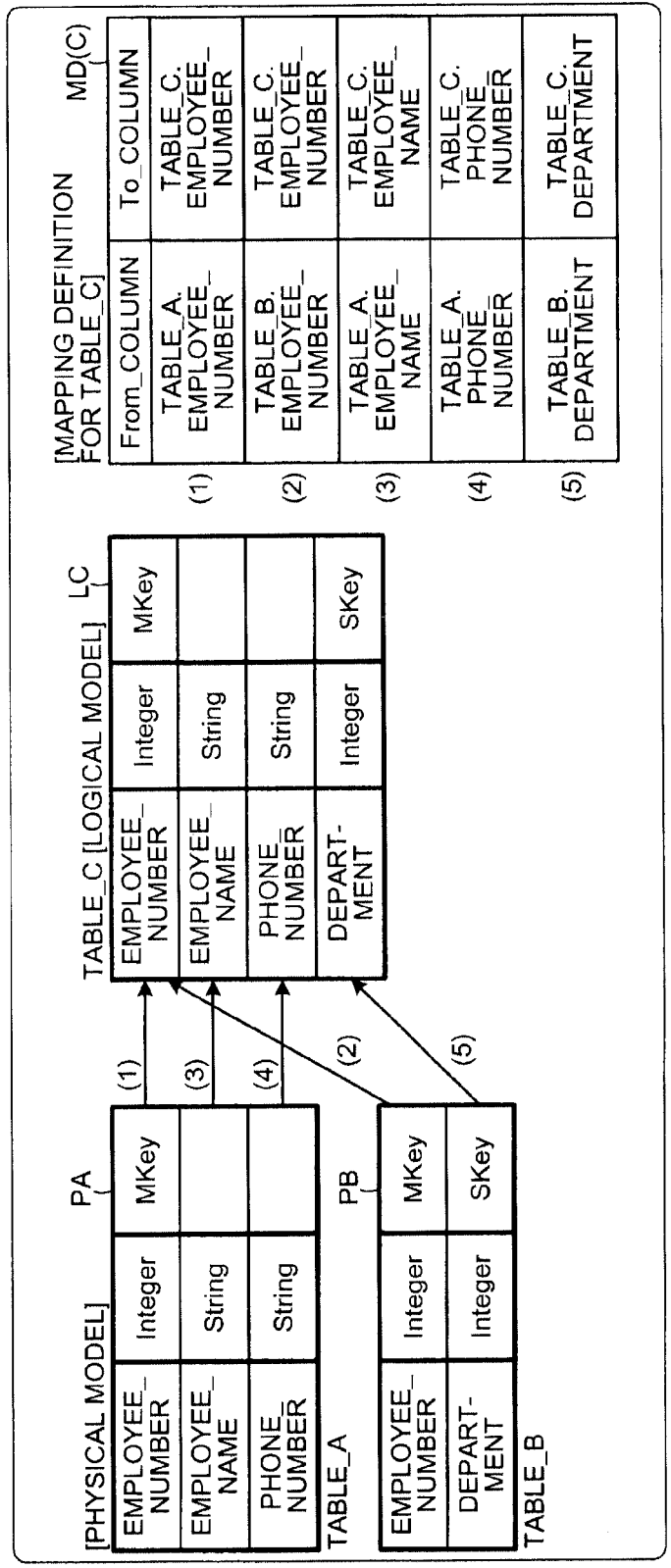
FIGS. 10 to 12 are partially magnified views of corresponding relations between the physical model P and the logical model L depicted in FIG. 9.

FIG. 10 is a partially magnified view of corresponding relations between the physical model P and the logical model L depicted in FIG. 9 and depicts a magnified view of the sole definition necessary for the logical model LC. In FIG. 10, corresponding relations between the physical models PA and PB and the logical model LC are defined by the mapping definition MD(C). In FIG. 10, a parenthesized number of an arrow between the physical models PA, PB and the logical model LC corresponds to parenthesized numbers appended to each row of the mapping definition MD(C).

For example, when reference is made to the first row (1) of the mapping definition MD(C), it is found that the From_COLUMN item is "TABLE_A.EMPLOYEE_NUMBER" and the To_COLUMN item is "TABLE_C.EMPLOYEE_NUMBER". Hence, an employee number item of the physical model PA (TABLE_A) is mapped to an employee number item of the logical model LC (TABLE_C).

Similarly, when reference is made to the second row (2) of the mapping definition MD(C), it is found that the From_COLUMN item is "TABLE_B.EMPLOYEE_NUMBER" and the To_COLUMN item is "TABLE_C.EMPLOYEE_NUMBER". Hence, an employee number item of the physical model PB (TABLE_B) is mapped to an employee number item of the logical model LC (TABLE_C).

The mapping definition (1) specifies an item having a primary key constraint (Mkey) in the From_COLUMN and in the To_COLUMN (hereinafter "Mkey item"). In this manner, a record of the physical model can be correlated with a record of the logical model through an Mkey item by mapping the Mkey item of the physical model onto the Mkey item of the logical model. This means that the mapping definition (1) correlates a record of the physical model PA with a record of the logical model LC through the employee number item.

Likewise, the mapping definition (2) specifies an Mkey item in the From_COLUMN and in the To_COLUMN, and in the To_COLUMN, mapping is made onto the same employee number of the logical model LC as that of the mapping definition (1). In this manner, Mkey items of multiple physical models are mapped onto an Mkey item of a single logical model to be able to correlate records of the physical models with the logical model.

This means that relational JOIN operation is carried out on records of the physical models, using an item specified by a mapping definition as a JOIN key, to correlate the result of the calculation with the logical model. In other words, relational JOIN operation is carried out on a record of the physical model PA and a record of the physical model PB, using an employee number as the key, to correlate the result of the calculation with the logical model LC as its record.

Figure 11:
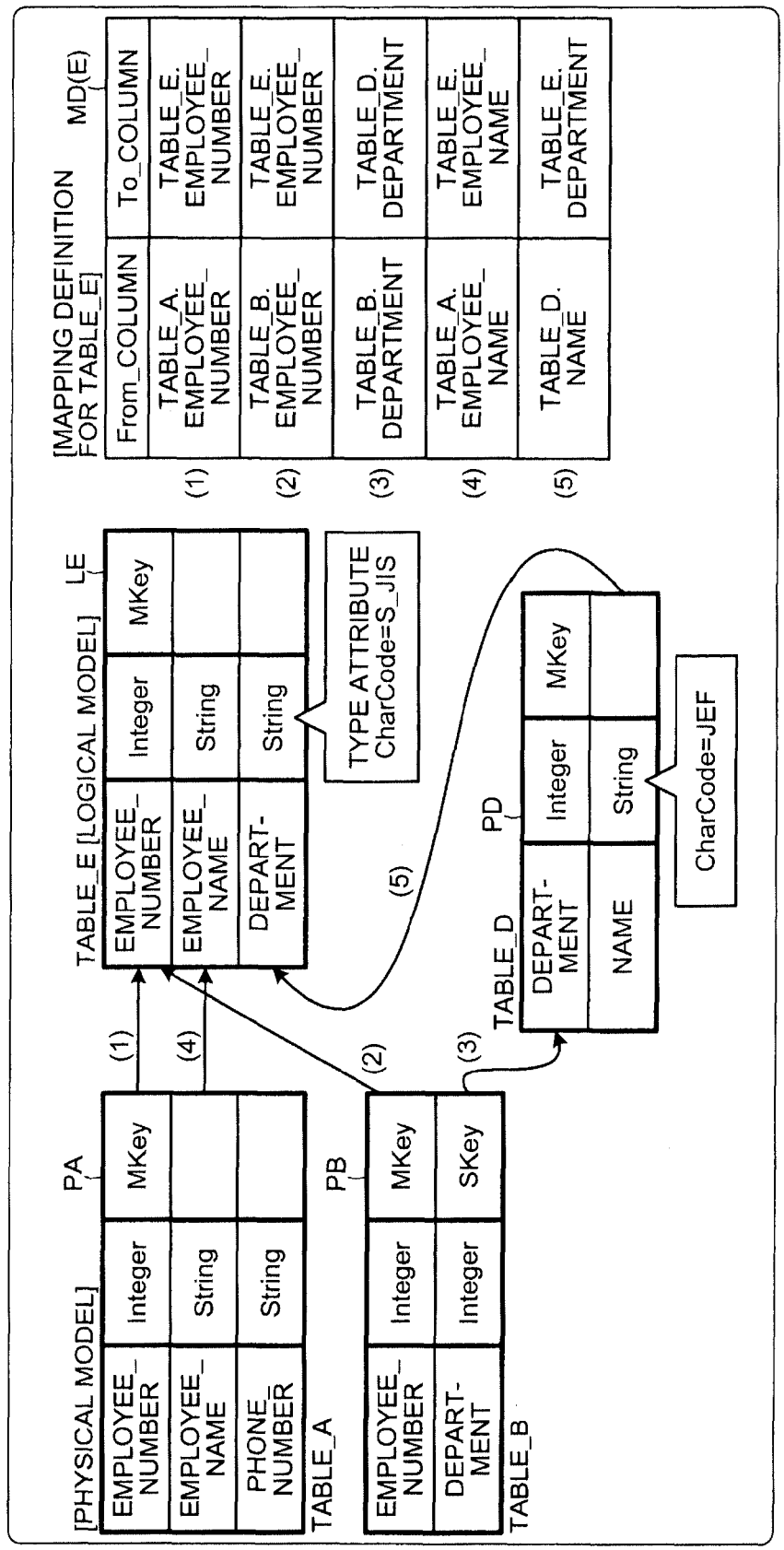

FIG. 11 is another partially magnified view of corresponding relations between the physical model P and the logical model L in FIG. 9 and depicts a magnified view of the sole definition necessary for the logical model LE. In FIG. 11, corresponding relations between the physical models PA, PB, and PD and the logical model LE is defined by the mapping definition MD(E). In FIG. 11, a parenthesized number of an arrow between the physical models PA, PB, and PD and the logical model LE corresponds to parenthesized numbers appended to each row of the mapping definition MD(E).

In the mapping definition MD(E), an attribute having a foreign key constraint (Skey) is written to a From_COLUMN item and a subordinate attribute thereto is written to a To_COLUMN item. For example, on the third row (3) of the mapping definition MD(E), the From_COLUMN item is "TABLE_B.DEPARTMENT" and the To_COLUMN item is "TABLE_D.DEPARTMENT". On the fifth row (5) of the mapping definition MD(E), the From_COLUMN item is "TABLE_D.NAME" and the To_COLUMN item is "TABLE_E.DEPARTMENT".

Hence, a department (integer type) of the physical model PB is mapped onto a department (integer type) of the physical model PD, and the name (character string type) of the mapped department (integer type) is then mapped onto a department (character string type) of the logical model LE to store the name (character string type) in the department (character string type) of the logical model LE. As a result, the department (integer type) is converted into the department (character string type) to provide the user system 122 with the converted department (character string type).

Each item may have multiple type attributes for specifying a detailed property of a data type, in addition to having the data type. Specifically, the CharCode type attribute of a name of the physical model PD as a storage origin is JEF, while the CharCode type attribute of a department of the logical model LE as a storage destination is S_JIS. In this case, a corresponding cleansing process is executed to convert the storage origin CharCode type attribute (JEF) into the storage destination CharCode type attribute (S_JIS) to store data with the converted attribute. This cleansing process is carried out as a function of the control function 102 of the integration engine 101. The function of carrying out the process is uniquely determined depending on data type, type attribute, and a combination of type attribute values.

Figure 12:
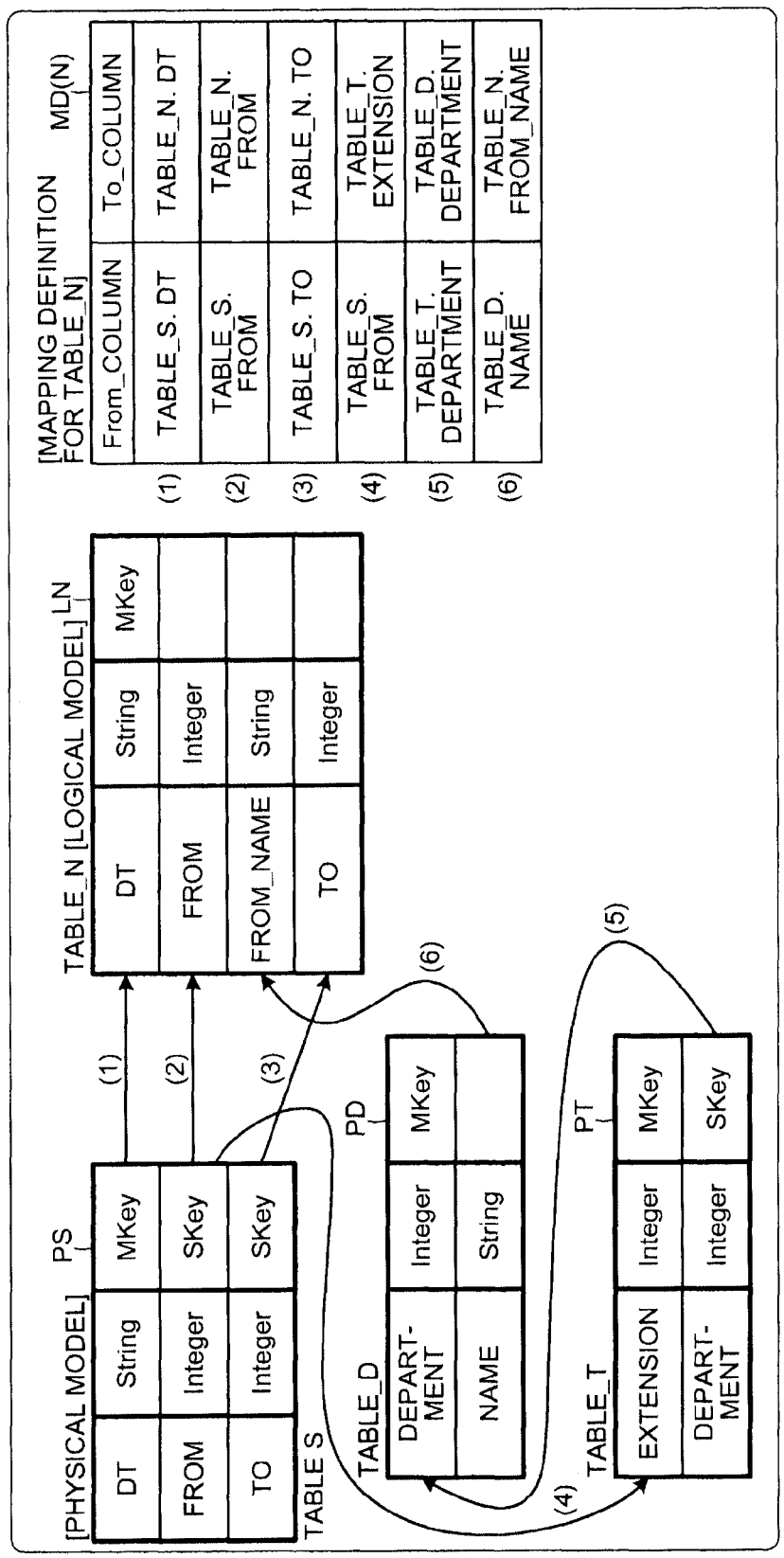

FIG. 12 is another partially magnified view of corresponding relations between the physical model P and the logical model L in FIG. 9 and depicts a magnified view of the sole definition necessary for the logical model LN. In FIG. 12, corresponding relations between the physical models PS, PD, and PT and the logical model LN are defined by the mapping definition MD(N). In FIG. 12, a parenthesized number of an arrow between the physical models PS, PD, and PT and the logical model LN corresponds to parenthesized numbers appended to each row of the mapping definition MD(N).

In the mapping definition MD(N), an attribute having a foreign key condition (Skey) is written to a From_COLUMN item and a subordinate attribute thereto is written to a To_COLUMN item. For example, on the fourth row (4) of the mapping definition MD(N), the From_COLUMN item is "TABLE_S.FROM" and the To_COLUMN item is "TABLE_T.EXTENSION". On the fifth row (5) of the mapping definition MD(N), the From_COLUMN item is "TABLE_T.DEPARTMENT" and the To_COLUMN item is "TABLE_D.DEPARTMENT". On the sixth row (6) of the same, the From_COLUMN item is "TABLE_D.NAME" and the To_COLUMN item is "TABLE_N.FROM_NAME".

Hence, FROM (integer type) of the physical model PS is mapped onto an extension (integer type) of the physical model PT, and the department (integer type) of the mapped extension (integer type) is mapped onto a department (integer type) of the physical model PD. The name (character string type) of the mapped department (integer type) is then mapped onto a FROM_NAME (character string type) of the logical model LN.

Because FROM of the data stream S represents an extension number, the department (integer type) at the extension number is identified from the physical model PT, and the identified department (integer type) is mapped onto a department (integer type) of the physical model PD to be able to specify the name of the department to which the extension represented by FROM of the data stream S belongs as a FROM_NAME and store the specified FROM_NAME in the logical model L. In this manner, an attribute (FROM_NAME) not independently present in the physical model P can be defined by the logical model L.

FIG. 13 is a diagram of an example of the description contents of the meta-information 103. The meta-information 103 starts from a meta-start tag <META-DATA> and ends at a meta-end tag </META-DATA>. The physical models PA, PB, PD, PT, and PS, the logical model LC and mapping definition MD(C), the logical model LE and mapping definition MD(E), and the logical model LN and mapping definition MD(N) (reference numerals 1301 to 1308) are written between the meta-start tag and the meta-end tag.

FIG. 14 is a diagram of the description contents of the physical model PA. The name of the physical model PA is TABLE_A. FIG. 15 is a diagram of the description contents of the physical model PB. The name of the physical model PB is TABLE_B. FIG. 16 is a diagram of the description contents of the physical model PD. The name of the physical model PD is TABLE_D. FIG. 17 is a diagram of the description contents of the physical model PT. The name of the physical model PT is TABLE_T. FIG. 18 is a diagram of the description contents of the physical model PS. The name of the physical model PS is TABLE_S.

Figure 19:
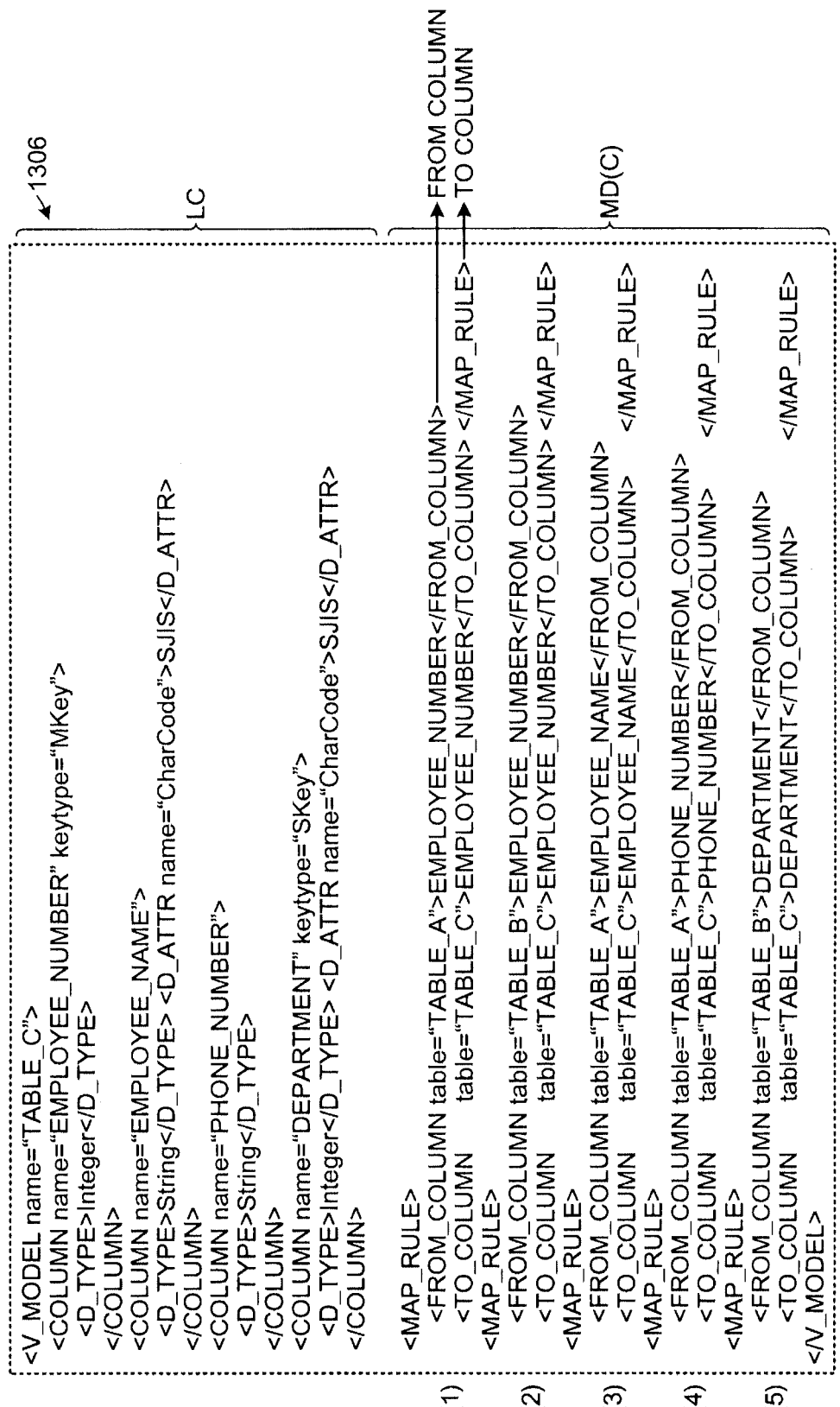
FIG. 19 is a diagram of the description contents of a logical model LC and a mapping definition MD(C).

FIG. 19 is a diagram of the description contents of the logical model LC and the mapping definition MD(C). The name of the logical model LC is TABLE_C. FIG. 20 is a diagram of the description contents of the logical model LE and the mapping definition MD(E). The name of the logical model LE is TABLE_E. FIG. 21 is a diagram of the description contents of the logical model LN and the mapping definition MD(N). The name of the logical model LN is TABLE_N.

Initialization of the meta-information 103 will be described. At initialization, the meta-information 103 is input to the integration engine 101. Integration starts from upper rows of the mapping definition included in the meta-information 103. To carry out integration properly, therefore, rows of the mapping definition MD are rearranged as needed. In the sorting process, an evaluation point is used.

FIG. 22 is a diagram of the contents of an evaluation point table. The evaluation point table stores therein evaluation points for evaluating the From_COLUMN and the To_COLUMN on each row of the mapping definition MD. Rows of the mapping definition MD are sorted in descending order. The order of integration is determined according to the result of the sorting process on the mapping definition MD.

Figure 23:
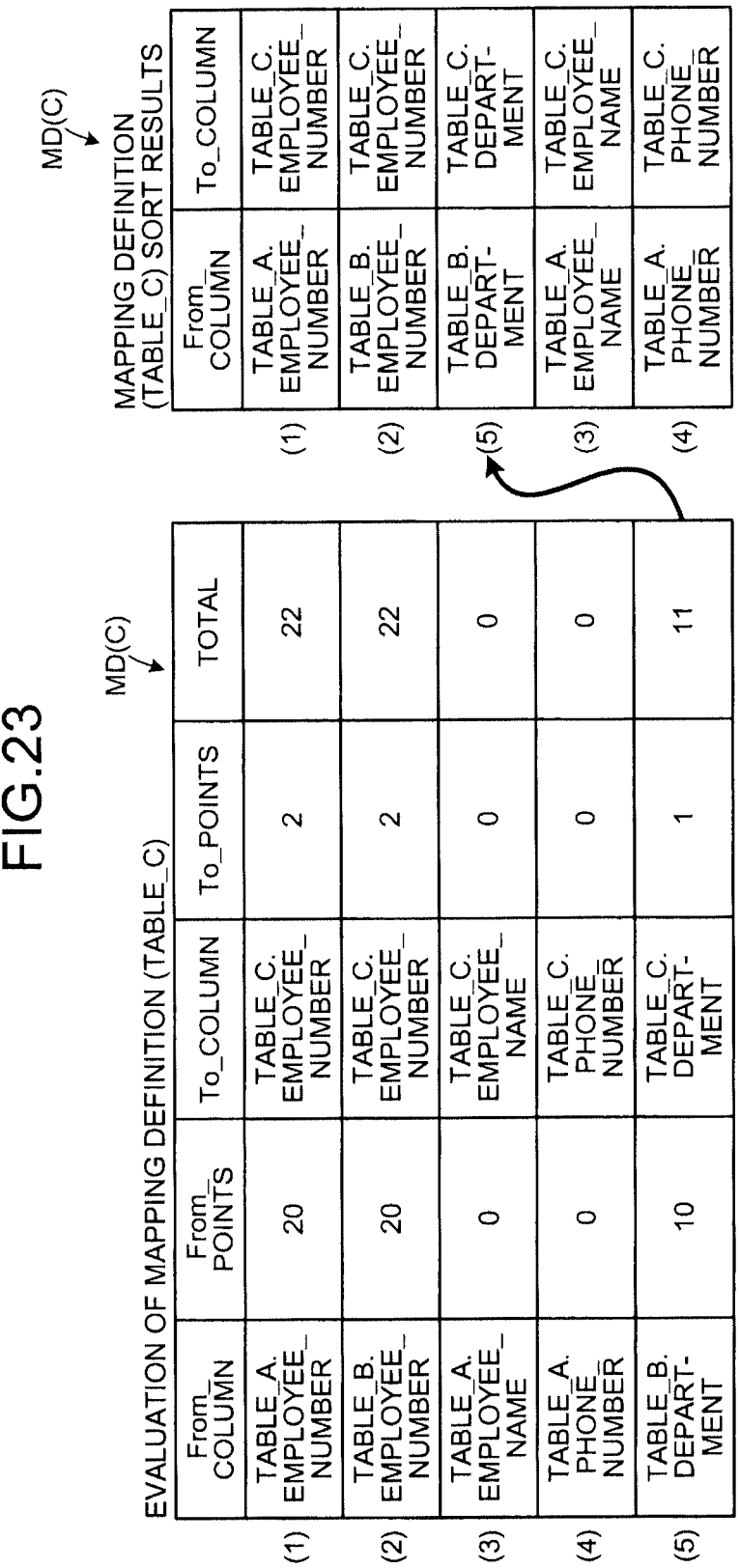
Figure 25:
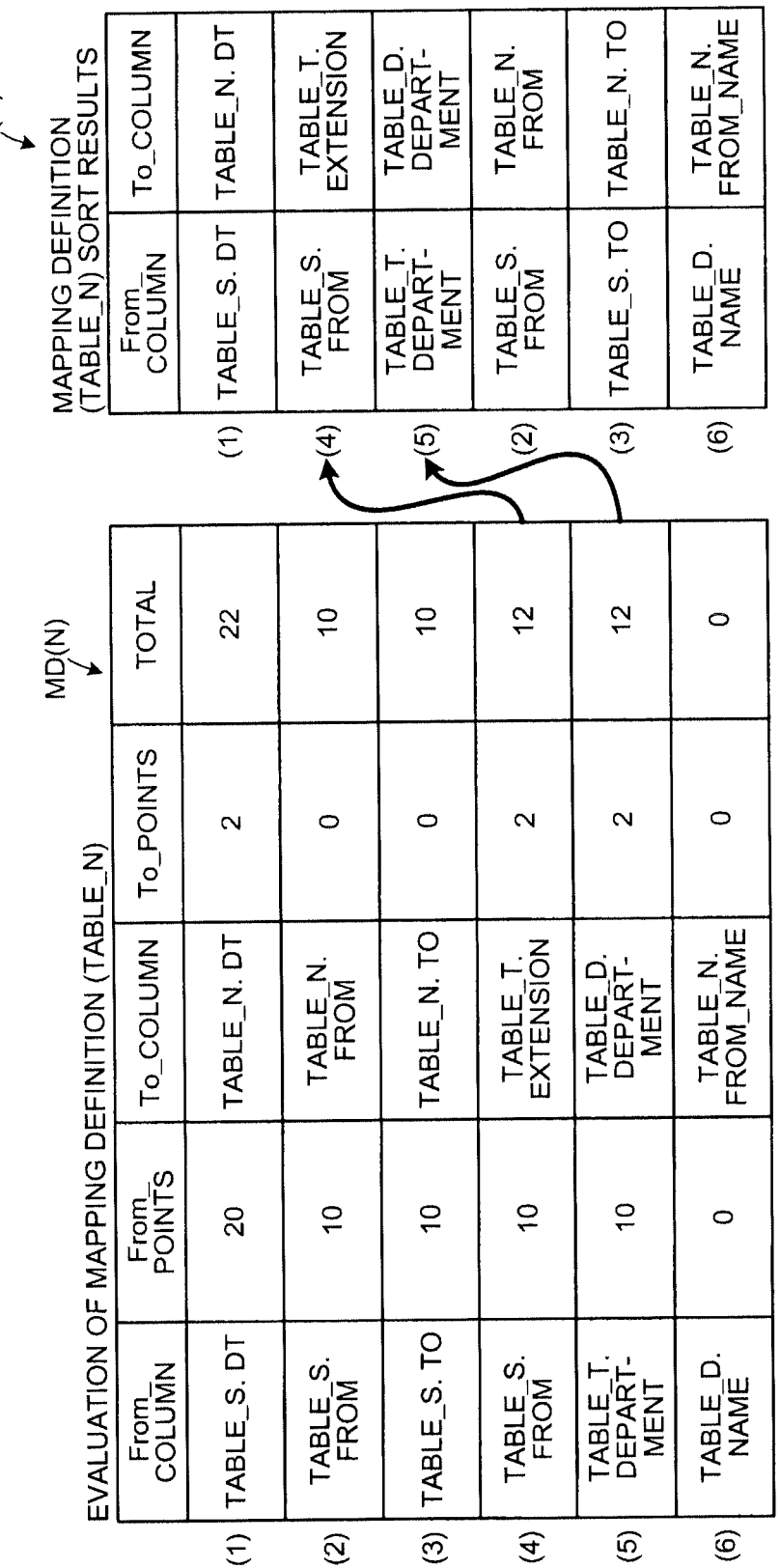

FIGS. 23 to 25 are diagrams of the mapping definition MD before and after the sorting process. In FIGS. 23 to 25, From_COLUMNs and To_COLUMNS of the mapping definition are evaluated according to the evaluation point table, and points are totaled line by line. Rows are then sorted in descending order of points.

Pre-setting will be described. Pre-setting is a process of allocating actual data present in the source-side 110 to the physical model P and allocating a storage location entity present in the user system 120 and an accessing unit for access to the entity to the logical model. Pre-setting is carried out according to pre-setting information provided for each physical model P or each logical model L. Allocating a meta-definition, an entity, and an accessing unit as pre-setting upon executing integration enables separation of the meta-definition from a specific entity. This offers an effect of improving the versatility (reusability) of the meta-definition. For example, the same meta-definition allows use of entities of various properties, such as RDB, CSV file, and XML file, when pre-setting information is replaced.

Figure 26:
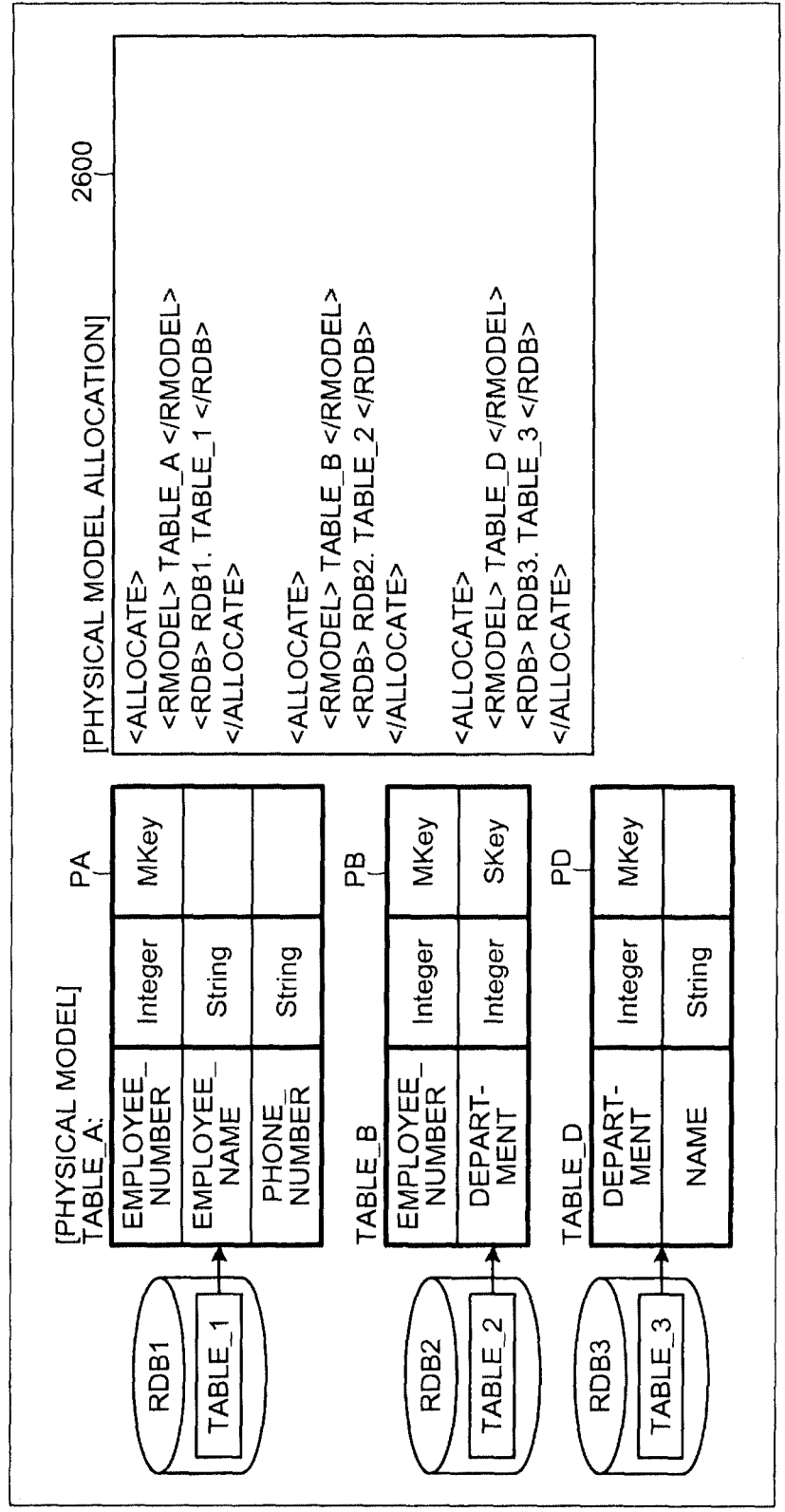
FIGS. 26 and 27 are diagrams of examples of pre-setting information.

FIG. 26 is a diagram of an example of pre-setting information. The pre-setting information 2600 allocates the physical models PA, PB, and PD to actual data in the source-side 110. Specifically, according to pre-setting information 2600, the physical model PA is allocated as a TABLE_1 of a relational database (RDB) 1 managed by the information source system 111. Similarly, the physical model PB is allocated as a TABLE_2 of an RDB 2 managed by the information source system 112, and the physical model PD is allocated as a TABLE_3 of an RDB 3 managed by the information source system 112.

Figure 27:
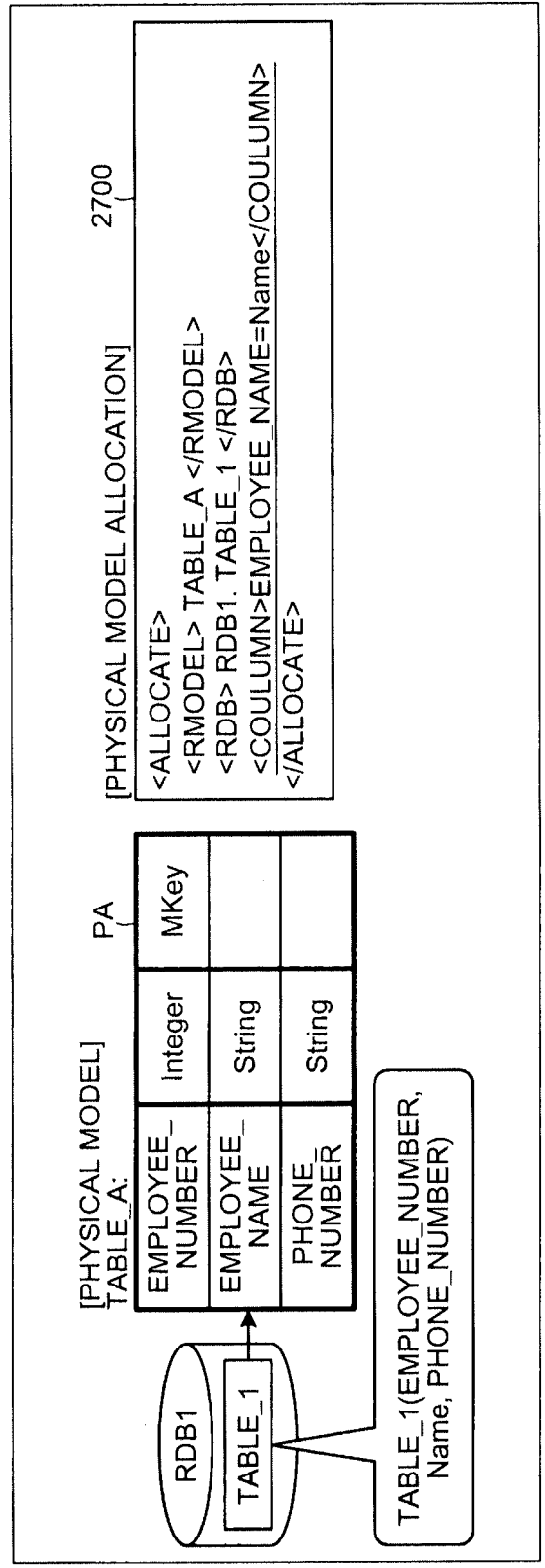

FIG. 27 is a diagram of another example of pre-setting information. Pre-setting information 2700 depicted in FIG. 27 is an example of adding to the pre-setting information 2600 depicted in FIG. 26, description concerning allocation for the TABLE_A. According to the pre-setting information 2700, the physical model P and actual data use different attribute names for the same attribute (EMPLOYEE_NAME and Name). "EMPLOYEE_NAME=Name" is, therefore, added as depicted by the underlined part in FIG. 27. When physical integration is carried out, pre-setting for the logical model depicted in FIG. 28 or FIG. 29 is also necessary.

Figure 28:
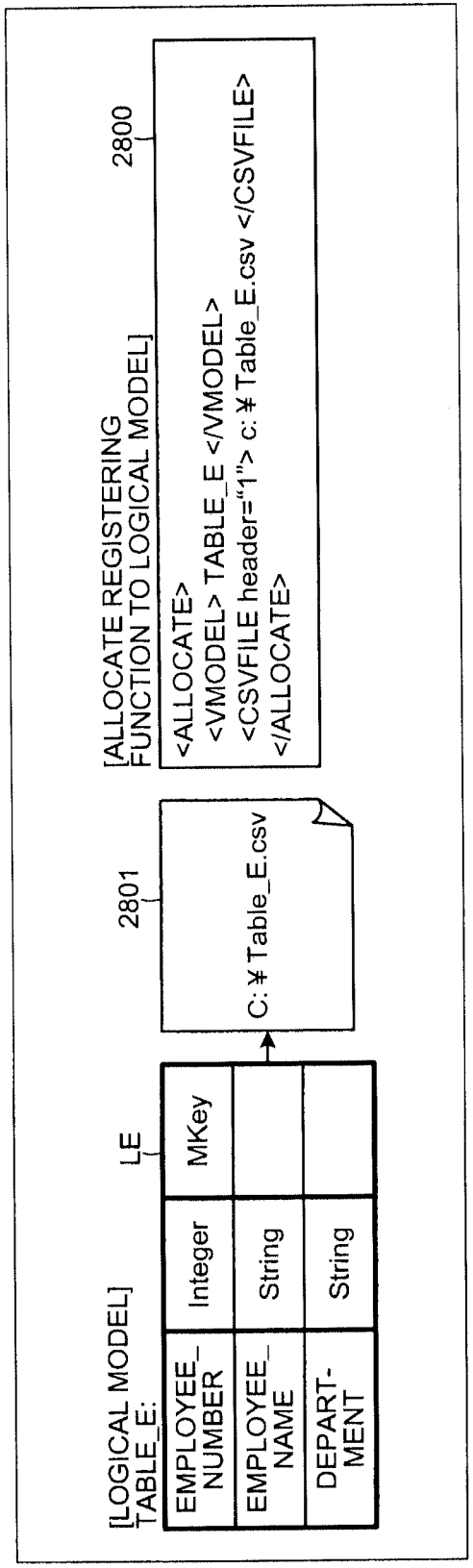
FIGS. 28 and 29 are diagrams of examples of pre-setting for allocating a registering function 141 to the logical model LE.

FIG. 28 is a diagram of an example of pre-setting for allocating the registering function 141 to the logical model LE. Pre-setting information 2800 depicted in FIG. 28 allocates the logical model LE to the registering function 141. In FIG. 28, "C:\TABLE-E.csv", which is comma separated value (CSV) information 2801, is allocated as a data output destination of the logical model LE.

<CSVFILE> tag of the pre-setting information 2800 indicates the type of the registering function 141 and is capable of separately specifying an attribute. For example, the header attribute (header) of the <CSVFILE> tag indicates that a schema header is given (1) or is not given (0) to the head line of the CSV information 2801.

Figure 29:
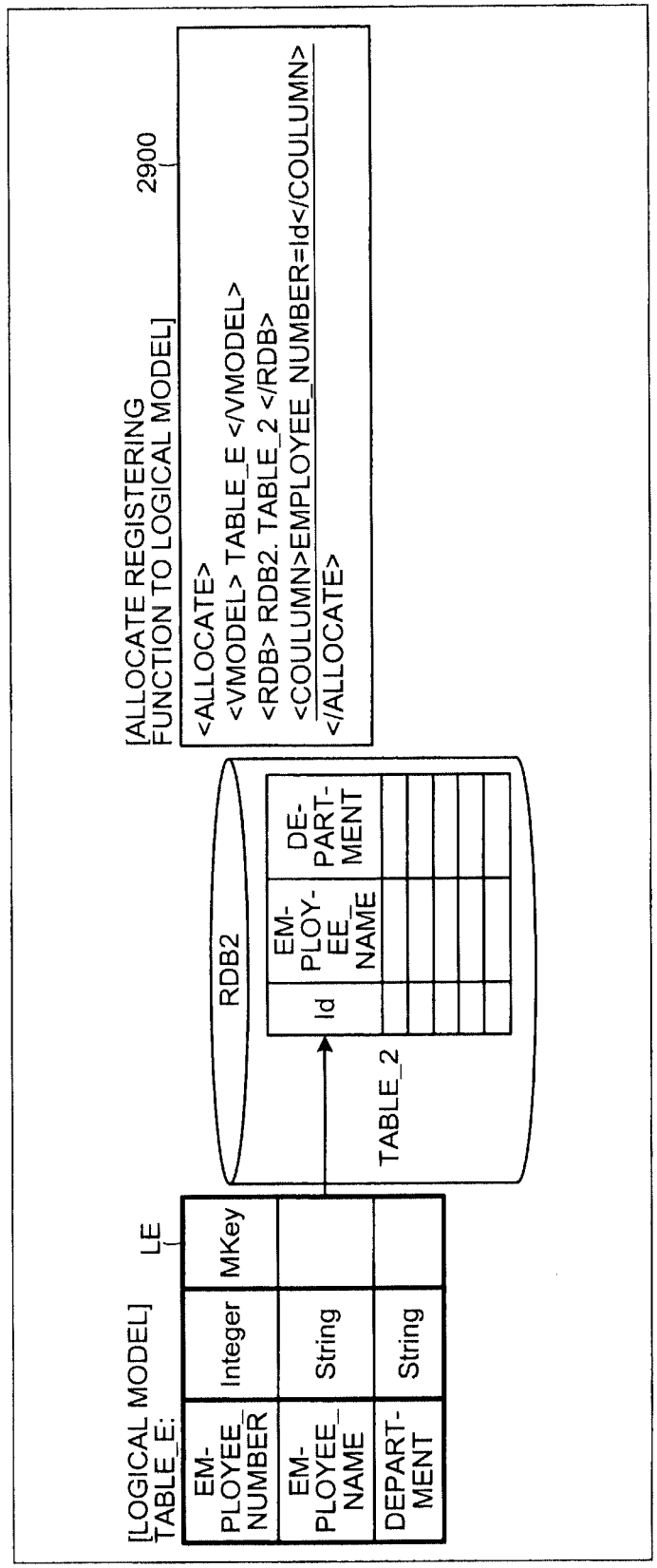

FIG. 29 is a diagram of another example of pre-setting for allocating the registering function 141 to the logical model LE. Pre-setting information 2900 depicted in FIG. 29 allocates the logical model LE to the TABLE_2 managed by the RDB 2 of the user system 121. When the logical model L and actual data use different attribute names for the same attribute (EMPLOYEE_NUMBER and Id), "EMPLOYEE_NUMBER=Id" is added as depicted by the underlined part in FIG. 29.

Figure 30:
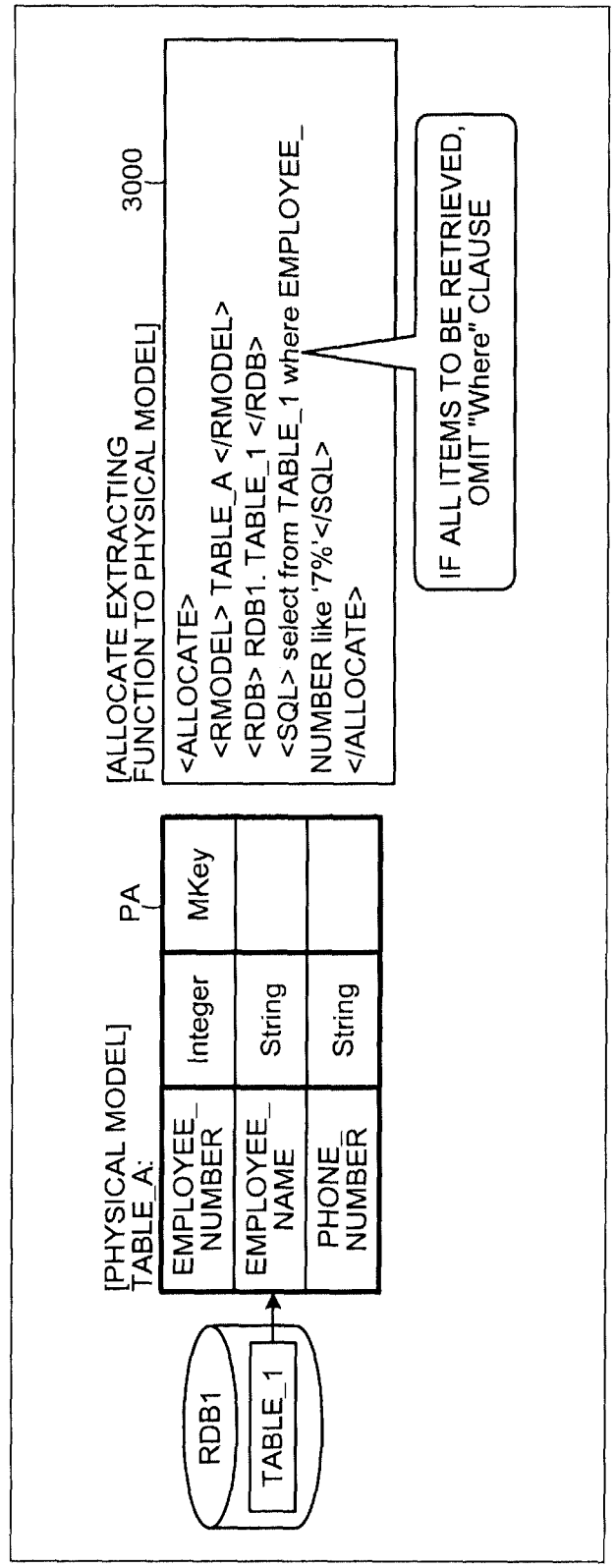
FIG. 30 is a diagram of an example of pre-setting for allocating an extracting function 131 to the physical model PA.

FIG. 30 is a diagram of an example of pre-setting for allocating the extracting function 131 to the physical model PA. Pre-setting information 3000 depicted in FIG. 30 allocates the physical model PA to the TABLE_1 managed by the RDB 1 of the user system 111. The extracting function 131 for physical integration enables specification of an extraction condition using a <SQL (structured query language)> tag. When an extraction condition is specified to extract all data as process subjects, a where clause is omitted.

Figure 31:
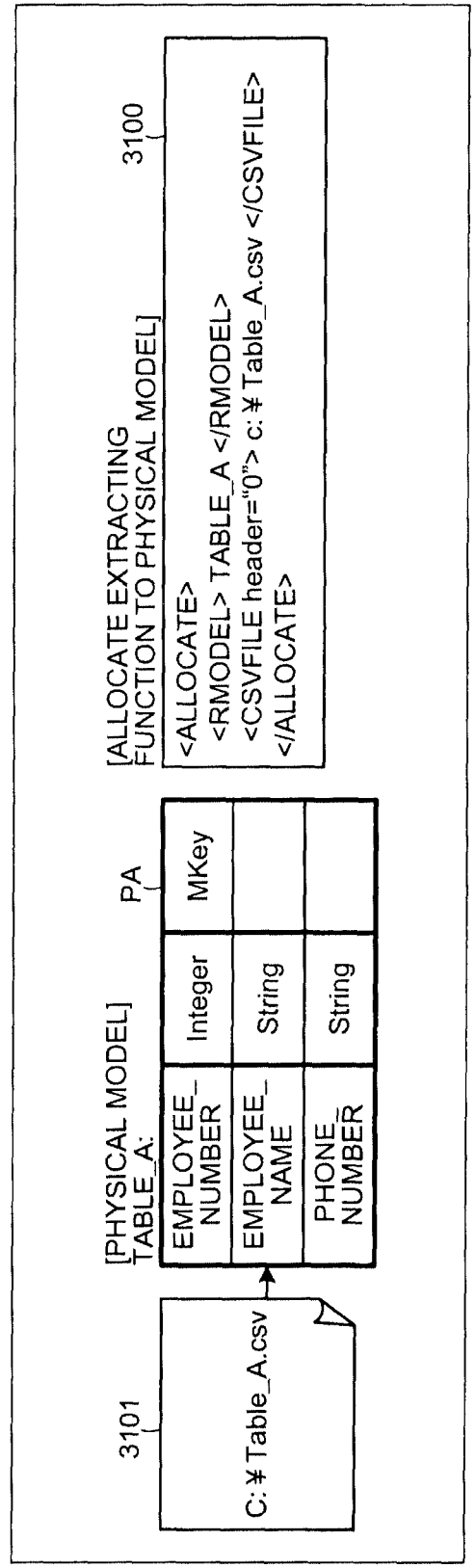
FIGS. 31 and 32 are diagrams of other examples of pre-setting for allocating the extracting function 131 to the physical model PA.
Figure 32:
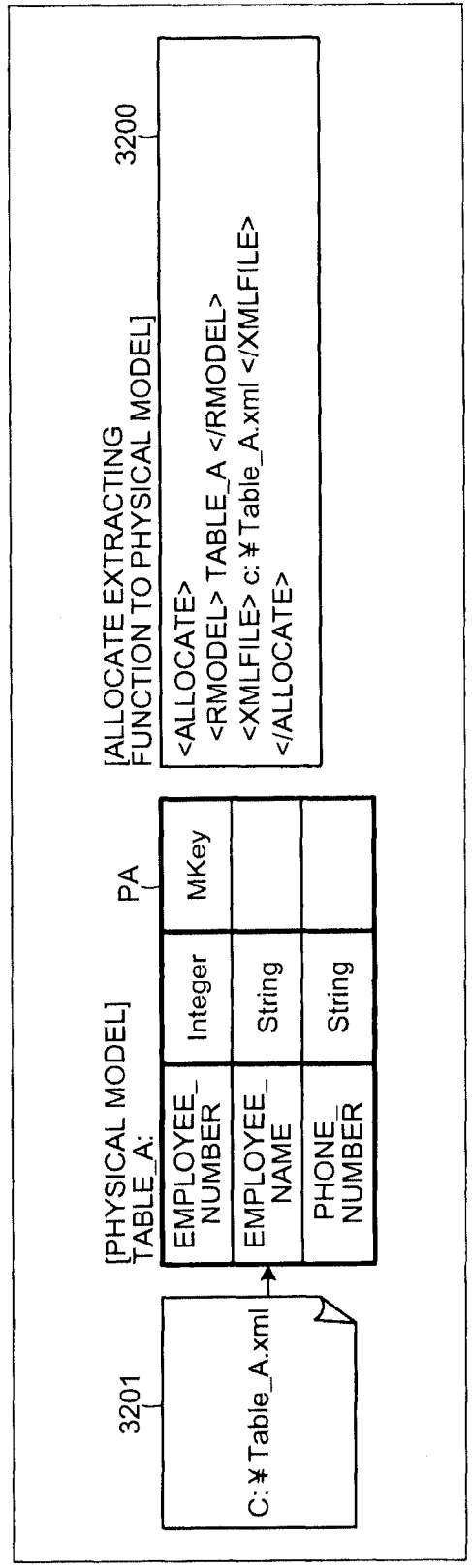

FIGS. 31 and 32 are diagrams of other examples of pre-setting for allocating the extracting function 131 to the physical model PA. Pre-setting information 3100 depicted in FIG. 31 allocates the physical model PA to CSV information 3101, and pre-setting information 3200 depicted in FIG. 32 allocates the physical model PA to extensible markup language (XML) information 3201.

Figure 33:
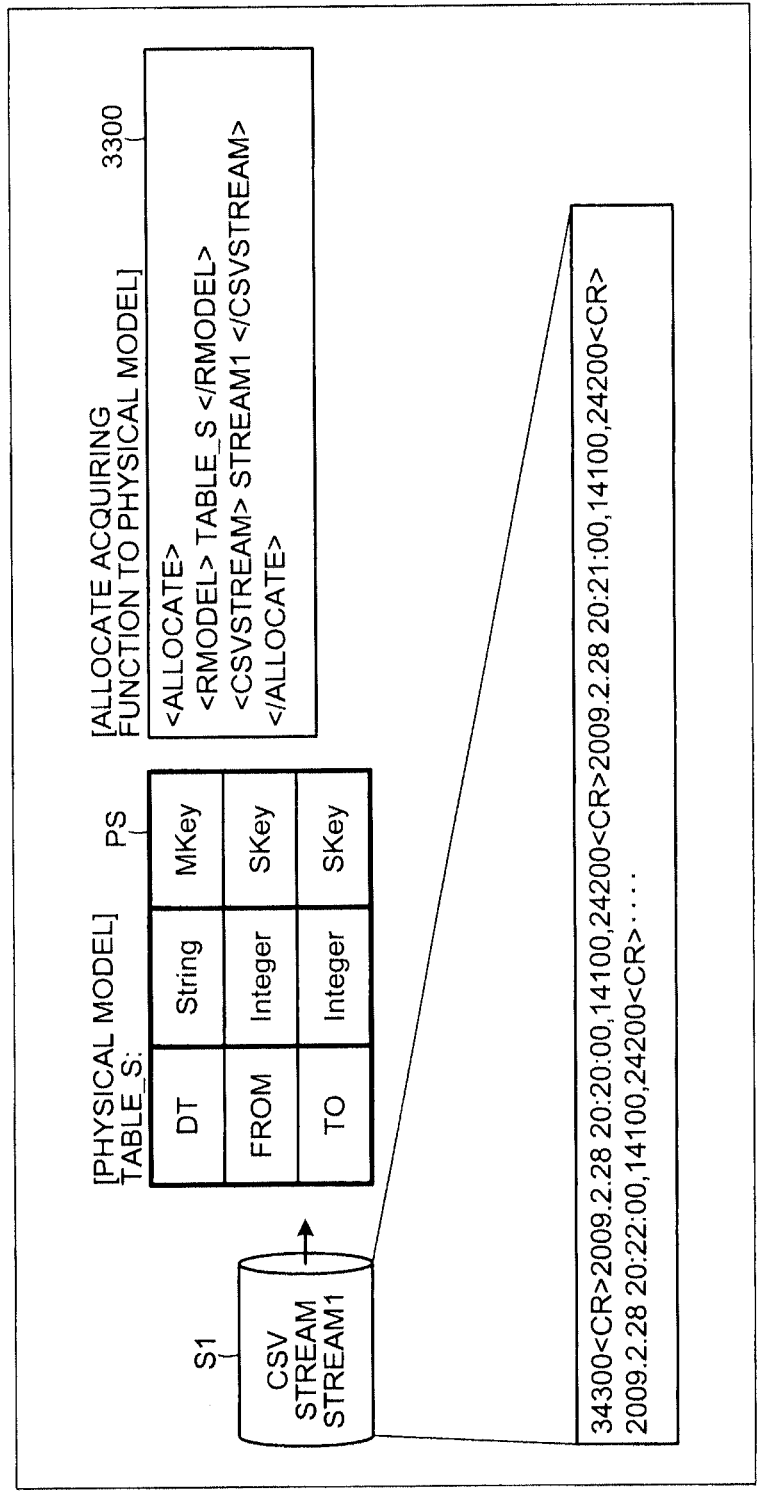
FIGS. 33 and 34 are diagrams of examples of pre-setting for allocating the PULL-type acquiring function 133 or the PUSH-type acquiring function 134 to the physical model PS.

FIG. 33 is a diagram of an example of pre-setting for allocating the PULL-type acquiring function 133 or the PUSH-type acquiring function 134 to the physical model PS. Pre-setting information 3300 depicted in FIG. 33 allocates the PULL-type acquiring function 133 or the PUSH-type acquiring function 134 for acquiring stream data from a CSV stream (STREAM 1), which is a data stream S1, to the physical model PS.

Figure 34:
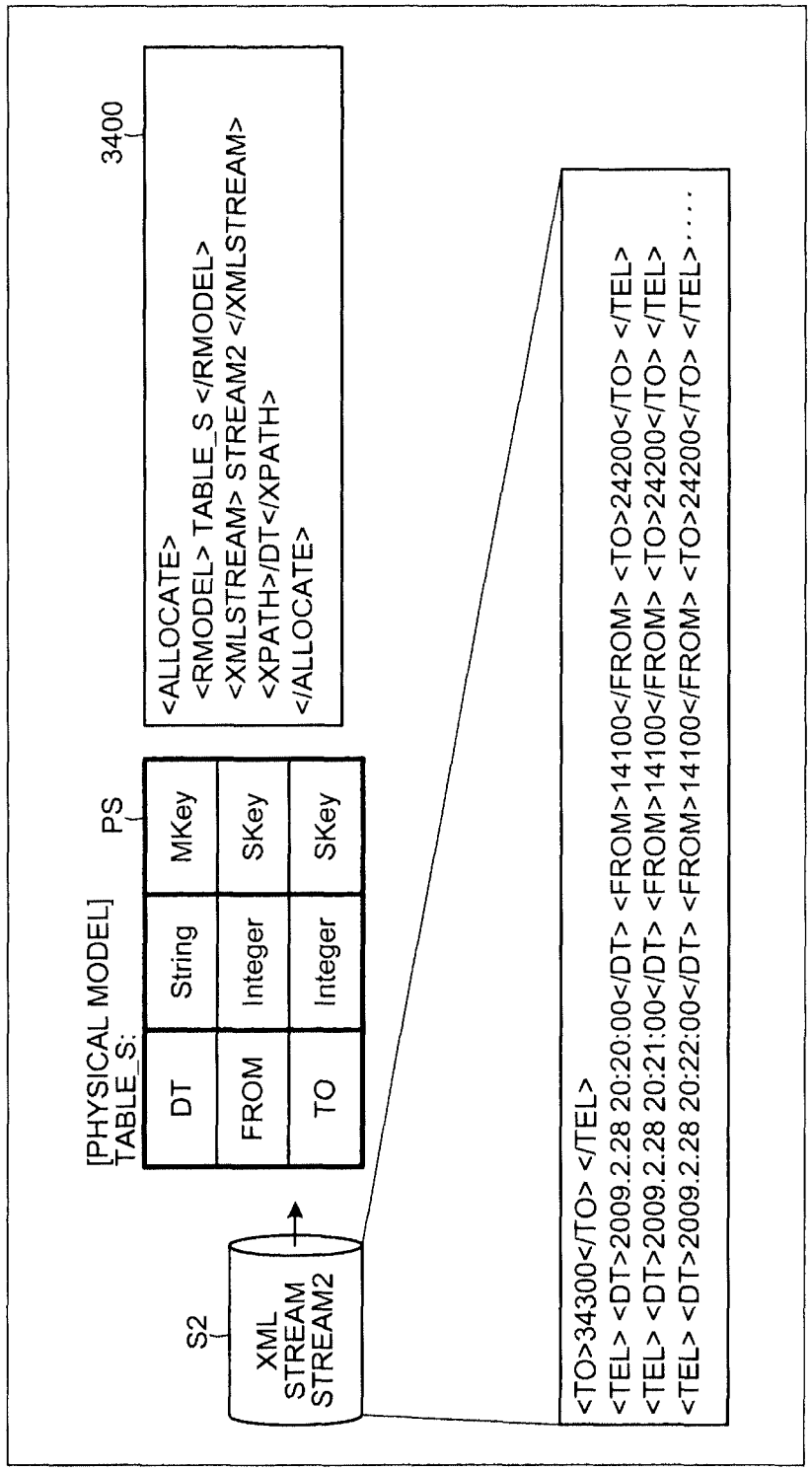

FIG. 34 is an explanatory diagram of another example of pre-setting for allocating the PULL-type acquiring function 133 or the PUSH-type acquiring function 134 to the physical model PS. Pre-setting information 3400 depicted in FIG. 34 allocates the PULL-type acquiring function 133 or the PUSH-type acquiring function 134 for acquiring stream data from a XML stream (STREAM 2), which is a data stream S2, to the physical model PS.

Figure 35:
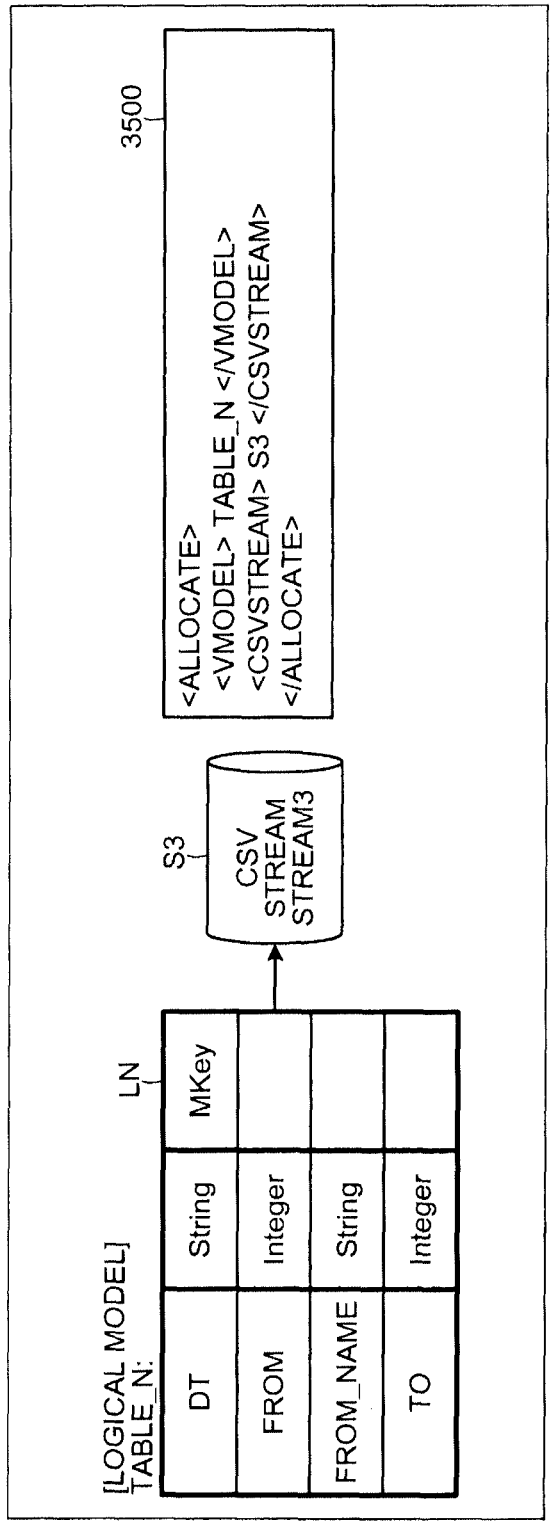
FIGS. 35 and 36 are diagrams of examples of pre-setting for allocating to the logical model LN.

FIG. 35 is a diagram of an example of pre-setting for allocating to the logical model LN, the send-out function 143 for sending out data stream. Pre-setting information 3500 depicted in FIG. 35 allocates a CSV stream (STREAM 3), which is a data stream S3, as an output destination of the logical model LN.

Figure 36:
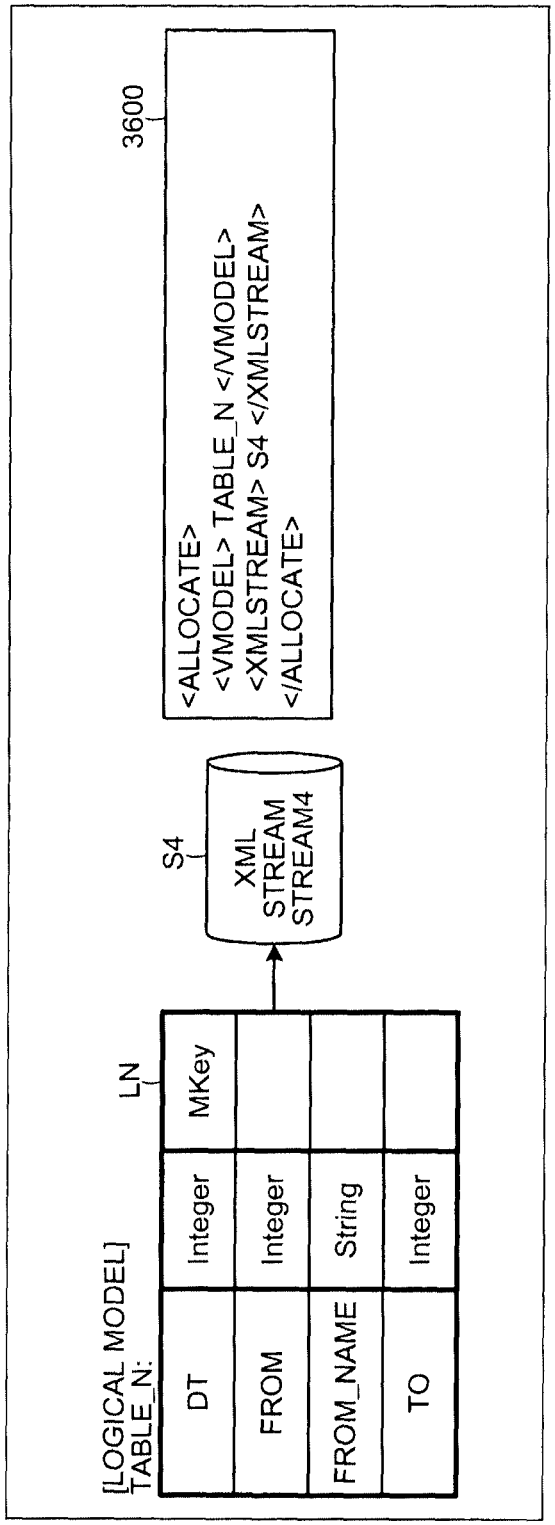

FIG. 36 is an explanatory diagram of another example of pre-setting for allocating to the logical model LN, the send-out function 143 for sending out data stream. Pre-setting information 3600 depicted in FIG. 36 allocates an XML stream (STREAM 4), which is a data stream S4, as an output destination of the logical model LN.

Integration instruction will be described. Integration instruction is a process of instructing the integration engine 101 on which integration (physical integration, virtual integration, and stream integration) to carry out. Integration instruction will hereinafter be described with reference to FIGS. 37 to 39.

FIG. 37 is a diagram of an example of physical integration instruction information 3700. The physical integration instruction information 3700 describes an instruction to extract all information present in the physical model PA and return an integration result as data of the logical model LE. This means that the integration result is registered to a file or a database allocated to the logical model LE or is sent out to a data stream allocated to the logical model LE. An extraction condition may be specified using a where clause.

FIG. 38 is a diagram of an example of virtual integration instruction information 3800. The virtual integration instruction information 3800 describes an instruction to return a result of retrieval on the logical model LE under a condition of "EMPLOYEE_NUMBER=7002".

FIG. 39 is a diagram of an example of stream integration instruction information 3900. The stream integration instruction information 3900 describes an instruction to return an integration result during a period of 20:20 to 20:22 on data corresponding to "TO=24200" from the data stream S allocated to the physical model PS, as data of the logical model LN. This means that the integration result is sent out to a data stream allocated to the logical model LN or is registered to a file and a database allocated to the logical model LN.

Figure 40:
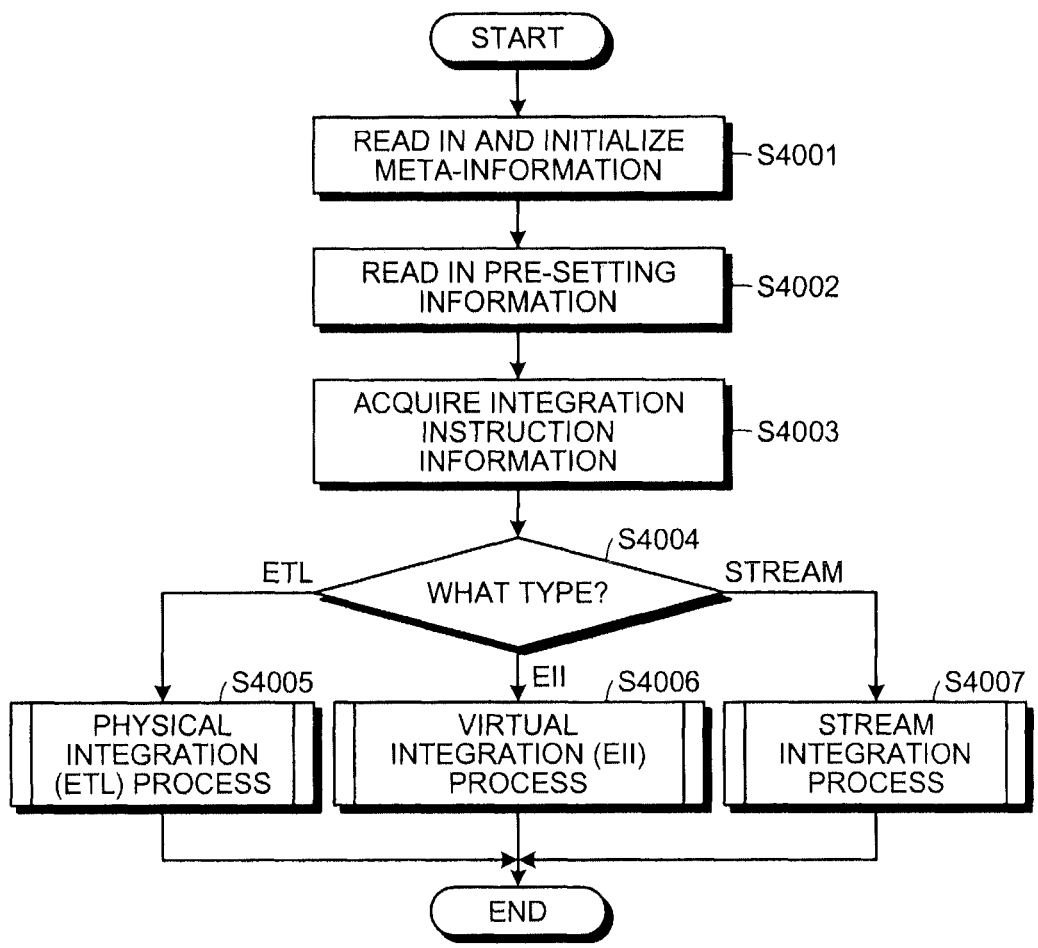
FIG. 40 is a flowchart of an integration procedure by an integration engine 101.

FIG. 40 is a flowchart of an integration procedure by the integration engine 101. The integration engine 101 reads in and initializes the meta-information 103 (step S4001). The integration engine 101 reads in pre-setting information (step S4002), and acquires integration instruction information (step S4003).

Subsequently, the type of the integration instruction information is determined (step S4004). The type may be determined based on the start tags of the integration instruction information 3700 to 3900 depicted in FIGS. 37 to 39. If the type of the integration instruction information 3700 to 3900 is physical integration (step S4004: ETL), a physical integration process is executed (step S4005). If the type of the integration instruction information 3700 to 3900 is virtual integration (step S4004: EII), a virtual integration process is executed (step S4006).

If the type of the integration instruction information 3700 to 3900 is stream integration (step S4004: STREAM), a stream integration process is executed (step S4007). A series of processes are then ended.

Figure 41:
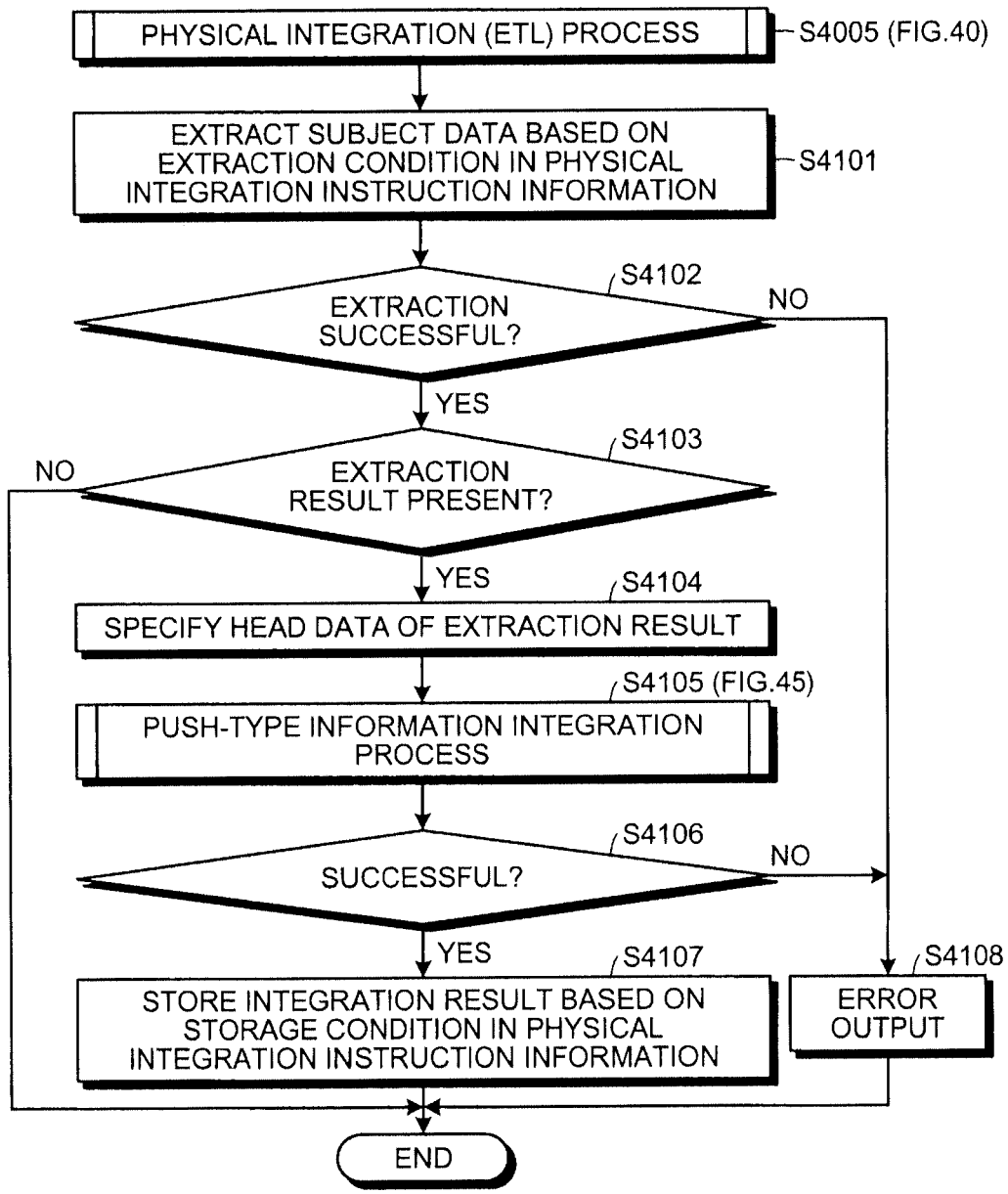
FIG. 41 is a flowchart of a detailed procedure of a physical integration process (step S4005) depicted in FIG. 40.

FIG. 41 is a flowchart of a detailed procedure of the physical integration process (step S4005) depicted in FIG. 40. Subject data is extracted from the source-side 110, based on an extraction condition in the integration instruction information 3700 (step S4101).

Whether extraction of the subject data is successful is then determined (step S4102). If the extraction results in failure (step S4102: NO), the procedure proceeds to step S4108, at which error output is carried out (step S4108). If the extraction is successful (step S4102: YES), whether an extraction result is present is determined (step S4103). If an extraction result is not present (step S4103: NO), the procedure is ended. If an extraction result is present (step S4103: YES), the head data of the extraction result is specified (step S4104). In information A that is the result of extraction from the TABLE_A in the RDB 1 depicted in FIG. 59, "EMPLOYEE_NUMBER=7001", which is the head item in the first record, is specified.

Subsequently, a PUSH-type information integration process is executed (step S4105). The PUSH-type information integration process is the process of inputting integration subject data from the source-side 110 in the form of the physical model P and executing a necessary integration process on the subject data to output an integration result from the logical model L to the user-side 120. Details of the PUSH-type information integration process (step S4105) will be described later with reference to FIG. 45. Whether the PUSH-type information integration process is successful is determined (step S4106).

If the PUSH-type information integration process results in failure (step S4106: NO), the procedure proceeds to step S4108, at which error output is carried out. If the PUSH-type information integration process is successful (step S4106: YES), an integration result is stored based on a storage condition in the physical integration instruction information 3700 (step S4107). In the integration result storage process (step S4107), if an output destination allocated to the logical model L by pre-setting information is a file or database, the registering function 141 registers the integration result to the file or database. If the output destination is allocated to a data stream, however, the send-out function 143 sends out the integration result to the data stream. The physical integration process (step S4005) is then ended.

Figure 42:
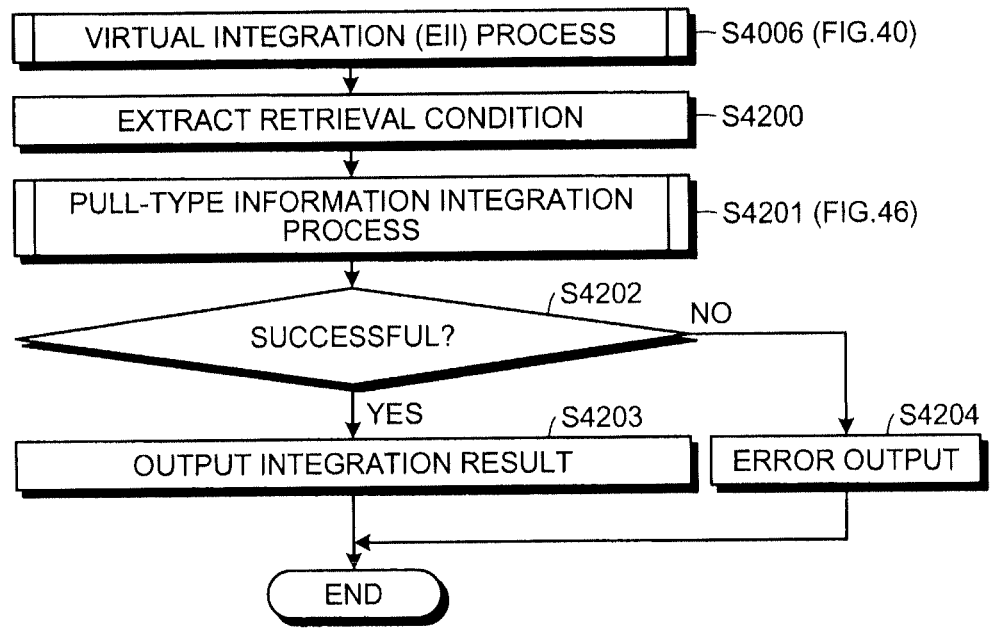
FIG. 42 is a flowchart of a detailed procedure of a virtual integration process (step S4006) depicted in FIG. 40.

FIG. 42 is a flowchart of a detailed procedure of the virtual integration process (step S4006) depicted in FIG. 40. In the virtual integration process (step S4006), a retrieval condition is extracted from the integration instruction information 3800 (step S4200). Specifically, for example, retrieval expressions specified by start tags <EII> of integration instruction information 3700 to 3900 are extracted as retrieval conditions. A PULL-type information integration process is then executed (step S4201). Whether the PULL-type information integration process (step S4201) is successful is then determined (step S4202).

If the PULL-type information integration process is successful (step S4202: YES), data acquired by the PULL-type information integration process (step S4201) is output as an integration result (step S4203). If the PULL-type information integration process results in failure (step S4202: NO), error output is carried out (step S4204). The virtual integration process (step S4006) is then ended.

Figure 43:
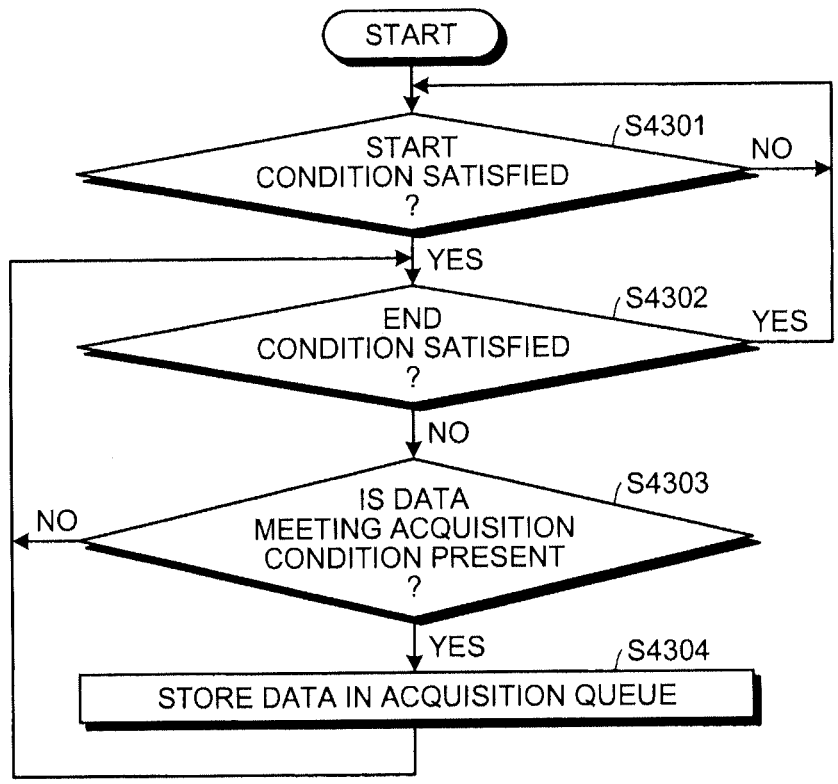
FIG. 43 is a flowchart of a data stream monitoring procedure.

FIG. 43 is a flowchart of a data stream monitoring procedure. A stand-by mode is maintained until a given start condition (e.g., time) is satisfied (step S4301: NO). When the condition is satisfied (step S4301: YES), whether an end condition (e.g., time) is satisfied is determined (step S4302).

If the condition is not satisfied (step S4302: NO), whether data meeting an acquisition condition (stream data sd) is present in the data stream S (phone call system) is determined (step S4303). An arbitrary acquisition condition can be set, under which, for example, all stream data sd may be data to be acquired or stream data sd having a transmission origin/transmission destination of a specific extension may be data to be acquired.

If data meeting the acquisition condition is not present (step S4303: NO), the procedure returns to step S4302. If data meeting the acquisition condition is present (step S4303: YES), the data meeting the acquisition condition is stored in an acquisition queue (step S4304), after which the procedure returns to step S4302. When the end condition is satisfied (step S4302: YES), the procedure returns to step S4301, at which stand-by mode is maintained until satisfaction of the start condition.

Figure 44:
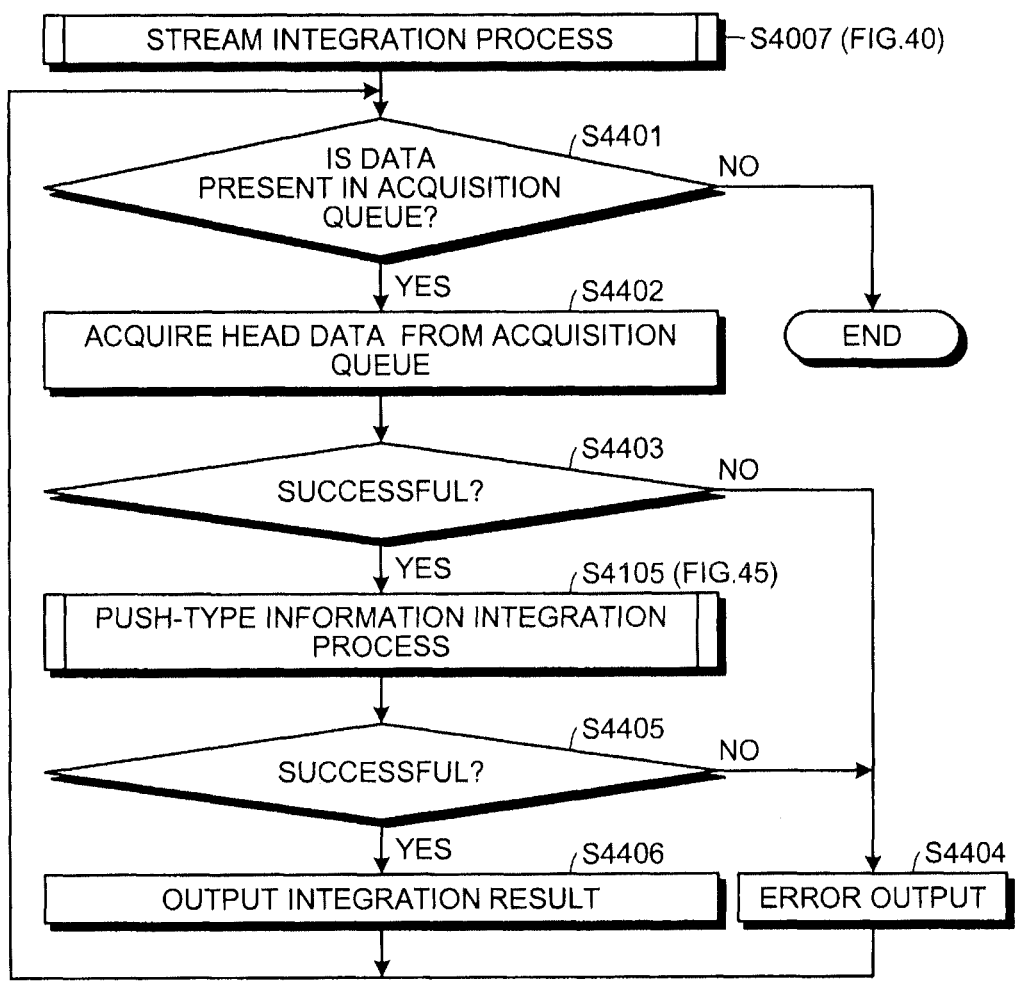
FIG. 44 is a flowchart of a detailed procedure of a stream integration process (step S4007) depicted in FIG. 40.

FIG. 44 is a flowchart of a detailed procedure of the stream integration process (step S4007) depicted in FIG. 40. Whether data is present in the acquisition queue is determined (step S4401). If data is present (step S4401: YES), the head data is acquired from the acquisition queue (step S4402). If head data acquisition results in failure (step S4403: NO), error output is carried out (step S4404), after which the procedure returns to step S4401. If head data acquisition proves successful (step S4403: YES), the PUSH-type information integration process is executed (step S4105).

If the PUSH-type information integration process (step S4105) results in failure (step S4405: NO), error output is carried out (step S4404), after which the procedure returns to step S4401.

If the PUSH-type information integration process (step S4105) is successful (step S4405: YES), data acquired by the PUSH-type information integration process (step S4105) is output as an integration result (step S4406), after which the procedure returns to step S4401. In the integration result output process (step S4406), when an output destination allocated to the logical model L by pre-setting information is allocated to a data stream, the integration result is sent out to the data stream by the send-out function 143. When the output destination is allocated to a file or database, the integration result is registered to the file or database by the registering function 141. If data is not present in the acquisition queue at step S4401 (step S4401: NO), the stream integration process (step S4007) is ended.

In this manner, in the physical integration process and the stream integration process, the PUSH-type information integration process (step S4105) is executed in common. The physical integration process and the stream integration process, therefore, can be realized by the same processing system (integration engine 101).

Figure 45:
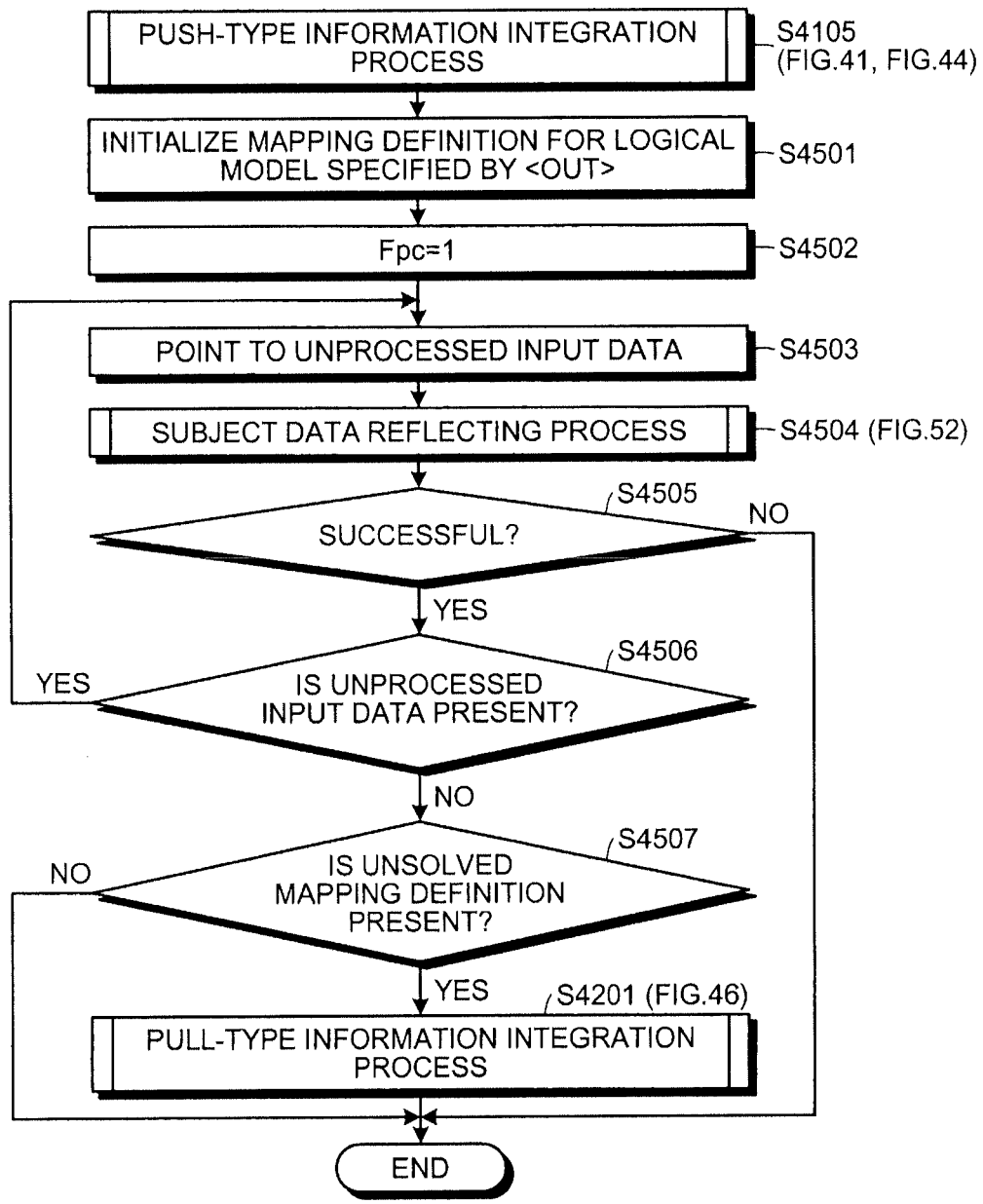
FIG. 45 is a flowchart of a detailed procedure of the PUSH-type information integration process (step S4105) depicted in the FIGS. 41 and 44.

FIG. 45 is a flowchart of a detailed procedure of the PUSH-type information integration process (step S4105) depicted in the FIGS. 41 and 44. The mapping definition MD for the logical model L specified by an <OUT> tag of acquired integration instruction information is initialized (step S4501). Specifically, the mapping definition MD for the logical model L specified by the <OUT> tag is acquired and solution flags are cleared. Solution flags for items to be solved are then set to "1" in all physical models P specified by an <IN> tag in the integration instruction information.

Subsequently, a PUSH call flag Fpc is set to 1 (step S4502). The PUSH call flag Fpc is a flag for indicating in the PULL-type information integration process (step S4201), the mapping definitions MD that have been initialized at step S4501. If Fpc=1, the mapping definition MD has been initialized.

Unprocessed input data is pointed to (step S4503), and a subject data reflecting process is executed (step S4504). For example, when the TABLE_B is pointed to as input data, the subject data reflecting process is carried out on the TABLE_B. The subject data reflecting process (step S4504) is a process of copying a data item of which an integration result can be reflected on the logical model, i.e., among data items included in input subject data, a data item with a solution flag of "1" is reflected onto the logical model L according to data corresponding to one physical model input in the PUSH-type information integration process.

Subsequently, whether the subject data reflecting process (step S4504) is successful is determined (step S4505). If the subject data reflecting process results in failure (Step S4505: NO), the PULL-type information integration process is not executed, and the PUSH-type information integration process (step S4105) is ended as a failure. If the subject data reflecting process is successful (step S4505: YES), whether input data corresponding to an unprocessed physical model is present is checked (step S4506). If unprocessed input data is present (step S4506: YES), the procedure returns to step S4503, at which the unprocessed input data is processed.

If unprocessed input data is not present (step S4506: NO), whether an unsolved mapping definition (strictly speaking, mapping definition having a terminal column, which will be described later, on the FROM column) is present is checked (step S4507). If an unsolved mapping definition is present (step S4507: YES), the PULL-type information integration process is executed (step S4201). The PUSH-type information integration process (step S4105) is then ended. If an unsolved mapping definition is not present (step S4507: NO), the procedure is ended.

In this manner, in the PUSH-type information integration process (step S4105), when input data alone is insufficient as information, the PULL-type information integration process (step S4201) is called up. In the physical integration process, the virtual integration process, and the stream integration process, therefore, the PULL-type information integration process (step S4201) can be executed in common. As a result, the physical integration process, the virtual integration process, and the stream integration process can be realized by the same processing system (integration engine 101).

Figure 46:
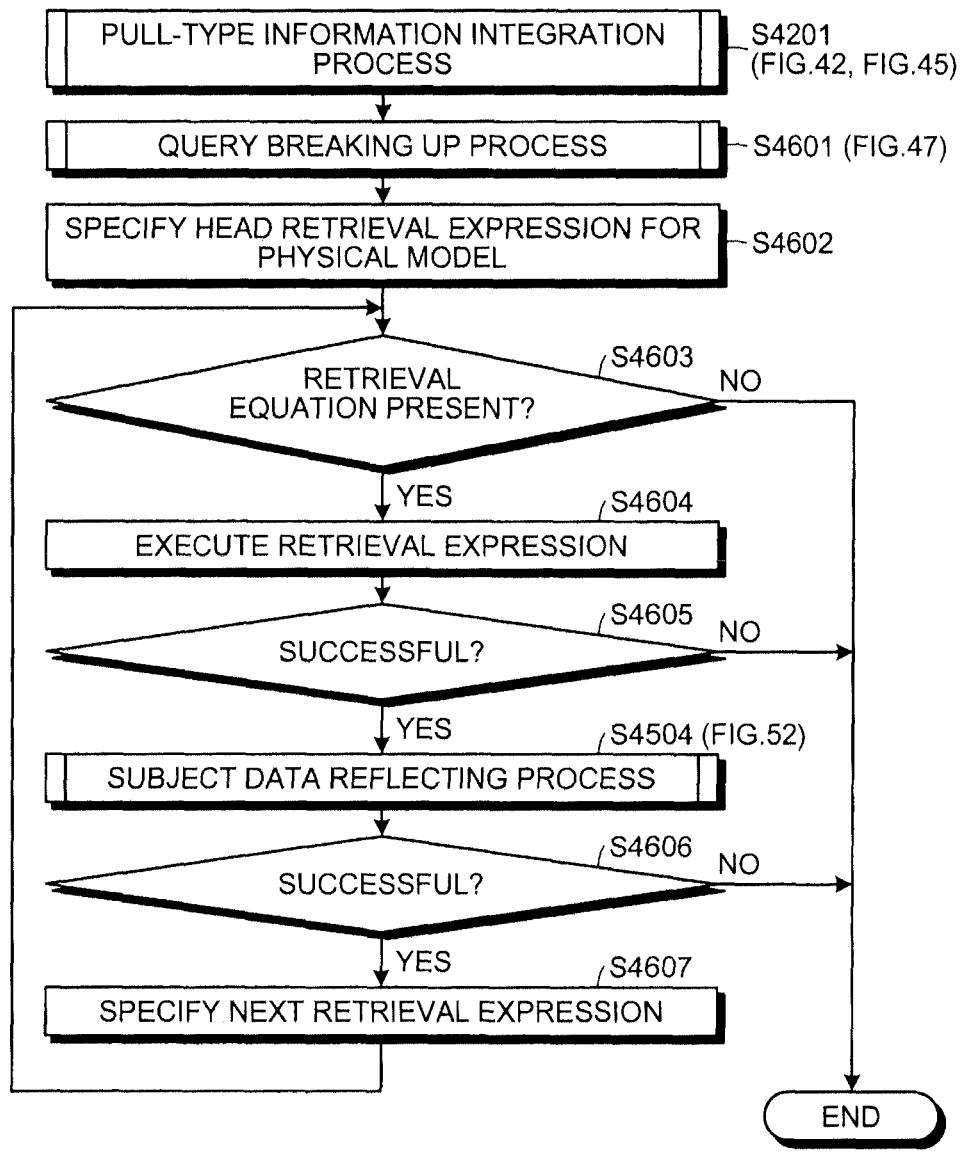
FIG. 46 is a flowchart of a detailed procedure of the PULL-type information integration process (step S4201) depicted in the FIGS. 42 and 45.

FIG. 46 is a flowchart of a detailed procedure of the PULL-type information integration process (step S4201) depicted in the FIGS. 42 and 45. A retrieval condition extracted by the retrieval condition extracting process (step S4200) depicted in FIG. 42 and a process result obtained by the subject data reflecting process (step S4504) depicted in FIG. 45 are taken over to execute a query breaking up process (step S4601).

According to the query breaking up process (step S4601), when a query is not specified, a query to the logical model L is generated from a logical model under processing, and the query (retrieval expression) represented as the query to the logical model L is broken into a query (retrieval expression) to the physical model P. Specifically, based on the query statement (retrieval expression) to the logical model L, i.e., the mapping definition MD on a retrieval condition for the query statement and a query subject, a query statement (retrieval expression) to the logical model L is broken up to make a query statement (retrieval expression) to the physical model P. This enables access to the source-side 110 for each physical model P.

Since zero or more retrieval expressions for the physical model P are made by the query breaking up process (step S4601), the head expression of the retrieval expressions for the physical model P is specified (step S4602). Because a case of zero retrieval expressions may occur, whether a retrieval expression to be processed is present is determined (step S4603). If a retrieval expression for the physical model P is not present (step S4603: NO), the PULL-type information integration process (step S4201) is ended. If a retrieval expression for the physical model P is present (step S4603: YES), a specified retrieval expression is executed to retrieve subject data from the physical model (step S4604). If the retrieval results in failure (step S4605: NO), the PULL-type information integration process (step S4201) is ended. If the retrieval is successful (step S4605: YES), the subject data reflecting process is executed (step S4503).

The subject data reflecting process (step S4504) is, as described above, the process of copying data having a solution flag "1" onto the logical model L in processing result data from a retrieval expression under processing. Subsequently, whether the subject data reflecting process (step S4504) is successful is determined (step S4606). If the subject data reflecting process results in failure (step S4606: NO), the PULL-type information integration process (step S4201) is ended.

If the subject data reflecting process is successful (step S4606: YES), the next retrieval expression is specified (step S4607). The procedure then returns to step S4603, at which the presence of a retrieval expression is checked.

FIG. 47 is a flowchart of a detailed procedure of the query breaking up process (step S4601) depicted in the FIG. 46. The query breaking up process, as described above, is the process of breaking up a query to the logical model into a query to the physical model. In this process, if a query is not specified, a query to the logical model L is generated from a logical model under processing to break up the query to the logical model L into a query to the physical model. In another explanation, the query breaking up process is described as, for example, the process of breaking up a query for an employee number of the logical model LE depicted in FIG. 11 into a query to end physical models PA and PB by following arrows in reverse, based on the mapping definition MD(E).

For example, in the PULL-type information integration process (step S4201) called up from the virtual integration process (step S4006) depicted in FIG. 42, a retrieval condition serving as a query given to the query breaking up process (step S4601), i.e., a query to be made when the value of the PUSH call flag Fpc is "0" is given as the following retrieval expression.

Select * From TABLE_E Where EMPLOYEE_NUMBER=7002

In this case, the retrieval subject is "TABLE_E.EMPLOYEE_NUMBER", i.e., an employee number of the logical model E, and the retrieval condition is "7002". FIGS. 50, 96 to 98 depict the details of the query breaking up process in this case.

First, whether the value of the PUSH call flag Fpc is "1" or "0" is determined (step S4701).

In this example, the PUSH call flag Fpc is "1" (step S4701: 0) and thus, the logical model L (TABLE_E) specified by the retrieval condition is not initialized. Consequently, the mapping definition MD for the logical model L specified by the retrieval condition is acquired, and solution flags are cleared (step S4703). Because the retrieval expression specifies the TABLE_E (logical model LE), the mapping definition MD(E) is acquired.

FIG. 50 is a diagram of the mapping definition MD(E) at step S4703. At step S4703, the solution flags are cleared (set to "0") to carry out initialization, and the following retrieval condition is extracted from the input retrieval expression.

TABLE_E.EMPLOYEE_NUMBER=7002

At step S4711, the extracted retrieval condition is correlated with a column of the mapping definition (step S4711). In FIG. 96, in the mapping definition MD(E), the retrieval condition "=7002" is correlated with rows (1) and (2) in which the To_COLUMN is "TABLE_E.EMPLOYEE_NUMBER".

The To_COLUMN of the mapping definition MD is searched from the uppermost row to retrieve the first From_COLUMN entry corresponding to that specified by the retrieval condition (step S4704). A row with a solution flag "1" is skipped in the search.

FIG. 96 is a diagram of the mapping definition at the initialization (following the process at step S4703) in a first operation example of the query breaking up process (step S4601). In the mapping definition MD(E) depicted in FIG. 96, the To_COLUMN of the first row (1) is "TABLE_E.EMPLOYEE_NUMBER" and thus, is determined to be the column specified by the retrieval condition. "TABLE_A.EMPLOYEE_NUMBER" of the From_COLUMN of the mapping definition (1) is thus retrieved.

Following retrieval of the From_COLUMN, a retrieval condition cleansing process is executed (step S4705). By the retrieval condition cleansing process (step S4705), the data type and the type attribute of a value specified as a retrieval condition (e.g., "TABLE_E.EMPLOYEE_NUMBER=7002") is set to From-type in the cleansing process.

The data type and the type attribute of "TABLE_A.EMPLOYEE_NUMBER", which is the From_COLUMN retrieved at step S4704, is set to To-type in the cleansing process, and the cleansing process (step S4705) is carried out. As a result, the retrieval condition value given as the retrieval condition for "TABLE_E.EMPLOYEE_NUMBER" is cleansed (converted) to set a retrieval condition value for "TABLE_A.EMPLOYEE_NUMBER". Details of the retrieval condition cleansing process (step S4705) will be described later.

Following the retrieval condition cleansing process (step S4705), a retrieval expression having a cleansing result as a retrieval condition is generated for retrieval of the corresponding From_COLUMN (e.g., "TABLE_A.EMPLOYEE_NUMBER") (step S4708).

Subsequently, whether the From_COLUMN for which the cleansing result is set ("TABLE_A.EMPLOYEE_NUMBER" in this case) is a terminal column and is an Mkey item is determined (step S4706). A terminal column in the mapping definition MD means a column to which a column of the same table is not present in the To_COLUMN (original From_COLUMN).

For example, for the mapping definition MD(E) depicted in FIG. 11 and FIGS. 49 and 50, when a determination is made on whether "TABLE_A.EMPLOYEE_NUMBER" that is the From_COLUMN of the second row (1) is a terminal column, "TABLE_A.EMPLOYEE_NUMBER" is determined to be a terminal column because a column of "TABLE_A" is not present in the To_COLUMN. When a determination is made on whether "TABLE_D.NAME" that is the From_COLUMN of the fifth row (5) is a terminal column, "TABLE_D.NAME" is determined not to be a terminal column because "TABLE_D.DEPARTMENT" is present as the To_COLUMN of the third row (3).

In this case, it is necessary to derive a retrieval expression for "TABLE_D.DEPARTMENT" (To_COLUMN of the third row) and ultimately, to derive a retrieval expression for "TABLE_B.DEPARTMENT" (From_COLUMN of third row), which is a terminal column. In the mapping definition MD(E) depicted in FIG. 11, "TABLE_D.NAME" on the fifth row (5) is not a terminal column, while other From_COLUMNs of rows (1) to (4) are all terminal columns.

At step S4706, when the corresponding From_COLUMN (e.g., "TABLE_A.EMPLOYEE_NUMBER") is a terminal column and is an Mkey item (step S4706: YES), a solution flag is raised on a row of the mapping definition MD that can be solved with the generated retrieval expression (step S4709).

Figure 97:
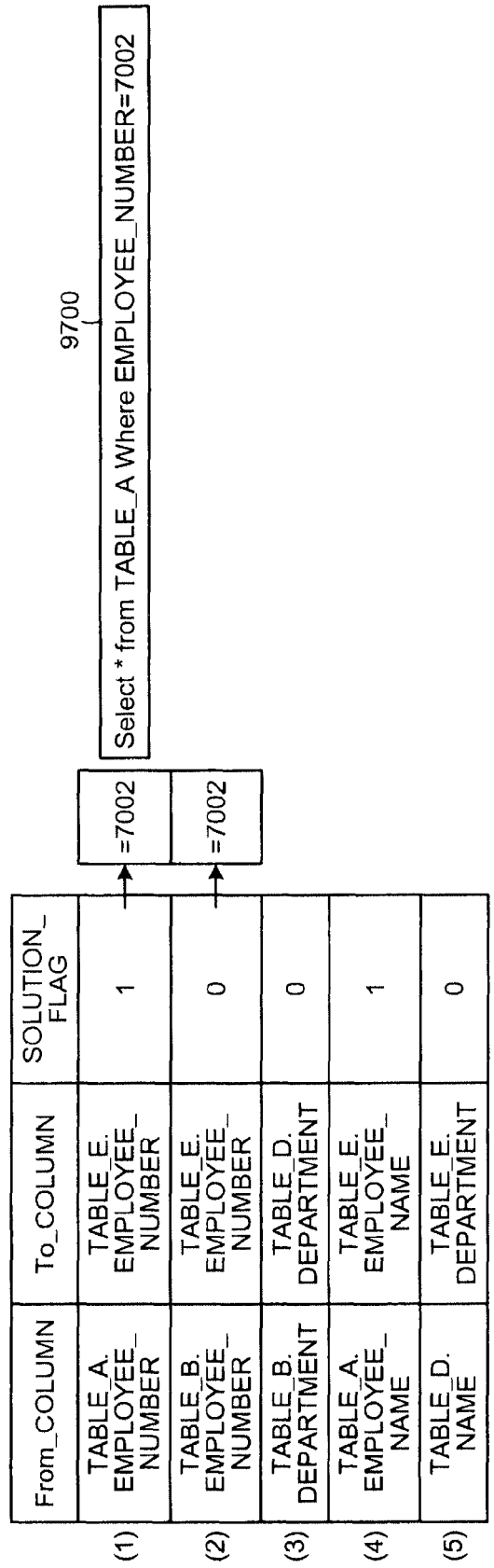
FIG. 97 is a diagram of a mapping definition for the first generation of a retrieval expression (after the process at step S4709) in a first operation example of the query breaking up process (step S4601).

FIG. 97 is a diagram of a mapping definition for the first generation of a retrieval expression (after the process at step S4709) in a first operation example of the query breaking up process (step S4601). For example, a retrieval expression 9700 made at the first generation of a retrieval expression in FIG. 97 enables acquisition of a record in the TABLE_A. In the mapping definition depicted in FIG. 11, therefore, mapping corresponding to the rows (1) and (4) having items included in the record of the TABLE_A in the From_COLUMN is equivalent to a mapping definition that can be solved by this retrieval. Hence, the mapping definition in FIG. 97 allows setting solution flags for the first and fourth rows (1) and (4) to "1".

Following step S4709, whether an unsolved mapping definition MD having the From_COLUMN as a terminal column is present is determined (step 4710). If an unsolved mapping definition having a terminal column is present (step S4710: YES), the procedure returns to step S4711.

Figures 51, 52:
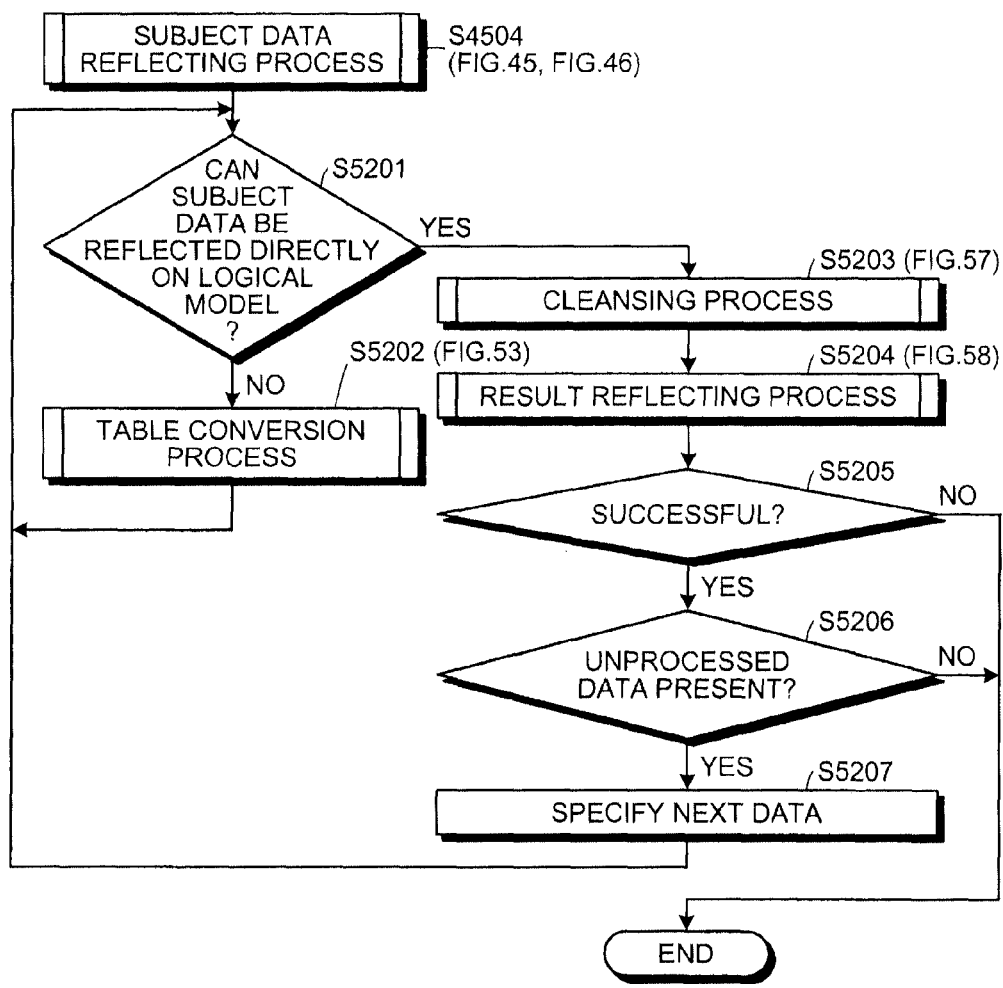
FIG. 51 is a diagram of a retrieval expression generated at step S4708.
FIG. 52 is a flowchart of a detailed procedure of a subject data reflecting process (step S4504) depicted in FIGS. 45 and 46.
Figure 98:
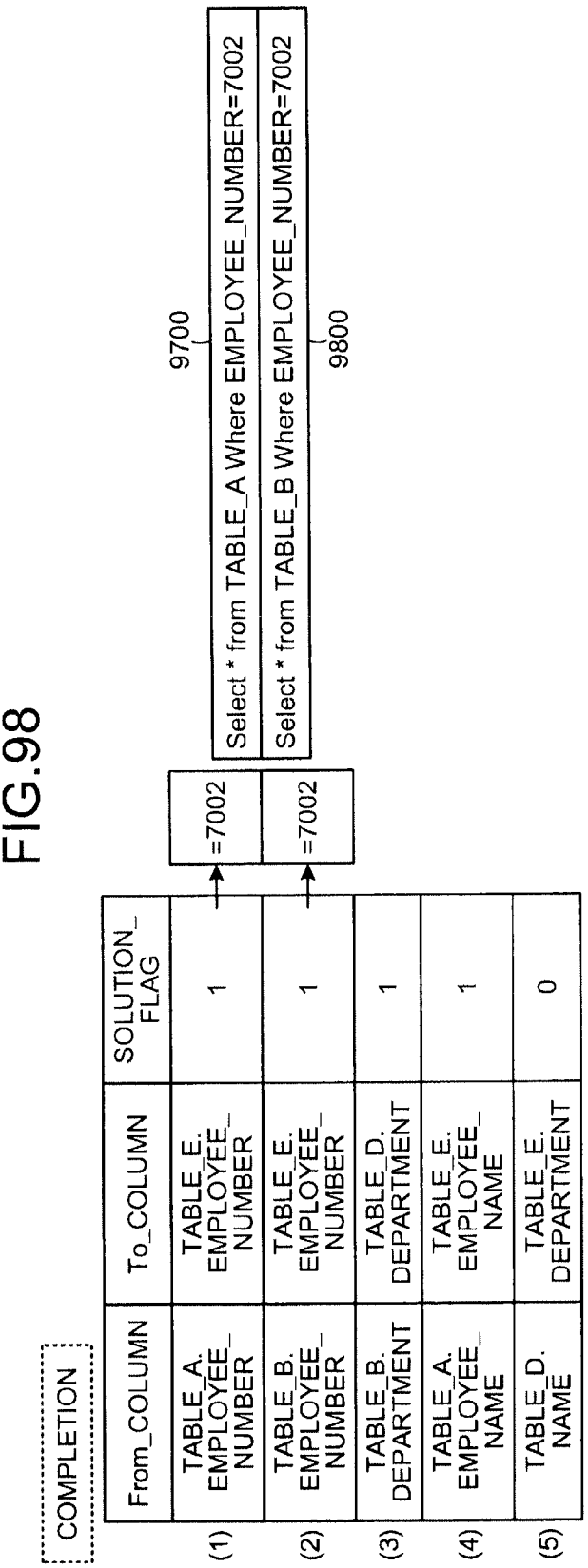
FIG. 98 is a diagram of a mapping definition for the second generation of a retrieval expression (after the process at step S4709) in the first operation example of the query breaking up process (step S4601).

FIG. 98 is a diagram of a mapping definition for the second generation of a retrieval expression (after the process at step S4709) in the first operation example of the query breaking up process (step S4601). As depicted in FIG. 98, steps S4704 to S4710 are repeated to generate a retrieval expression 9800. If an unsolved mapping definition having a terminal column is not present (step S4710: NO), the query breaking up process is ended. At this point, as depicted in FIG. 98, all solution flags for mapping definitions having terminal columns are set to "1", which means solved. As depicted in FIG. 51, a generated query statement (retrieval expression) is broken into a retrieval expression to a physical model required for physical information integration.

A query breaking up process (step S4601) as the query breaking up process depicted in FIG. 47 to be carried out when the PUSH call flag Fpc is "1", i.e., when the PUSH-type information integration process depicted in FIG. 45 calls up the PULL-type information integration process depicted in FIG. 46 will be described, for example, as a process carried out from a state of integration result information E depicted in FIG. 48 and the mapping definition MD(E) depicted in FIG. 49.

In FIG. 47, if the PUSH call flag Fpc is "1" (step S4701: 1), the mapping definition MD for the logical model L is initialized (step S4501) and the subject data reflecting process (step S4504) is carried out in the PUSH-type information integration process (step S4105), and values are set in integration result information.

Thus, from the integration result information acquired by the subject data reflecting process (step S4504) in the PUSH-type information integration process, the value of the result set is extracted (step S4702) as a retrieval condition for generating a retrieval expression for the physical model P at the next step.

FIG. 48 is a diagram of an integration result set E at step S4702, and FIG. 49 is a diagram of the mapping definition MD(E) at step S4702. At the start of step S4702, the integration result set E has "7001", "7002", and "7003" as values of "TABLE_E.EMPLOYEE_NUMBER", and "ICHIRO TANAKA", "JIRO SUZUKI", and "SABURO SATO" as values of "TABLE_E.NAME". In the mapping definition at this time, solution flags corresponding to columns of these values (TABLE_E.EMPLOYEE_NUMBER, TABLE_E.NAME) are set to "1". Values extracted as retrieval conditions are as follows.

TABLE_E.EMPLOYEE_NUMBER=7001
TABLE_E.EMPLOYEE_NUMBER=7002
TABLE_E.EMPLOYEE_NUMBER=7003
TABLE_E.EMPLOYEE_NAME=ICHIRO TANAKA
TABLE_E.EMPLOYEE_NAME=JIRO SUZUKI
TABLE_E.EMPLOYEE_NAME=SABURO SATO

Figure 99:
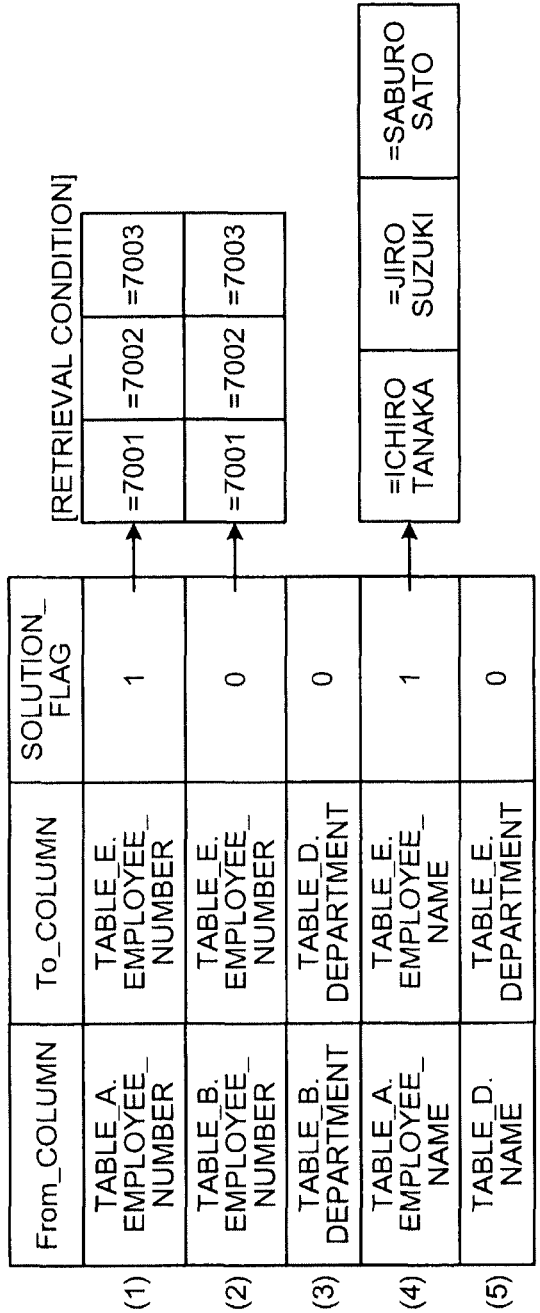
FIG. 99 is a diagram of a mapping definition at initialization (after the process at step S4702) in a second operation example of the query breaking up process (step S4601).

FIG. 99 is a diagram of a mapping definition at initialization (after the process at step S4702) in a second operation example of the query breaking up process (step S4601). FIG. 99 depicts an example of correlating an extracted retrieval condition with the mapping definition at the next step S4711. Retrieval condition values "=7001, =7002, =7003" are correlated with the first row (1) and the second row (2) where the To_COLUMN of the mapping definition matches the retrieval subject item "TABLE_E.EMPLOYEE_NUMBER". Retrieval condition values "=ICHIRO TANAKA, =JIRO SUZUKI, =SABURO SATO" are correlated with the fourth row (4) where the To_COLUMN matches the retrieval subject item "TABLE_E.EMPLOYEE_NAME".

At step S4704, a process of searching the To_COLUMN of the mapping definition MD from its uppermost row to retrieve the first From_COLUMN correlated with the retrieval condition is executed. A row with a solution flag "1" is skipped in this searching.

For example, in the mapping definition MD(E) depicted in FIG. 99, the first row (1) with a solution flag "1" is skipped. The To_COLUMN of the second row (2) is "TABLE_E.EMPLOYEE_NUMBER" and the retrieval condition is correlated with the second row (2), so that "TABLE_B.EMPLOYEE_NUMBER" of the From_COLUMN of the mapping definition (2) is retrieved. The correlated retrieval conditions are the following three conditions.

TABLE_E.EMPLOYEE_NUMBER=7001
TABLE_E.EMPLOYEE_NUMBER=7002
TABLE_E.EMPLOYEE_NUMBER=7003

The retrieval condition cleansing process is then executed (step S4705). By the retrieval condition cleansing process (step S4705), the data type and the type attribute of a value specified as a retrieval condition (e.g., "TABLE_E.EMPLOYEE_NUMBER") is set to From-type in the cleansing process.

The data type and the type attribute of "TABLE_B.EMPLOYEE_NUMBER", which is the From_COLUMN retrieved at step S4704, is set to To-type in the cleansing process, and the cleansing process (step S4705) is carried out. As a result, the retrieval condition value given as the retrieval condition for "TABLE_E.EMPLOYEE_NUMBER" is cleansed (converted) to set a retrieval condition value for "TABLE_B.EMPLOYEE_NUMBER". Details of the retrieval condition cleansing process (step S4705) will be described later.

Subsequently, the next retrieval expression having a retrieval condition of a cleansing result is generated for retrieval of the corresponding From_COLUMN (e.g., "TABLE_B.EMPLOYEE_NUMBER") (step S4708).

Select * From TABLE_B Where EMPLOYEE_NUMBER=7001
Select * From TABLE_B Where EMPLOYEE_NUMBER=7002
Select * From TABLE_B Where EMPLOYEE_NUMBER=7003

Whether the From_COLUMN for which the cleansing result is set ("TABLE_B.EMPLOYEE_NUMBER" in this case) is a terminal column and is an Mkey item is then determined (step S4706).

Because "TABLE_B.EMPLOYEE_NUMBER" is a terminal column and is an Mkey item (step S4706: YES), a solution flag is raised for a row of the mapping definition MD that can be solved with the generated retrieval expression (step S4709).

Figure 100:
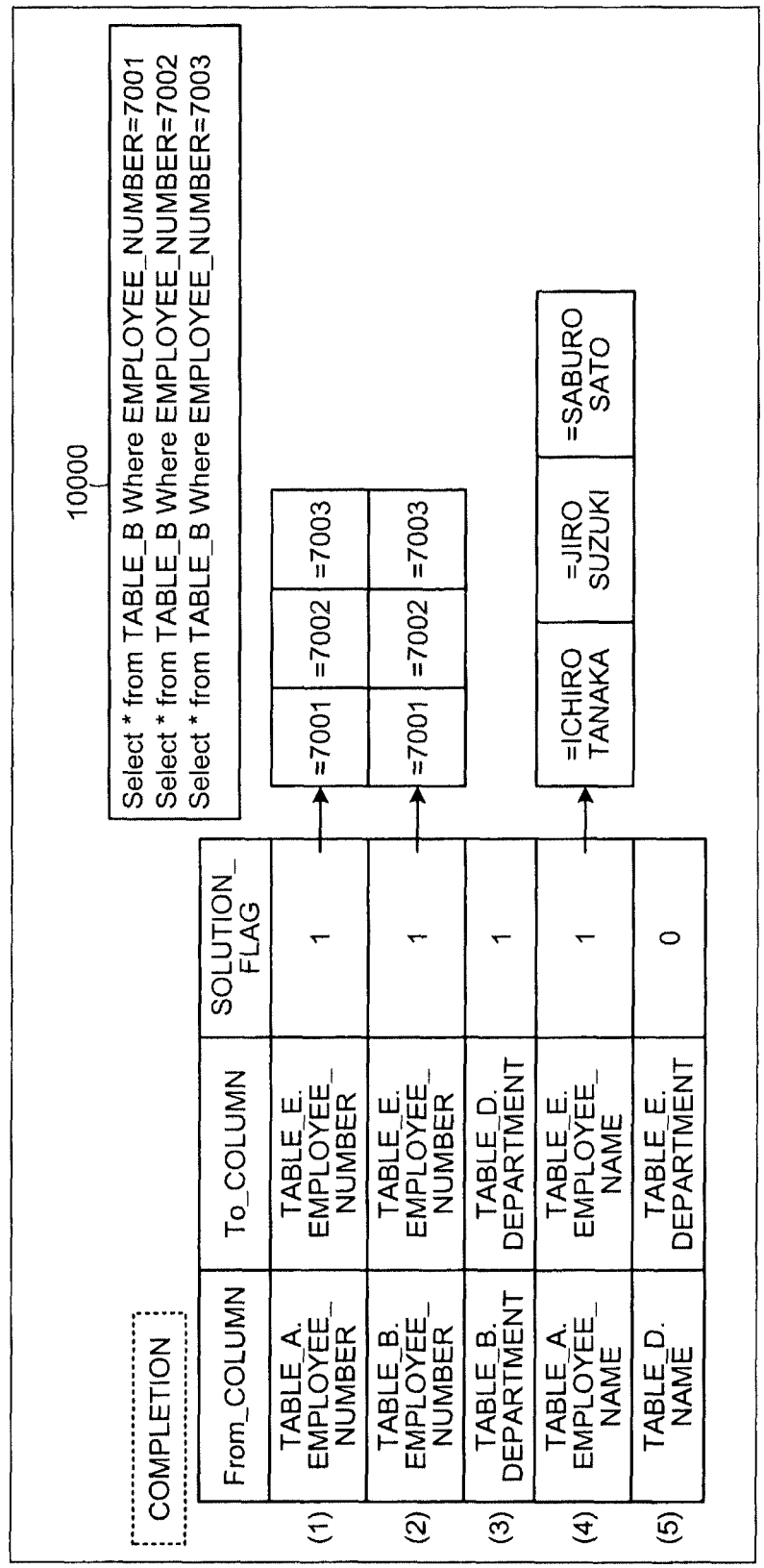
FIG. 100 is a diagram of a mapping definition for the first generation of a retrieval expression (after the process at step S4709) in the second operation example of the query breaking up process (step S4601).

FIG. 100 is a diagram of a mapping definition for the first generation of a retrieval expression (after the process at step S4709) in the second operation example of the query breaking up process (step S4601). In FIG. 100, reference numeral 10000 denotes a generated retrieval expression. As depicted in FIG. 100, the second and third rows (2) and (3) are mapping definitions that can be solved by this retrieval expression and thus, solution flags for the second and third rows (2) and (3) are set to "1".

Following this, whether an unsolved mapping definition (solution flag is "0") is present in mapping definitions MD having From_COLUMNs as terminal columns is determined (step 4710). In FIG. 100, all definitions having terminal columns except the row (5) having no terminal column are solved (step S4710: NO), and the query breaking up process is ended.

With reference to FIGS. 101 to 105, an example in which input to the query breaking up process (step S4601) is the next retrieval expression and is described centering on operation following step S4707 in FIG. 47.

Select * From TABLE_E Where DEPARTMENT=SALES DEPARTMENT

Figure 101:
FIG. 101 is a diagram of a mapping definition at initialization (after the process at step S4703) in a third operation example of the query breaking up process (step S4601).

FIG. 101 is a diagram of a mapping definition at initialization (after the process at step S4703) in a third operation example of the query breaking up process (step S4601). FIG. 101 depicts a state where the first retrieval condition is set at step S4711 in FIG. 47. A retrieval condition "=MANUFACTURING DEPARTMENT" is set on the fifth row (5) of the mapping definition. In this case, "TABLE_D.NAME" is retrieved as the From_COLUMN at step S4704, the value cleansing is carried out at step S4705, and the following retrieval expression is made at step S4708.

Select * From TABLE_D Where NAME=SALES DEPARTMENT

Figure 102:
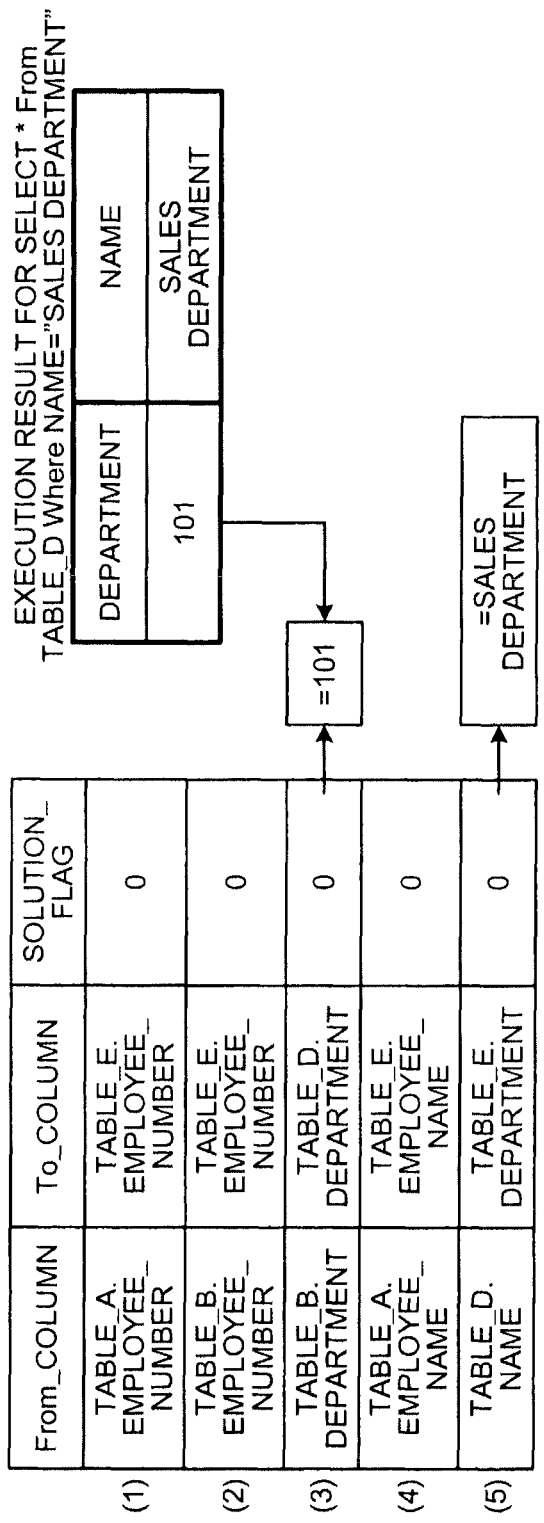
FIG. 102 is a diagram of a mapping definition for the first execution of a retrieval expression (after the process at step S4707) in the third operation example of the query breaking up process (step S4601).

Whether the From_COLUMN "TABLE_D.NAME" is a terminal column and is an Mkey item is then determined at step S4706. In this example, "TABLE_D.NAME" is not a terminal column (step S4706: NO) and thus, the generated retrieval expression is executed (step S4707). For example, retrieval from a TABLE_3 of an RDB 3 allocated to the physical model PD is carried out, and the result of the retrieval is given as depicted in FIG. 102. The retrieval condition is then extracted from the execution result (step S4712).

FIG. 100 is a diagram of a mapping definition for the first execution of a retrieval expression (after the process at step S4707) in the third operation example of the query breaking up process (step S4601). As depicted in FIG. 102, "TABLE_D.DEPARTMENT=101" is extracted, and the procedure returns to step S4711, at which the extracted retrieval condition is correlated with the mapping definition. Specifically, as depicted in FIG. 102, "=101" is correlated with the third row (3) on which the retrieval subject item "TABLE_D.DEPARTMENT" is included in the To_COLUMN.

Figure 103:
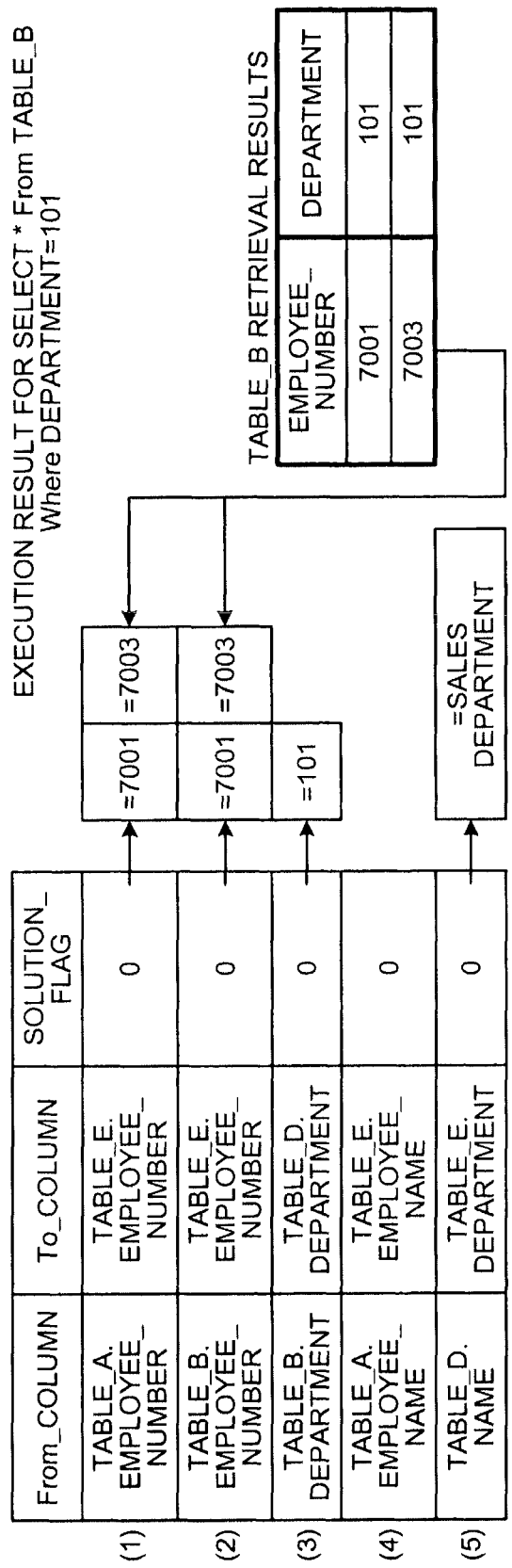
FIG. 103 is a diagram of a mapping definition for the second execution of a retrieval expression (after the process at step S4707) in the third operation example of the query breaking up process (step S4601).

FIG. 103 is a diagram of a mapping definition for the second execution of a retrieval expression (after the process at step S4707) in the third operation example of the query breaking up process (step S4601). Likewise, at step S4706 in the second execution, as depicted in FIG. 103, the following retrieval expression is generated, and the determination is made on a From item "TABLE_B.DEPARTMENT".

Select * From TABLE_B Where DEPARTMENT=101

"TABLE_B.DEPARTMENT" is a terminal column but is not an Mkey item. The procedure thus proceeds to step S4707, at which the retrieval expression is executed, as depicted in FIG. 103, and a retrieval condition is extracted from the result of the execution and is correlated with the first and second columns (1) and (2).

Figure 104:
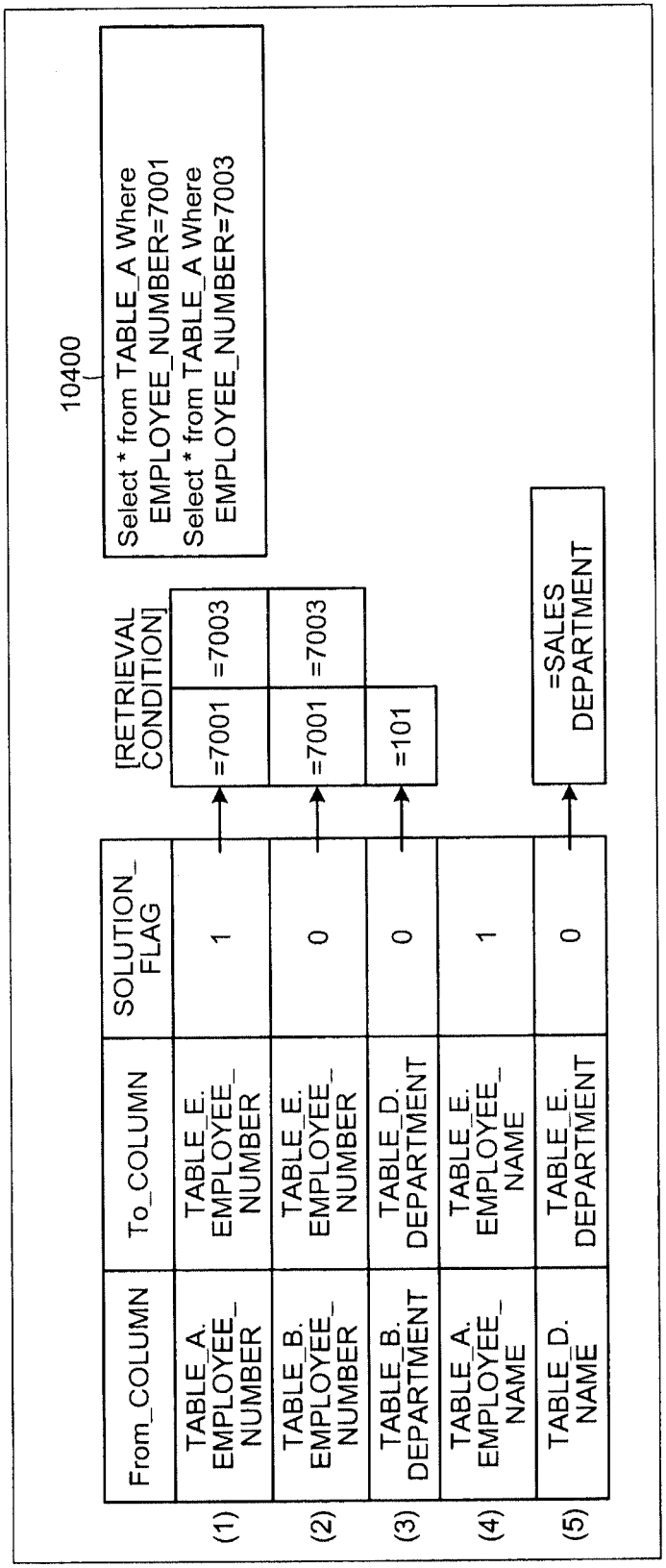
FIG. 104 is a diagram of a mapping definition for the third generation of a retrieval expression (after the process at step S4707) in the third operation example of the query breaking up process (step S4601).

FIG. 104 is a diagram of a mapping definition for the third generation of a retrieval expression (after the process at step S4707) in the third operation example of the query breaking up process (step S4601). In the third execution of processing at step S4706, as depicted in FIG. 104, the following retrieval expression 10400 is generated, and the determination is made on a From item "TABLE_A.EMPLOYEE_NUMBER".

Select * From TABLE_A Where EMPLOYEE_NUMBER=7001
Select * From TABLE_A Where EMPLOYEE_NUMBER=7003

Because the "TABLE_A.EMPLOYEE_NUMBER" is a terminal column and is an Mkey item, the procedure proceeds to a step S4709, at which a solution flag "1" is set for the first row (1) and the fourth row (4) of the mapping definition.

Figure 105:
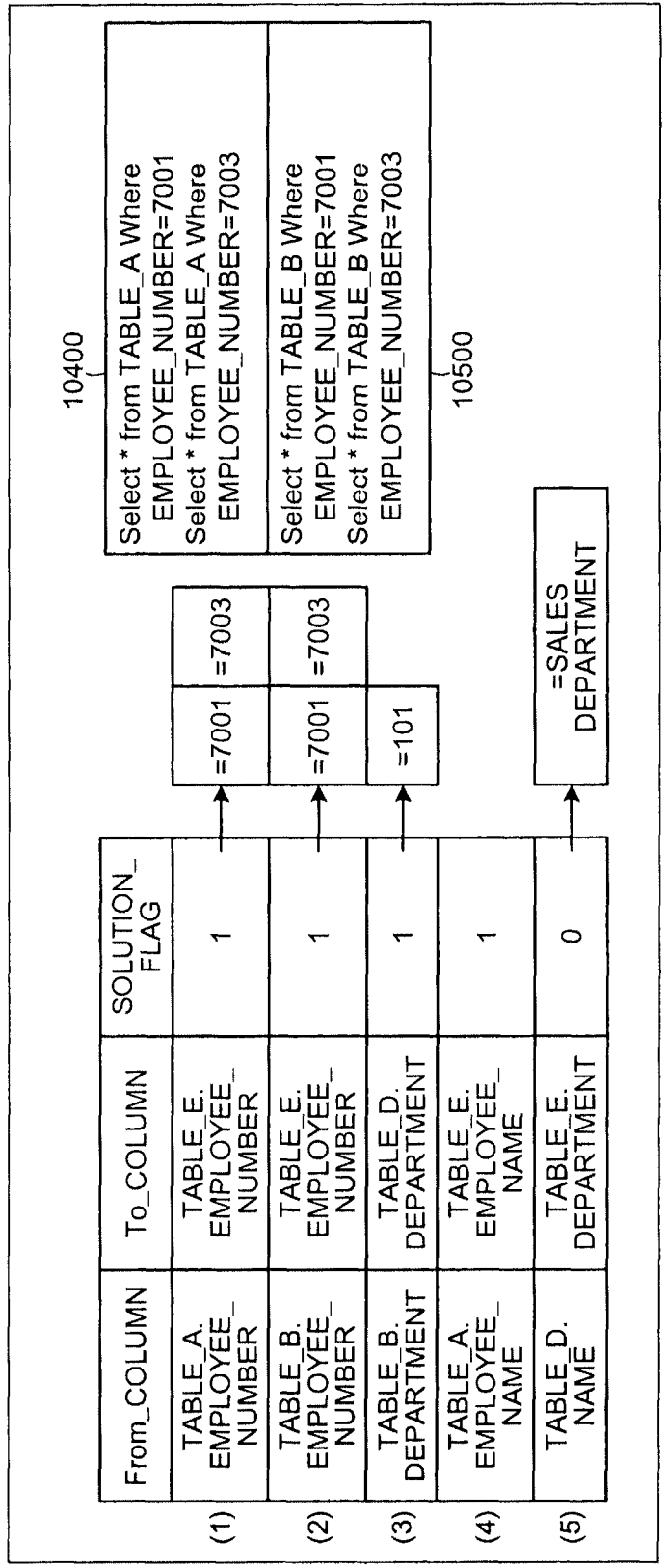
FIG. 105 is a diagram of a mapping definition for the fourth generation of a retrieval expression (after the process at step S4709) in the third operation example of the query breaking up process (step S4601).

FIG. 105 is a diagram of a mapping definition for the fourth generation of a retrieval expression (after the process at step S4709) in the third operation example of the query breaking up process (step S4601). In the fourth execution of processing at step S4706, as depicted in FIG. 105, the following retrieval expression 10500 is generated, and the determination is made on a From item "TABLE_B.EMPLOYEE_NUMBER".

Select * From TABLE_B Where EMPLOYEE_NUMBER=7001
Select * From TABLE_B Where EMPLOYEE_NUMBER=7003

Because the "TABLE_B.EMPLOYEE_NUMBER" is a terminal column and is an Mkey item, the procedure proceeds to a step S4709, at which a solution flag "1" is set for the second row (2) and the third row (3) of the mapping definition.

At step S4710, all solution flags for terminal columns are set to "1". The query breaking up process is thus ended to generate the following retrieval expressions as a breakup result.

Select * From TABLE_A Where EMPLOYEE_NUMBER=7001
Select * From TABLE_A Where EMPLOYEE_NUMBER=7003
Select * From TABLE_B Where EMPLOYEE_NUMBER=7001
Select * From TABLE_B Where EMPLOYEE_NUMBER=7003

FIG. 52 is a flowchart of a detailed procedure of the subject data reflecting process (step S4504) depicted in FIGS. 45 and 46. Whether subject data selected from a currently specified extraction result can be reflected directly on the logical model L is determined (step S5201), which means whether a table conversion process (step S5202) is necessary is determined. For example, when each of items in the physical model PA corresponds directly to each of items in the logical model LC, as depicted in FIG. 10, direct reflection is possible.

As in the case of a department item of the physical model PB depicted in FIG. 11, when a department item of the physical model PB is correlated with an item of the logical model LE via the physical model PD, the department item of the physical model PB does not directly correspond to the item of the logical model LE. In this case direct reflection is impossible.

When direct reflection is impossible (step S5201: NO), the table conversion process is executed (step S5202) and the procedure returns to step S5201, which means that the table conversion process (step S5202) is repeated until direct reflection onto the logical model L becomes possible. Details of the table conversion process (step S5202) will be described later.

If direct reflection onto the logical model L becomes possible (step S5201: YES), the cleansing process (step S5203) and a result reflecting process (step S5204) are executed. In the cleansing process (step S5203), the conversion process is carried out to match a copy origin to a copy destination when the data type and the type attribute of the copy origin are different from the data type and the type attribute of the copy destination. In the result reflecting process (step S5204), data is copied onto the logical model L.

Details of the cleansing process (step S5203) and the result reflecting process (step S5204) will be described later. Whether the result reflecting process is successful is then determined (step S5205). If the result reflecting processes results in failure (step S5205: NO), the subject data reflecting process (step S4504) is ended as a failure.

If the result reflecting process is successful (step S5205: YES), whether unprocessed data is present in the extracted result is determined (step S5206). If unprocessed data is present (step S5206: YES), the next data is specified (step S5207), and the procedure returns to step S5201. If unprocessed data is not present (step S5206: NO), the subject data reflecting process (step S4504) is ended as a success.

Figure 53:
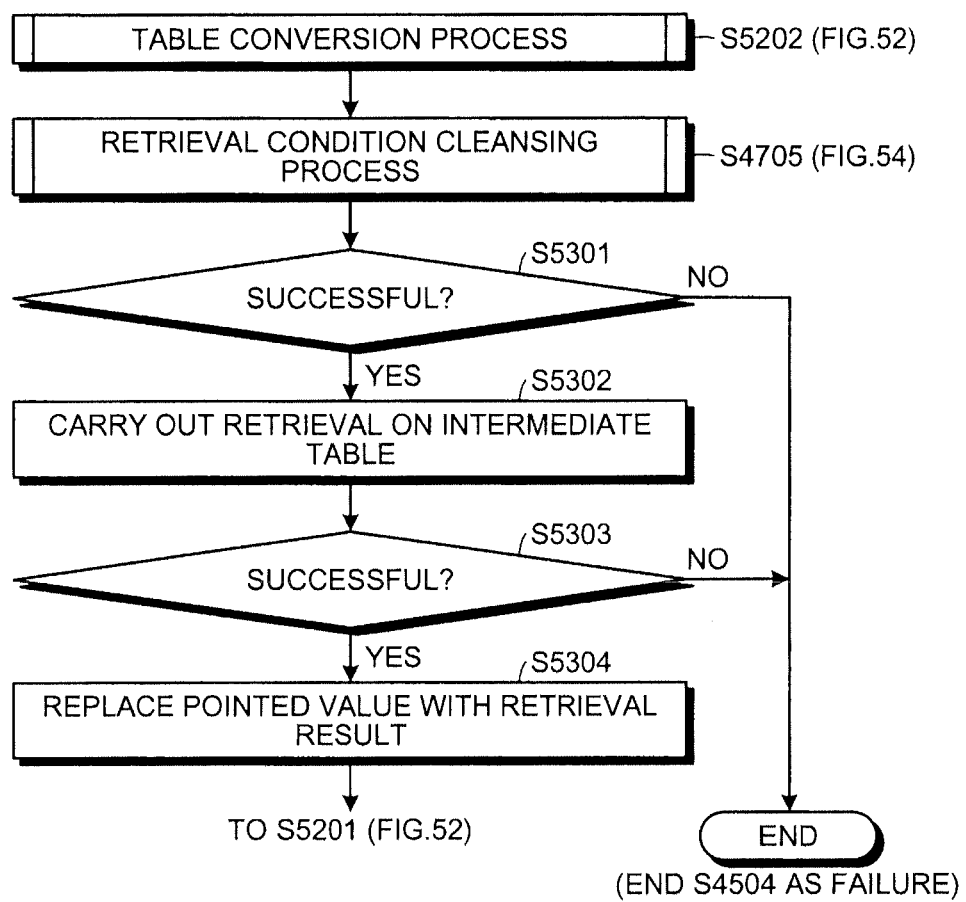
FIG. 53 is a flowchart of a detailed procedure of a table conversion process (step S5202) depicted in FIG. 52.

FIG. 53 is a flowchart of a detailed procedure of the table conversion process (step S5202) depicted in FIG. 52. The retrieval condition cleansing process is executed (step S4705). Details of the retrieval condition cleansing process (step S4705) will be described later. Subsequently, whether the retrieval condition cleansing process (step S4705) is successful is determined (step S5301).

If the retrieval condition cleansing process results in failure (step S5301: NO), proceeding to step S5201 is impossible, in which case the subject data reflecting process (step S4504) is ended as a failure. If the retrieval condition cleansing process is successful (step S5301: YES), retrieval is carried out on an intermediate table (step S5302). The intermediate table is a physical model P existing between another physical model P and the logical model L. For example, the physical model PD depicted in FIG. 11 and the physical models PD and PT depicted in FIG. 12 are each equivalent to the intermediate table.

If the retrieval results in failure (step S5303: NO), proceeding to step S5201 is impossible, in which case the subject data reflecting process is ended as a failure (step S4504). If the retrieval is successful (step S5303: YES), a pointed value is replaced with a retrieval result (step S5304), after which the procedure proceeds to step S5201. Specifically, in the example depicted in FIG. 11, when an attribute "DEPARTMENT" of the physical model PB is pointed to, the physical model PD to which the attribute "DEPARTMENT" is subordinate is retrieved as the intermediate table.

The physical model PD includes an attribute "DEPARTMENT" to which the attribute "DEPARTMENT" of the physical model PB is subordinate and an attribute "NAME" corresponding to the attribute "DEPARTMENT". "DEPARTMENT" of the physical model PB is thus replaced with "NAME" of the physical model PD. The attribute "NAME" as the result of replacement is directly mappable to an attribute "DEPARTMENT" of the logical model LE, which makes direct reflection possible.

Figure 54:
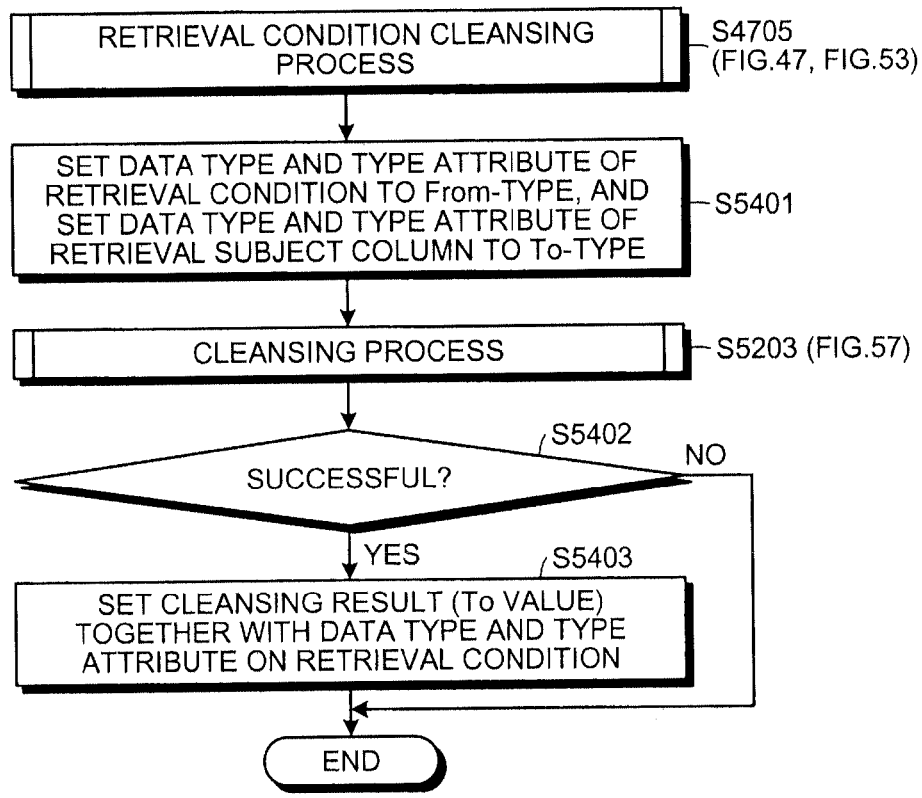
FIG. 54 is a flowchart of a detailed procedure of a retrieval condition cleansing process depicted in FIGS. 47 and 53 (step S4705).

FIG. 54 is a flowchart of a detailed procedure of the retrieval condition cleansing process depicted in FIGS. 47 and 53 (step S4705). The data type and the type attribute of a given retrieval condition is set to From-type indicating the property of a cleansing origin, while the data type and the type attribute of a retrieval subject column is set to To-type indicating the property of a cleansing destination (step S5401). Subsequently, the cleansing process is executed (step S5203). Details of the cleansing process (step S5203) will be described later. Whether the cleansing process is successful is then determined (step S5402). If the cleansing process results in failure (step S5402: NO), the retrieval condition cleansing process (step S4705) is ended as a failure.

If the cleansing process is successful (step S5402: YES), the value of a cleansing result (To-value) together with the data type and type attribute of the To-type are set on the retrieval condition as the cleansing result (step S5403), and the retrieval condition cleansing process (step S4705) is ended normally, realizing a cleansing (conversion) of a retrieval condition between different data models. The cleansing process is thus used in generation of a retrieval expression that is used to breakup the query (retrieval expression) depicted in FIG. 47 and retrieve the intermediate table depicted in FIG. 53.

The cleansing process is executed when a value from a copy origin for which the data type and type attribute are specified as From-type is to be copied to a copy destination for which the data type and type attribute are specified as To-type. The cleansing process involves checking the data types and type attributes of both copy origin and copy destination, and when the copy origin (From-type) is different from the copy destination (To-type) in the data type or type attribute, carrying out data type conversion or type attribute conversion to match the format of the copy origin (From-type) to the format of the copy destination (To-type). This process enables the copying of a value between items even if the data types or type attributes of the items differ from each other.

Figure 55:
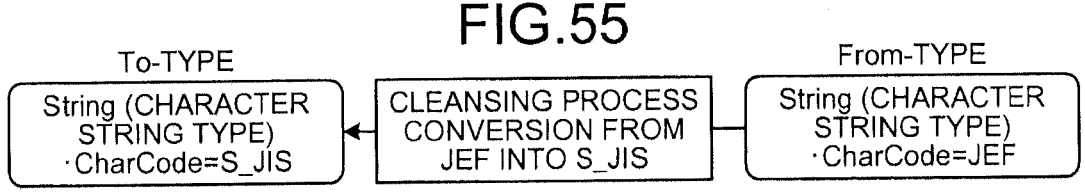
FIG. 55 depicts an example of cleansing that is carried out because of a difference in type attribute.

FIG. 55 depicts an example of cleansing that is carried out because of a difference in type attribute. In FIG. 55, both copy origin and copy destination are identical in data type of String (character string type) but are different in type attribute. Thus, the cleansing process of converting the character code system from JEF to shift JIS is executed to convert the From-type type attribute (CharCode=JEF) to the To-type type attribute (CharCode=S_JIS). The result of the cleansing process is copied to the copy destination.

Cleansing carried out when character string type data are different in type attribute includes cleansing other than character code system conversion, such as character string conversion. Specifically, such other cleansing includes 2-byte elimination, front-and-rear space elimination, combining consecutive spaces into a single one, tab/space conversion, line feed code elimination, line feed code conversion, 2-byte character/1-byte charter conversion, English upper case letter/English lower case letter conversion, and character replacement (using replacement table).

Other cleansing functions includes unit conversion (conversion from "three-thousand yen" into "3,000 yen" and vice versa, i.e., conversion between character string type and numerical value type), calendar notation conversion (conversion of year from "Heisei 16" to "2004" and vice versa, i.e., conversion between character string type and numerical value type), kanji/numeral notation conversion (conversion from "十六" to "16" and vice versa, i.e., conversion between character string type and numerical value type), effective place conversion (numerical value type conversion, i.e., increase or decrease in the number of effective places), and conversion of the number of effective characters (character string type conversion, i.e., increase or decrease in the number of effective characters).

Figure 56:
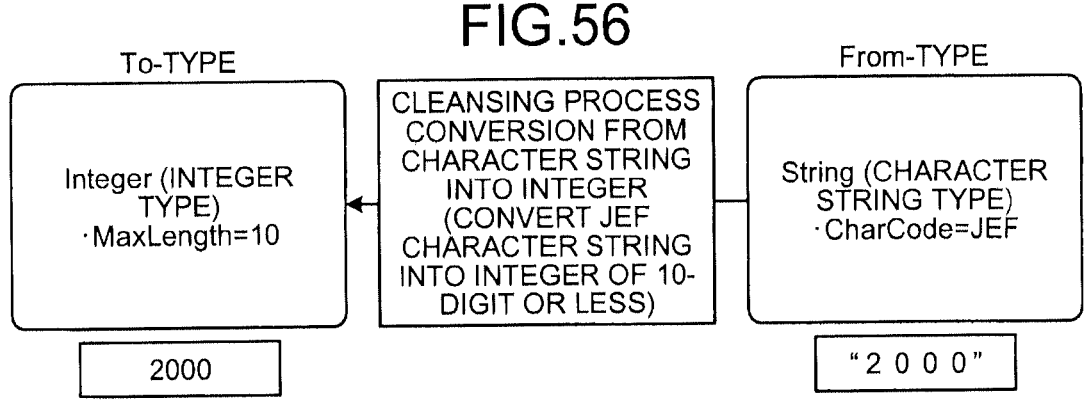
FIG. 56 depicts an example of a cleansing function that is executed when data types differ.

FIG. 56 depicts an example of a cleansing function that is executed when data types differ. In FIG. 56, a cleansing process is executed to convert data "2000", which is String (character string type) and JEF code character string (four 2-byte characters), from a character string into an integer of 10 digits or less. As a result, the data is converted into "2000" (four-digit integer).

In this manner, the information integrating apparatus according to the embodiment is capable of carrying out data value conversion as needed, the conversion being carried out as any one of the character code system conversion process of eliminating a difference in character code systems through conversion; the character string conversion process of normalizing a character string, such as space elimination and 2-byte character/1-byte character conversion; the unit conversion process of eliminating a difference in the units of characters and numerals through conversion; the calendar notation conversion process of eliminating through conversion, a difference between the Gregorian and the Japanese calendar in the notation year; kanji/numeral notation conversion process of eliminating a difference in numerical expression by kanji/numerals, Arabic numerals, and Roman numerals; the number of effective places conversion process of matching the number of effective places of different numerals, and the data type matching conversion process.

Figure 57:
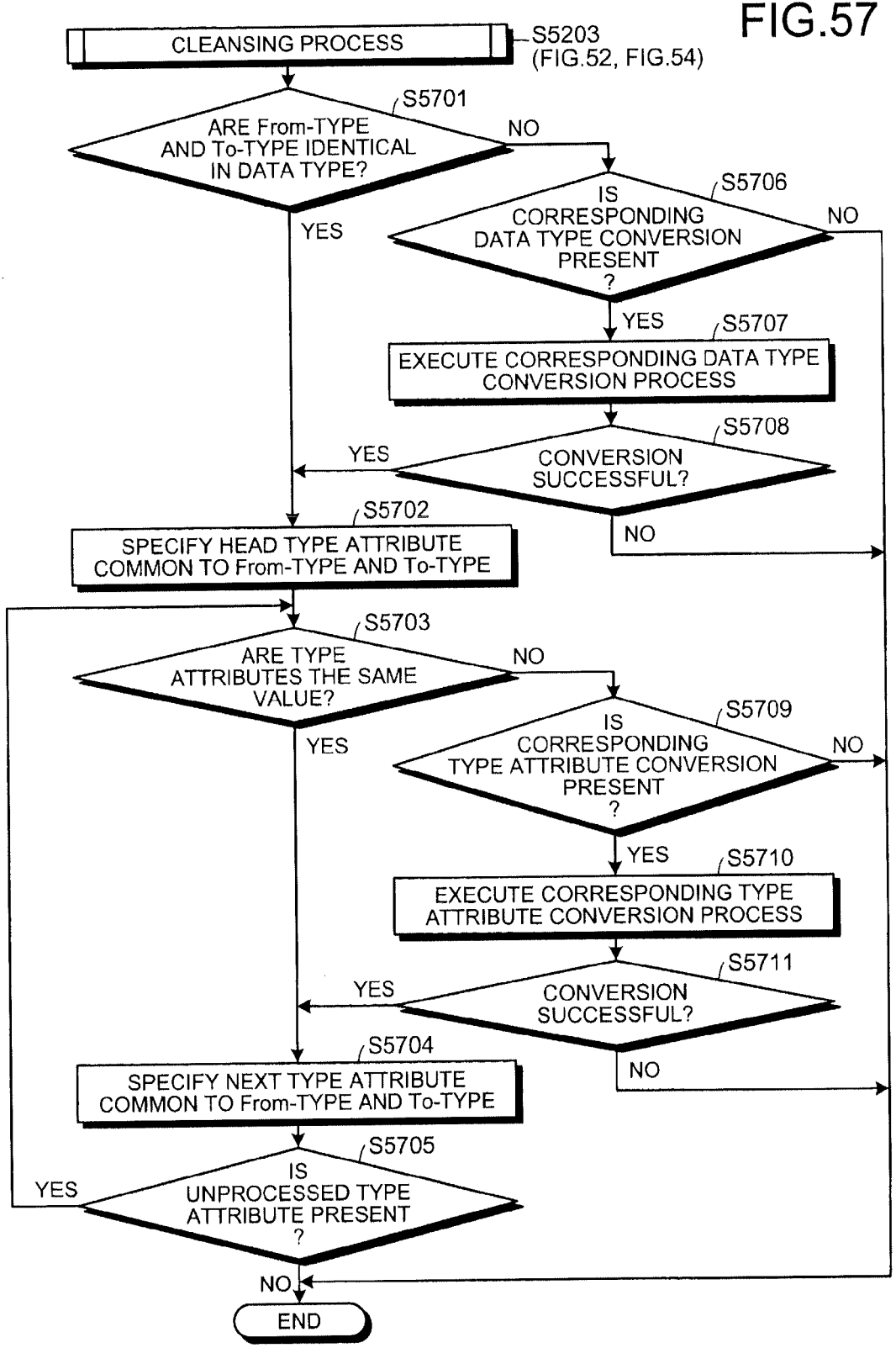
FIG. 57 is a flowchart of a detailed procedure of a cleansing process (step S5203) depicted in FIGS. 52 and 54.

FIG. 57 is a flowchart of a detailed procedure of the cleansing process (step S5203) depicted in FIGS. 52 and 54. Whether a From-type indicating the property of a cleansing origin and a To-type indicating the property of a cleansing destination is identical in data type is determined (step S5701). If the From-type and the To-type are identical in data type (step S5701: YES), the head type attribute common to the From-type and the To-type is specified (step S5702).

Whether values for the type attribute are identical is then determined (step S5703). If the values for the type attribute are identical (step S5703: YES), the next type attribute common to the From-type and the To-type is specified (step S5704). Subsequently, whether an unprocessed type attribute is present is determined (step S5705). If an unprocessed type attribute is present (step S5705: YES), the procedure returns to step S5703, after which steps S5703 to S5705 are executed repeatedly. If no unprocessed type attribute is present (step S5705: NO), a series of steps of the cleansing process (step S5203) is ended normally.

If the From-type and the To-type are different in data type at step S5701 (step S5701: NO), whether the data type conversion function corresponding to such a case is present is determined (step S5706). If the corresponding data type conversion function is not present (step S5706: NO), a cleansing failure process is carried out to end the cleansing process (step S5203).

If the corresponding data type conversion function is present (step S5706: YES), the corresponding data type conversion process is executed (step S5707), and whether the data type conversion process is successful is determined (step S5708). If the data type conversion process is successful (step S5708: YES), the procedure proceeds to step S5702. If the data type conversion process results in failure (step S5708: NO), the cleansing failure process is carried out to end the cleansing process (step S5203).

If the values for the type attribute are different at step S5703 (step S5703: NO), whether the data type conversion function corresponding to such a case is present is determined (step S5709). If the corresponding data type conversion function is not present (step S5709: NO), the cleansing failure process is carried out to end the cleansing process (step S5203). If the corresponding data type conversion function is present (step S5709: YES), the corresponding data type conversion process is executed (step S5710).

Whether the executed data type conversion process is successful is then determined (step S5711). If the data type conversion process is successful (step S5711: YES), the procedure proceeds to step S5704. If the data type conversion process results in failure (step S5711: NO), the cleansing failure process is carried out to end the cleansing process (step S5203).

Figure 58:
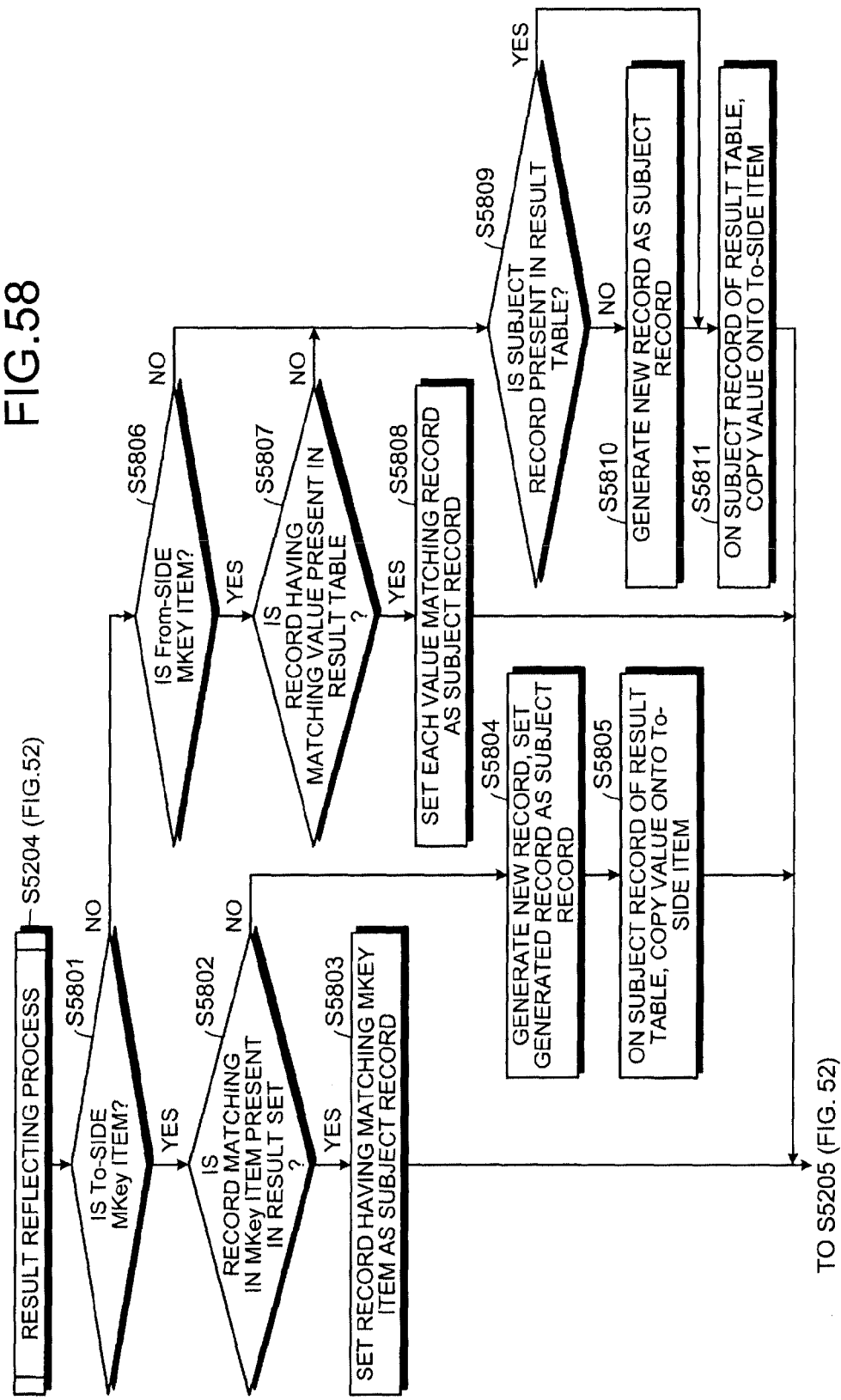
FIG. 58 is a flowchart of a detailed procedure of a result reflecting process (step S5204) depicted in FIG. 52.

FIG. 58 is a flowchart of a detailed procedure of the result reflecting process (step S5204) depicted in FIG. 52. Whether a reflection destination item (To-side) on which a reflection origin item (From-side) is mapped is an Mkey item is determined (step S5801). If the reflection destination item is an Mkey item (step S5801: YES), integration result information is searched with respect to the Mkey item to determine whether a record having the Mkey item matching a From-side item is present is determined (step S5802), If a matching record is present (step S5802: YES), the record is determined to be a reflection subject record (reflection destination record) (step S5803), and the procedure proceeds to step S5206.

Specifically, if the reflection destination item is an MKey item, if a record having the same value as the reflection origin value (Mkey) is already present in the integration result information, the record is set as a reflection subject record, and the procedure proceeds to the next reflecting process.

If a matching record is not present at step S5802 (step S5802: NO), a new record is generated as a reflection subject record in the integration result information (step S5804). On the generated subject record, the reflection origin value is copied onto the To-side item (step S5805), after which the procedure proceeds to step S5205.

If the To-side item is not an Mkey item at step S5801 (step S5801: NO), whether the From-side item is an Mkey item is determined (step S5806). If the From-side item is an Mkey item (step S5806: YES), the To-side item in the integration result information is retrieved using the From-side value (primary key constraint (Mkey)), and whether a record having the To-side item matching the From-side item is present is determined (step S5807). When a matching record is present (step S5807: YES), each matching record is set as a subject record (step S5808), after which the procedure proceeds to step S5205.

If the From-side item is not an Mkey item at step S5806 (step S5806: NO), whether a subject record is present in the integration result information is determined (step S5809). If a matching record is not present at step S5807 (step S5807: NO), whether a subject record is present in the integration result information is determined (step S5809).

If a subject record is not present (step S5809: NO), a new record is generated as the subject record (step S5810), after which the procedure proceeds to step S5811. If a subject record is present (step S5809: YES), the procedure proceeds to step S5811, at which the copy origin value is copied onto the To-side item on the subject record in the integration result information (step S5811), after which the procedure proceeds to step S5205.

The process of "generating a new record as a subject record" executed at step S5810 is a process that is executed if an item other than an Mkey item is set prior to reflection of the Mkey item. As described in FIGS. 22 to 25, however, items in the mapping definition are sorted to prioritize the processing Mkey items. As far as a logical model having a table structure is concerned, therefore, a case of executing step S5810 is considered to be none.

Although examples of a physical model and a logical model having a table structure have been described because such models can be easily understood, a table structure is not required. Such models, including the information source and the user-side, may have a tree structure of which a typical example is XML, other data structures, or a portion of such structures. Strict requirements for meta-information (physical model, logical model, mapping definition) include the following.

(1) To have numerical values, characters, and character strings as items and define the property of each item (data type and type attribute).

(2) A set of items (called record) can be uniquely specified using the value of an Mkey item, so that the arrangement (correlation and position) of items can be determined.

(3) To have a set of records having the same property, which can be uniquely specified based on names, etc.

(4) The correlation between items can be defined through mapping definition.

An example of a logical model M having a tree structure will be described with reference to FIGS. 106 to 110. The tree structure used in this example is a structure represented by "XML Schema", which is standardized by the World Wide Web Consortium (W3C).

Figure 106:
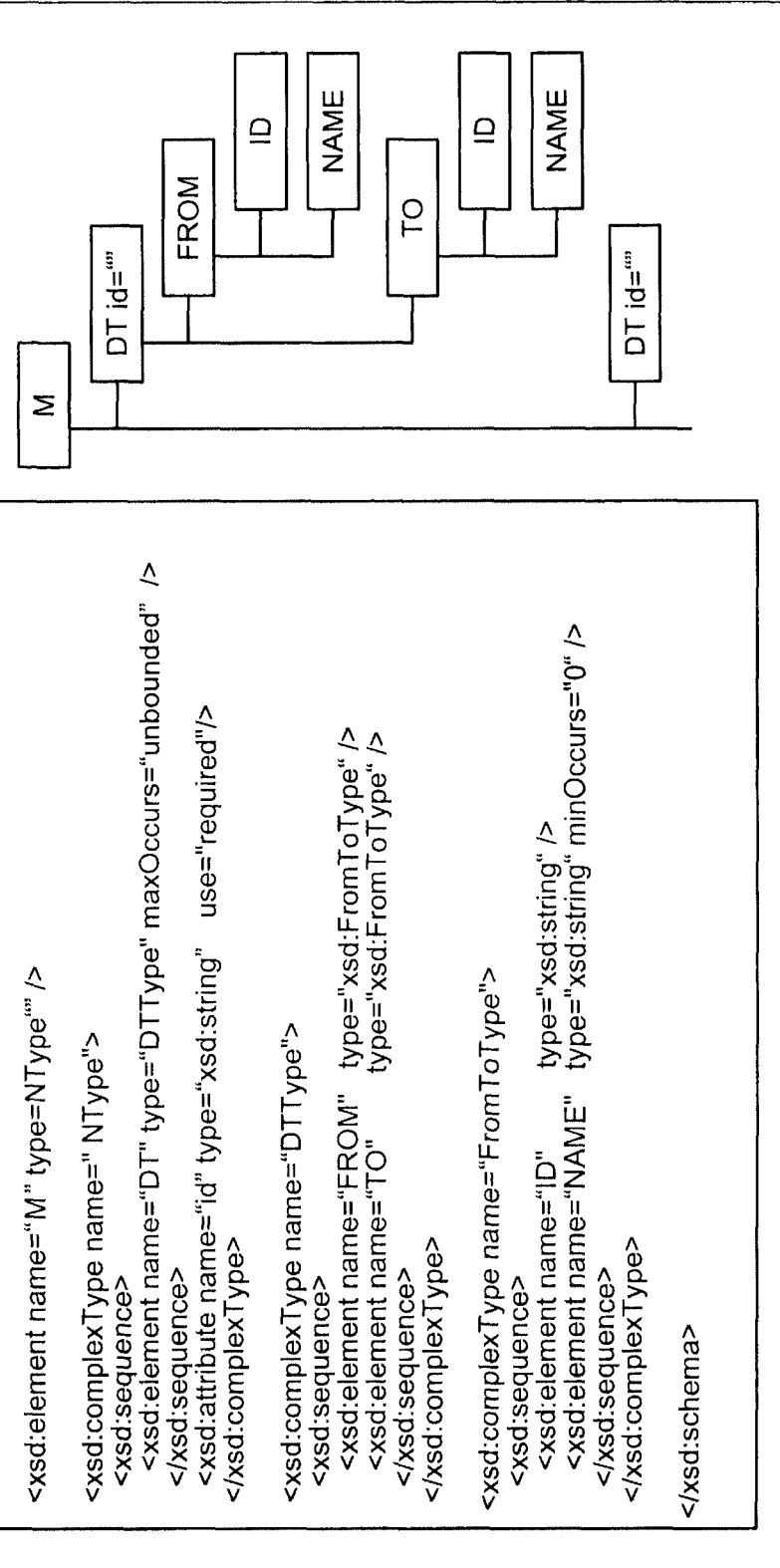
FIG. 106 is a diagram of an example of XML Schema and a data structure corresponding to the logical model M having a tree structure.

FIG. 106 is a diagram of an example of XML Schema and a data structure corresponding to the logical model M having a tree structure. As depicted in FIG. 106, a head node "M" has one or more child nodes "DT" each representing a phone call record. The node "DT" is uniquely specified with an "id" attribute, and has a child node "FROM" representing a phone call origin and a child node "TO" representing a phone call destination. Each "FROM" node and each "TO" node has a child node "ID" and a child node "NAME", which may be omitted.

FIG. 107 is a diagram of an example of part of meta-information corresponding to the logical model M having a tree structure. FIG. 107 depicts part of a meta-definition in a case of using a tree structure as the logical model M. Physical models "TABLE_S" depicted in FIG. 18, "TABLE_T" depicted in FIG. 17, and "TABLE_D" depicted in FIG. 16 are used for the meta-definition, and are not depicted in FIG. 107. Adding the logical model depicted in FIG. 107 as child elements of <META-DATA> to the meta-information depicted in FIGS. 13 to 21, therefore, completes the meta-definition. Overall meta-information related to the logical model M will hereinafter be described.

Figure 108:
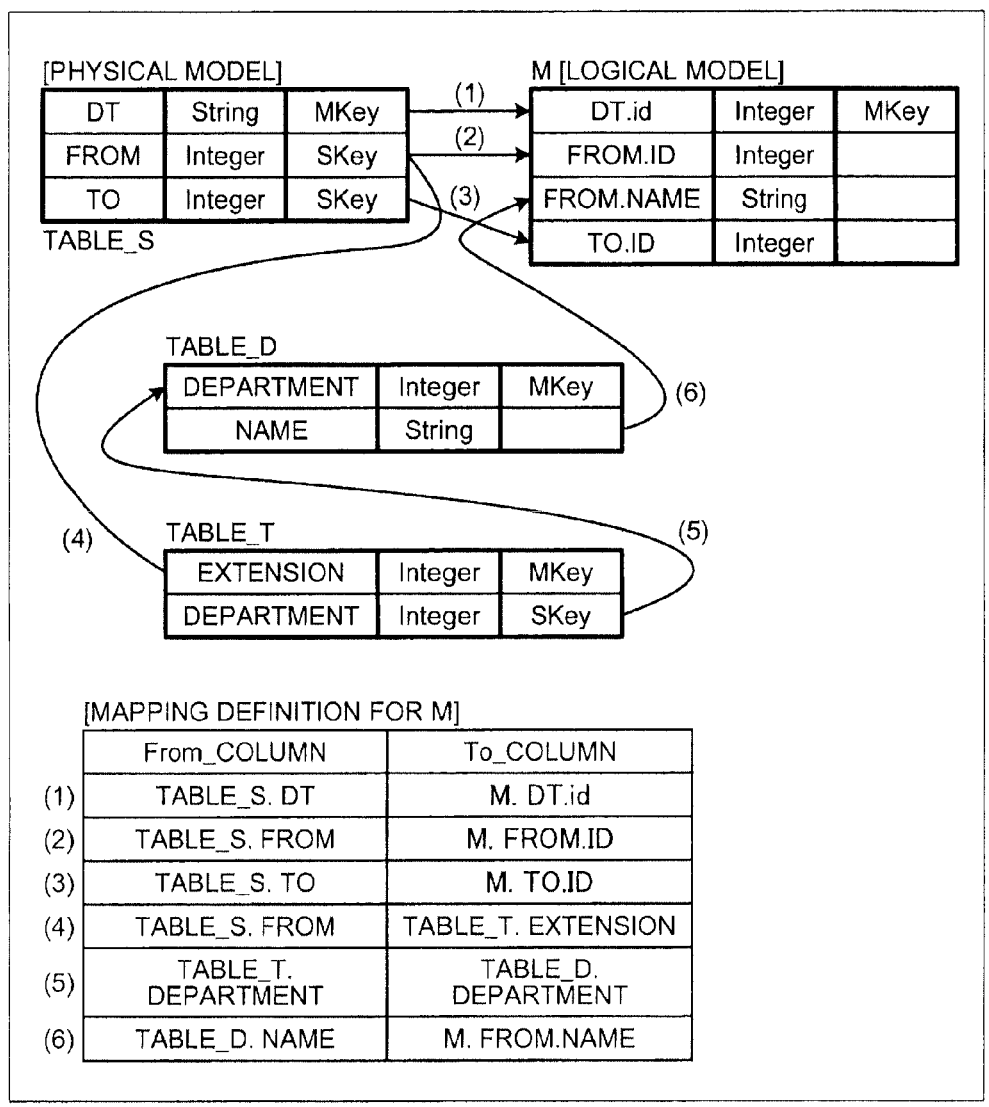
FIG. 108 is a diagram of an overview of the meta-information related to the example depicted in FIG. 107.

FIG. 108 is a diagram of an overview of the meta-information related to the example depicted in FIG. 107. In FIG. 108, (1) to (6) of mapping definitions correspond to the same numbers of <MAP_RULE> in FIG. 107.

FIG. 107 depicts virtually the same meta-information as the meta-information depicted in FIG. 21. The logical model M depicted in FIG. 21, however, has a table structure, in which items specified by a <COLUMN> tag are lined up into a column in a specified order and all items are put together to make up records, while the logical model M depicted in FIG. 107 has a tree structure, in which a <ref> attribute of a <COLUMN> tag specifies the positions of items. Since the role of the <ref> attribute is to specify the positions of items in XML Schema, the <ref> attribute may be written in XML Path Language (XPath) standardized by the W3C.

A "DT.ID" item in FIG. 107 is an Mkey item, and the value of the "DT.ID" item is set to the "id" attribute of the "DT" node. A "FROM.ID" item is an "ID" node that is a child node to the "FROM" node, which is the child node to a "DT" node that is an Mkey item.

Likewise, a "FROM.NAME" item is a "NAME" node that is a child node to the "FROM" node, which is the child node to the "DT" node that is an Mkey item. A "TO.ID" item is an "ID" node that is a child node to the "TO" node, which is the child node to a "DT" node that is an Mkey item.

With the "ref" attribute, the positional relation between items is fixed uniquely. This allows the information integrating apparatus to carry out the integration process on a tree structure data model in the same manner as on a table structure data model.

FIG. 109 is a diagram of stream integration instruction information for the logical model M having a tree structure. FIG. 109 depicts an example of a stream integration instruction for the meta-information depicted in FIG. 106. In FIG. 109, an output condition for the logical model (output-side) specified by an <OUT> tag is not SQL, but is a language format adapted to the logical model having the tree structure.

In this case, a query statement to the logical model is required, so that "XQuery", which is a W3C-standard language format, can be used for the query statement to the logical model having the tree structure. In this manner, the query statement does not always have to be an SQL sentence, but a sentence having fine affinity to a data model may be used according to the property of a logical model or physical model.

FIG. 110 is a diagram of an example of an information integration result resulting by executing a stream integration instruction to the logical model M depicted in FIG. 109. FIG. 110 depicts an example of an integration result for the logical model M when the integration instruction depicted in FIG. 109 is given to the information integrating apparatus using the meta-definition depicted in FIG. 106. Stream data equivalent to "TO=24200" is acquired from a data stream corresponding to the TABLE_S that is an information source specified by an <IN> tag in FIG. 109 during a period of 20:20 to 20:22, and the acquired stream data is input to the information integrating apparatus.

The information integrating apparatus carries out an integration process nearly identical to an integration process according to a third embodiment to be described later. Processed data is integrated as data of the logical model M specified by the <OUT> tag in FIG. 109, and only the data equivalent to //M/DT/FROM/NAME="SALES DEPARTMENT" is output to an output destination corresponding to the logical model M. As depicted in FIG. 110, the data is output as XML data structured as the XML Schema depicted in FIG. 106 having a tree structure uniquely determined by the "ref" attribute of the meta-definition.

A first embodiment will be described. The first embodiment is an execution example of the physical integration process (step S4005) when the physical integration instruction information 3700 depicted in FIG. 37 is given. Meta-information prerequisite to the first embodiment is within a range of the model depicted in FIG. 11, and is used for a combination of the physical model PA depicted in FIG. 14, the physical model PB depicted in FIG. 15, and the logical model LE depicted in FIG. 20. The first embodiment will hereinafter be described in correlation with the flowcharts above, using FIGS. 59 to 65.

Figure 59:
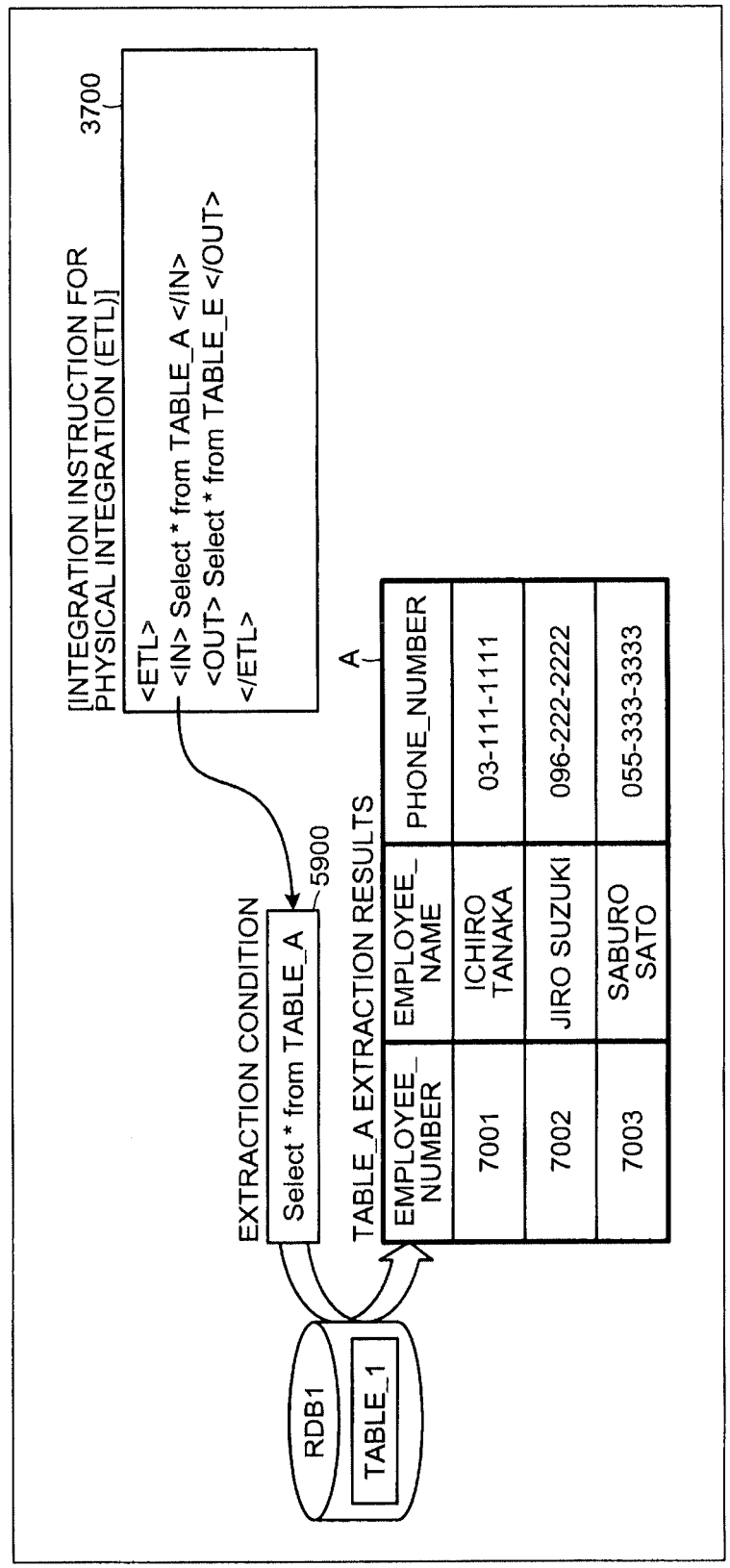
FIG. 59 is a diagram of an example of extracting subject data at step S4101 depicted in FIG. 41.

FIG. 59 is a diagram of an example of extracting subject data at step S4101 depicted in FIG. 41. The integration engine 101 extracts a retrieval expression "Select * From TABLE_A" specified by an <IN> tag as an extraction condition 5900, from the physical integration instruction information 3700. Based on the extraction condition 5900, the integration engine 101 then extracts a subject data group (7001 to 7003, ICHIRO TANAKA to SABURO SATO, . . . ) according to the physical model PA, from the TABLE_1 of the RDB 1 allocated to the TABLE_A. The extracted subject data group will hereinafter be called extraction result A.

Subsequently, at step S4104, the first record of the extraction result A, which is "employee number: 7001", is specified as the head data of the extraction result A, and the PUSH-type information integration process (step S4105) is executed. In the PUSH-type information integration process (step S4105), the integration engine 101 initializes the mapping definition MD for the logical model L specified by the <OUT> tag of the physical integration instruction information 3700 (step S4501).

Figure 60:
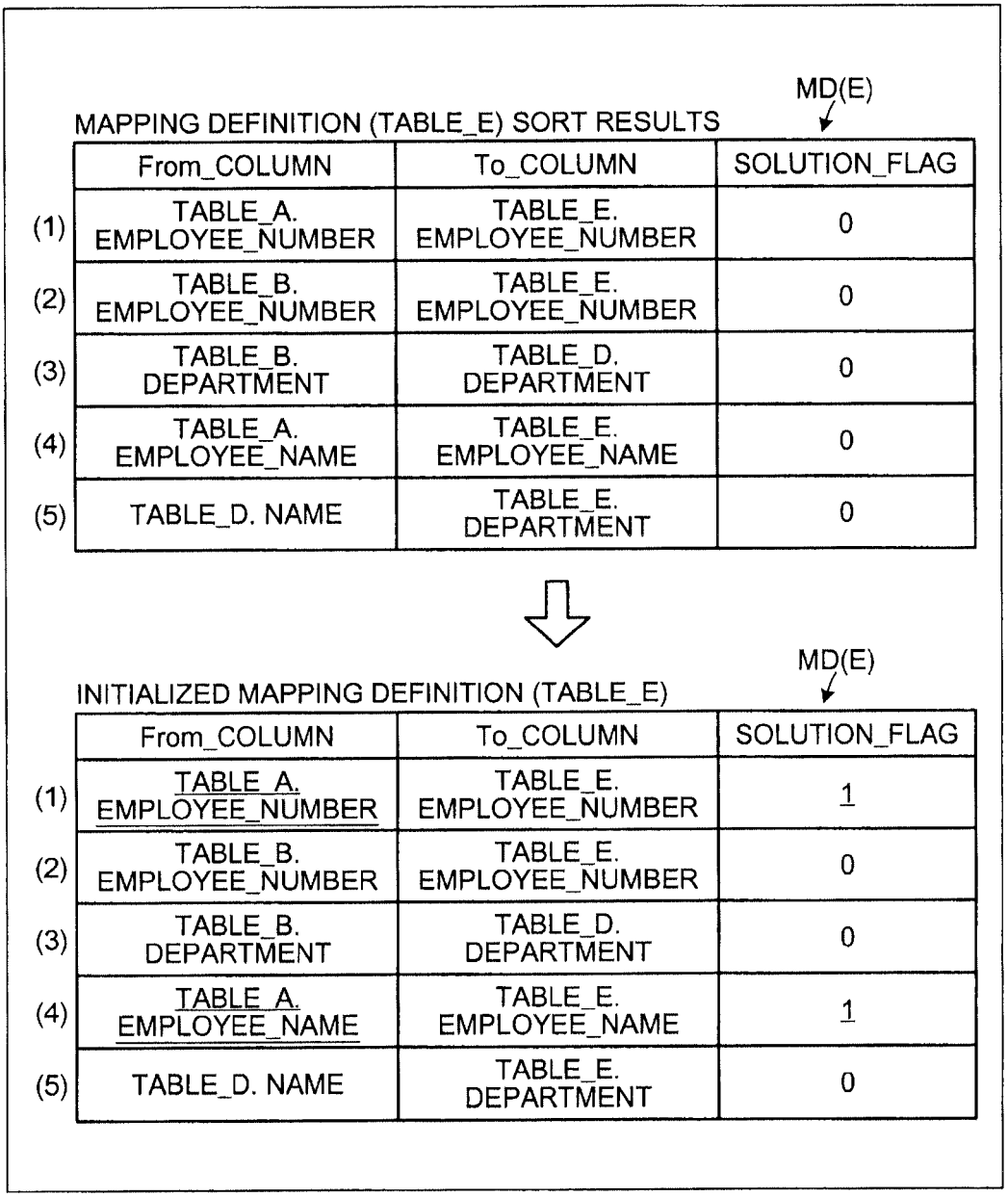
FIG. 60 is a diagram of initialization of the mapping definition MD for the logical model L (step S4501).

FIG. 60 is a diagram of the initialization of the mapping definition MD for the logical model L (step S4501). According to the physical integration instruction information 3700 depicted in FIG. 59, the physical model L specified as a retrieval subject by a retrieval expression specified by the <OUT> tag is the logical model LE (TABLE_E). The mapping definition MD(E) is, therefore, initialized.

Specifically, the mapping definition MD(E) sorted in the order of evaluation by the mapping definition initializing process (step S4001) is acquired, and solution flags of the mapping definition MD(E) are cleared (set to "0"). "1" is then set to solution flags for mapping definitions (1) and (4) on which items included in the TABLE_A (physical model PA) specified by <IN> of the physical integration instruction information 3700 are set in the From_COLUMN. Because no other physical model other than the TABLE_A is input, solution flag setting is completed at this point. By raising the solution flags, the mapping definition MD(E) is initialized into a state of completion of the extracting process (step S4101).

In physical integration, following the initialization of the mapping definition MD(E) (step S4501), the extraction result A including all input data as an integration subject are copied onto the integration result information of the logical model by the subject data reflecting process (step S4504) depicted in FIG. 45.

Figure 61:
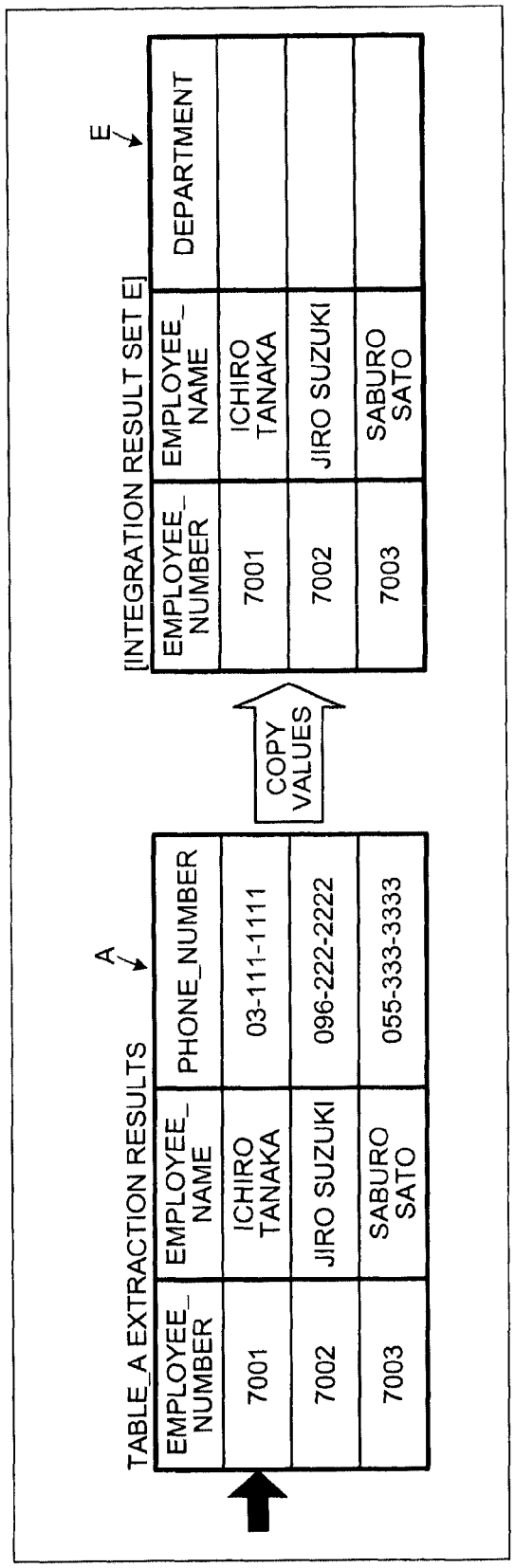
FIG. 61 is a diagram of a specific example of the subject data reflecting process (step S4504).

FIG. 61 is a diagram of a specific example of the subject data reflecting process (step S4504). In FIG. 61, for an item present in the extraction result, a row of the mapping definition MD(E) with a solution flag "1" is selected. From_COLUMN items (TABLE_A.EMPLOYEE_NUMBER, TABLE_A.EMPLOYEE_NAME) of the selected mapping definitions (1) and (4) are determined to be subject data and are copied onto the logical model LE specified in the To_COLUMN of the mapping definitions (1) and (4). As a result, the value of the employee number and the value of the name are copied from the extraction result A to generate an integration results E.

Because no input data other than the TABLE_A is present (step S4506: NO), whether a mapping definition having an unsolved terminal column in the From_COLUMN is present is determined (step S4507). In this example, mapping definitions (2) and (3) having unsolved terminal columns in the From_COLUMN are present (step S4507: YES), thus the PULL-type information integration process depicted in FIG. 46 is executed as the final stage of the PUSH-type information integration process (step S4201). At this time, the PUSH call flag (Fpc) indicative of a continuous call from the PUSH-type information integration process is set to "1". In the PULL-type information integration process (step S4201), the query breaking up process (step S4602) is executed as depicted in FIG. 46. In the query breaking up process (step S4602), values set in the integration results E are extracted as retrieval conditions (step S4702).

TABLE_E.EMPLOYEE_NUMBER=7001, 7002, 7003
TABLE_E.EMPLOYEE_NAME=ICHIRO TANAKA, JIRO SUZUKI, SABURO SATO

Subsequently, the second row (2) of the initialized mapping definition MD(E) depicted in FIG. 60 is specified (step S4704 depicted in FIG. 47). At this time, the retrieval condition to pay attention to is "TABLE_E.EMPLOYEE_NUMBER=7001, 7002, 7003" that is specified in the To_COLUMN of the mapping definition (2). The cleansing process is then executed on this retrieval condition (step S4705). The retrieval condition cleansing process (step S4705) will be described specifically.

Figure 62:
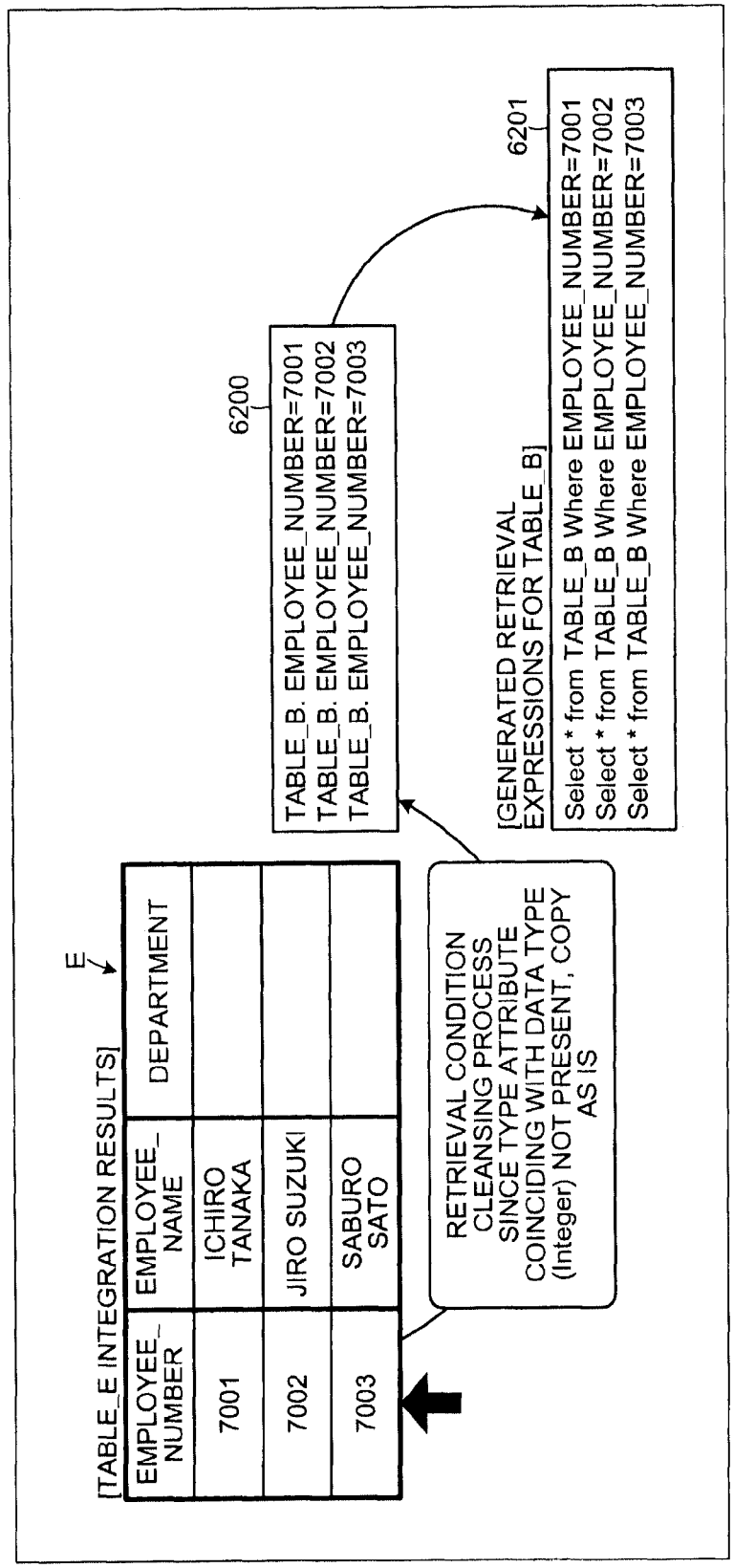
FIG. 62 is a diagram of a specific example of the retrieval condition cleansing process (step S4705) depicted in FIG. 47.

FIG. 62 is a diagram of a specific example of the retrieval condition cleansing process (step S4705) depicted in FIG. 47. By the retrieval condition cleansing process (step S4705) depicted in FIG. 62, the value of the To_COLUMN "TABLE_E.EMPLOYEE_NUMBER" on the second row (2) of the initialized mapping definition MD(E) is cleansed as a retrieval condition 6200 for "TABLE_B.EMPLOYEE_NUMBER" that is the From_COLUMN. In this cleansing, because data types (Integer) match while no type attribute is given, the retrieval condition value of the To_COLUMN "TABLE_E.EMPLOYEE_NUMBER" is directly copied. As a result, retrieval expressions 6201 for the TABLE_B are generated at step S4708.

FIG. 63 is a diagram of an example of updating a solution flag. Since the retrieval expression 6201 for the TABLE_B is generated as depicted in FIG. 62, in the mapping definition MD(E), a solution flag is raised for a row that can be solved by retrieval with the retrieval expressions 6201 for the TABLE_B (step S4709). Specifically, in the From_COLUMN of the mapping definition MD(E), solution flags for rows (2) and (3) having "TABLE_B" items are set to "1".

Subsequently, whether an unsolved mapping definition to be solved is present is checked at step S4710. An unsolved mapping definition (5) with a solution flag "0" is present, but the To_COLUMN "TABLE_D.DEPARTMENT" of the mapping definition (3) corresponding to the From_COLUMN "TABLE_D.NAME" of the mapping definition (5) is present. The From_COLUMN "TABLE_D.NAME" of the mapping definition (5) is, therefore, not a terminal column. As a result, the query breaking up process (step S4601) is ended.

In FIG. 46, when the query breaking up process (step S4601) is ended, the head retrieval expression for the physical model P is specified from generated retrieval expressions for the physical model P at step S4603. Specifically, from the generated retrieval expressions 6201 for the TABLE_B depicted in FIG. 62, the head retrieval expression "Select * From TABLE_B Where EMPLOYEE_NUMBER=7001" is specified. The specified retrieval expression is then executed at step S4604.

Figure 64:
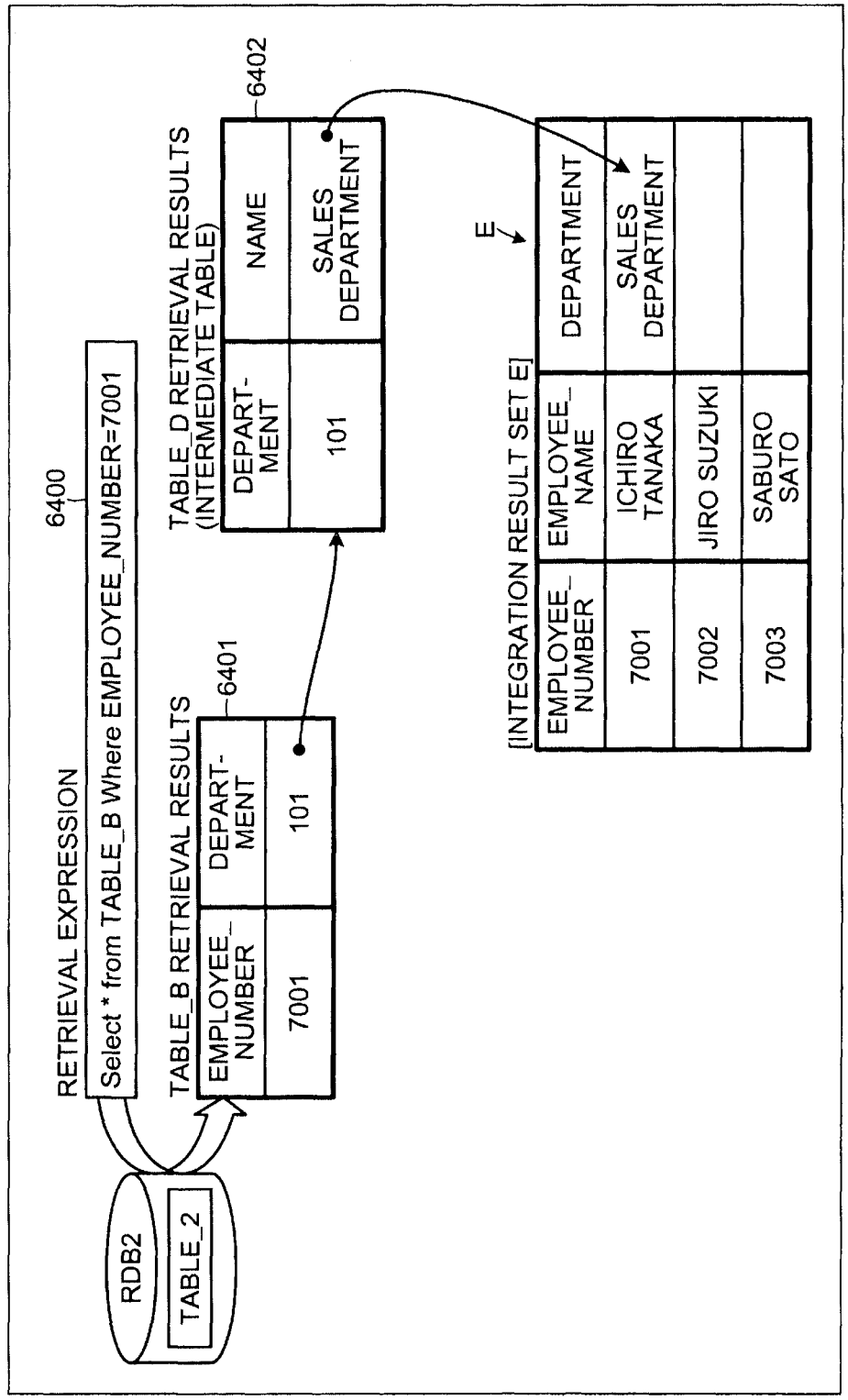
FIG. 64 is a diagram of the execution of a specified retrieval expression (step S4604).

FIG. 64 is a diagram of the execution of a specified retrieval expression (step S4604). As depicted in FIG. 64, a specified retrieval expression 6400 is executed to retrieve a retrieval result 6401 from the TABLE_2 of the RDB 2 allocated to the TABLE_B. The subject data reflecting process (step S4504) is then executed. "TABLE_B.DEPARTMENT" of the retrieval result 6401 cannot be directly reflected on the integration results E (step S5201 depicted in FIG. 52: NO).

The table conversion process (step S5202) is thus executed to acquire a retrieval result 6402 l from the intermediate TABLE_D. The retrieval result 6402 yields "NAME of DEPARTMENT: 101: SALES DEPARTMENT", which can be reflected on a department item of the integration results E. This series of processes is repeated to fill department items of the integration results E with names of departments corresponding to employees.

Figure 65:
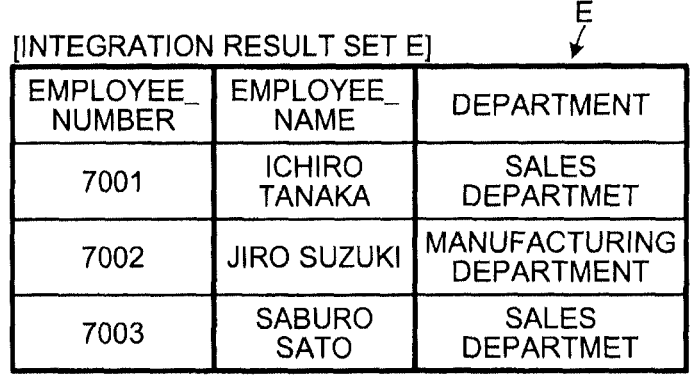
FIG. 65 is a diagram of an integration result set E at the time of completion of the PULL-type information integrating process.

FIG. 65 is a diagram of an integration result set E at the time of completion of the PULL-type information integrating process. As a result of acquisition of the integration result set E depicted in FIG. 65, the integration result set E is output to an output destination allocated by <OUT> of the physical integration instruction information 3700. Specifically, as depicted in FIG. 28, when the registering function 141 for registration with a CSV file is allocated to the TABLE_E, the integration result set E is converted into a CSV format by the registering function 141, and is registered with the CSV file "C:\Table-E.csv".

As depicted in FIG. 29, when the registering function 141 for registration to a database is allocated to the TABLE_E, the integration result set E is converted by the registering function 141 into registration information for the corresponding database, and is registered to the "TABLE 2" of the database "RDB 2". In this case, "EMPLOYEE_NUMBER" items of the logical model E are converted into "Id" items of the TABLE_2 and are registered.

A second embodiment will be described. The second embodiment is an execution example of the physical integration process (step S4005) when the following physical integration instruction information is given. In the same manner as in the first embodiment, meta-information prerequisite to the second embodiment is within the range of the model in FIG. 11 (combination of the physical model PA in FIG. 14, the physical model PB in FIG. 15, and the physical model MD(E) in FIG. 20). The second embodiment will hereinafter be described in correlation with the flowcharts above, using FIGS. 90 to 93. Since the second embodiment is nearly identical to the first embodiment, differences between the embodiments will be described.

FIG. 90 is a diagram of an example of physical integration instruction information 9000 in the second embodiment. In the physical integration instruction information 9000, an <IN> tag specifies two tables, TABLE_A and TABLE_B, as input data. By the subject data extracting process (step S4101), therefore, data extraction specified by the <IN> tag is carried out with respect to TABLE_A and TABLE_B. According to the physical integration instruction information 9000, all information present in the physical model TABLE_A as well as all information present in the physical model TABLE_B are extracted, and data of the logical model TABLE_E is returned as the result of integration of the extracted information. An extraction condition may be specified with a Where clause.

FIG. 91 is a diagram of initialization of a mapping definition (step S4501) of the second embodiment. In the process of initializing the mapping definition MD(E) (step S4501) of the PUSH-type information integration process (step S4105), as depicted in FIG. 91, solution flags for the mapping definitions (1) and (4) that are solvable with respect to the TABLE_A are set to "1", and then solution flags for the mapping definitions (2) and (3) that are solvable with respect to the TABLE_B are set to "1".

Specifically, in the mapping definition MD(E) on the left side in FIG. 91, a solution flag for solvable mapping with respect to the TABLE_A specified by the first <IN> tag of the physical integration instruction information 9000 depicted in FIG. 90 is set to "1", which means the solution flags for the mapping definitions (1) and (4) having "TABLE_A" on the From-side are set to "1".

In the mapping definition MD(E) on the right side in FIG. 91, a solution flag for solvable mapping with respect to the TABLE_B specified by the second <IN> tag depicted in FIG. 90 is set to "1", which means the solution flags for the mapping definitions (2) and (3) having "TABLE_B" on the From-side are set to "1".

FIG. 92 is a diagram of the first execution of the subject data reflecting process (reflecting process with respect to the TABLE_A) (step S4504) according to the second embodiment. FIG. 92 depicts a state of completion of the subject data reflecting process (step S4504) with respect to the TABLE_A. This subject data reflecting process is identical to the subject data reflecting process according to the first embodiment.

Subsequently, whether unprocessed data is present is checked (step S4506). Input data "TABLE_B" is found to be unprocessed (step S4506: YES), thus the procedure returns to step S4505, at which "extraction result from the TABLE_B", which is unprocessed input data, is pointed to and the subject data reflecting process is executed (step S4504).

Figure 93:
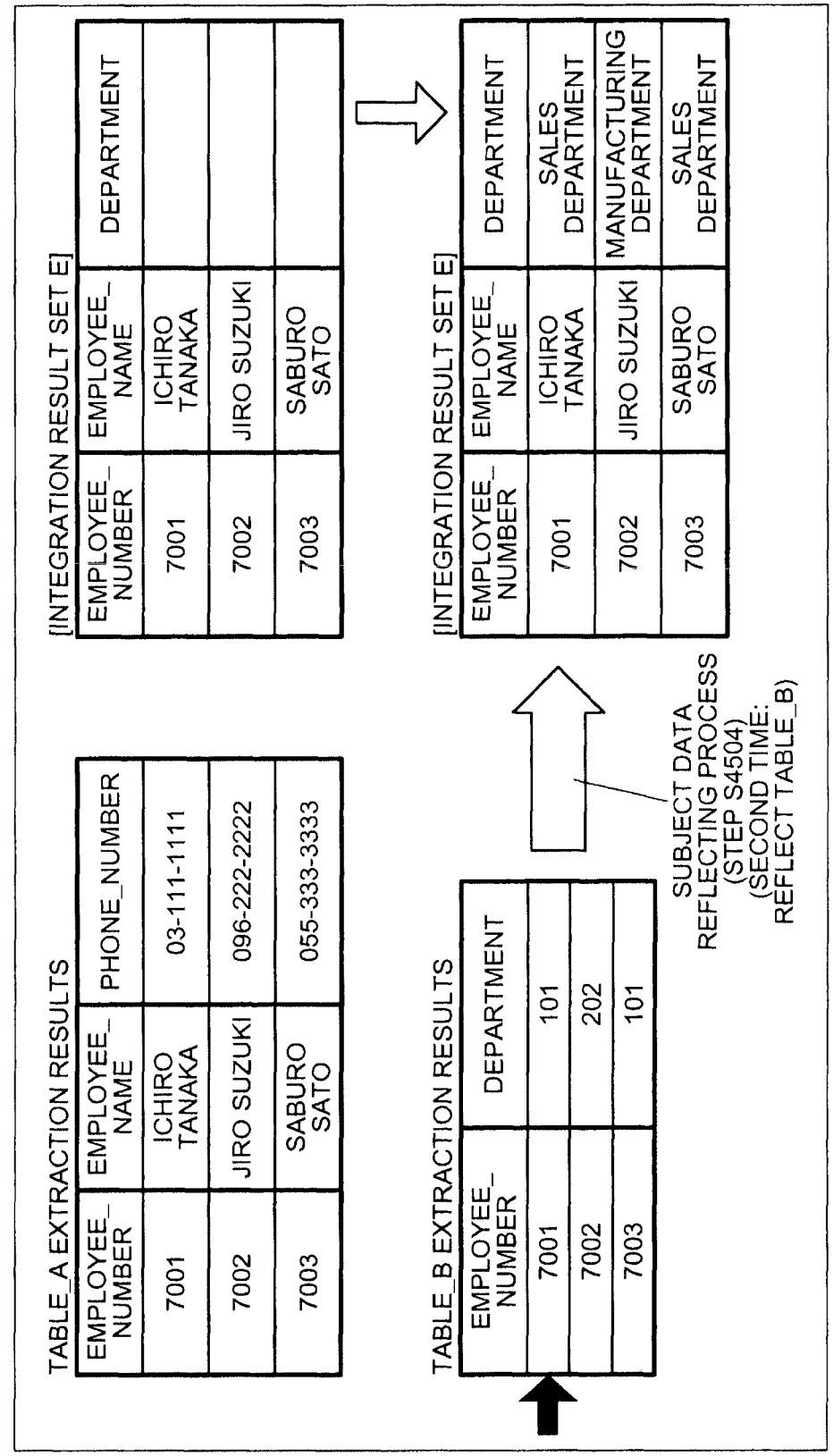
FIG. 93 is a diagram of the second execution of the subject data reflecting process (reflecting process with respect to the TABLE_B) (step S4504) according to the second embodiment.

FIG. 93 is a diagram of the second execution of the subject data reflecting process (reflecting process with respect to the TABLE_B) (step S4504) according to the second embodiment. FIG. 93 depicts a state of completion of the subject data reflecting process (step S4504) with respect to the TABLE_B.

This subject data reflecting process is identical to the "subject data reflecting process (step S4504)" of reflecting the result of execution of a retrieval expression (step S4604) in the PULL-type information integration process (FIG. 46) according to the first embodiment. Hence, the table conversion process (step S5202) is carried out to reflect onto a department item of the integration result information E, the result of reading a department number from the TABLE_B as a department name for the TABLE_E using the intermediate TABLE_D.

The subject data reflecting process (step S4504) is thus completed on all input data (step S4506: NO), and the procedure proceeds to step S4507. At this point, solution flags for all rows except the fifth row (5) having no terminal column are set to "1" in the mapping definition MD(E) depicted in FIG. 91 (step S4507: NO) and thus, the PUSH-type information integration process (step S4105) is completed without executing the PULL-type information integration process (step S4201). In this manner, the PUSH-type information integration process (step S4105) does not need the PULL-type information integration process when all data necessary for integration of a specified logical model is input in advance.

In the end, an integration result is output to an output destination allocated to the TABLE_E by a storage condition specified in an <OUT> tag in the physical integration instruction information 9000 in the same manner as in the first embodiment, and the physical integration process (step S4005) is completed to complete the entire integration process.

When meta-information in a range depicted in FIG. 10 (combination of the physical model PA depicted in FIG. 14, the physical model PB depicted in FIG. 15, the physical model LC depicted in FIG. 19, and the mapping definition MD(C)) is a prerequisite and the "TABLE_C", instead of the table "E", is specified by the <OUT> tag of the physical integration instruction information 9000, it is obvious that the information integration process is carried out normally in the same manner as in the second embodiment. In this case, a department item of the TABLE_B can be reflected directly on a department item of the TABLE_C by the subject data reflecting process (step S4504) of the PUSH-type information integration process (step S4105) and thus, the table conversion process (step S5202) is not executed.

A third embodiment will be described. The third embodiment is an example of executing the virtual integration process (step S4006) when virtual integration instruction information 3800 depicted in FIG. 38 is given. Meta-information used in the third embodiment is within the range of the model depicted in FIG. 11, as in the first and the second embodiments. The third embodiment will hereinafter be described in correlation with the flowcharts above, using FIGS. 66 to 79.

At the start of the virtual integration process (step S4006), a retrieval expression serving as a retrieval condition is extracted from the virtual integration instruction information 3800.

Figure 66:
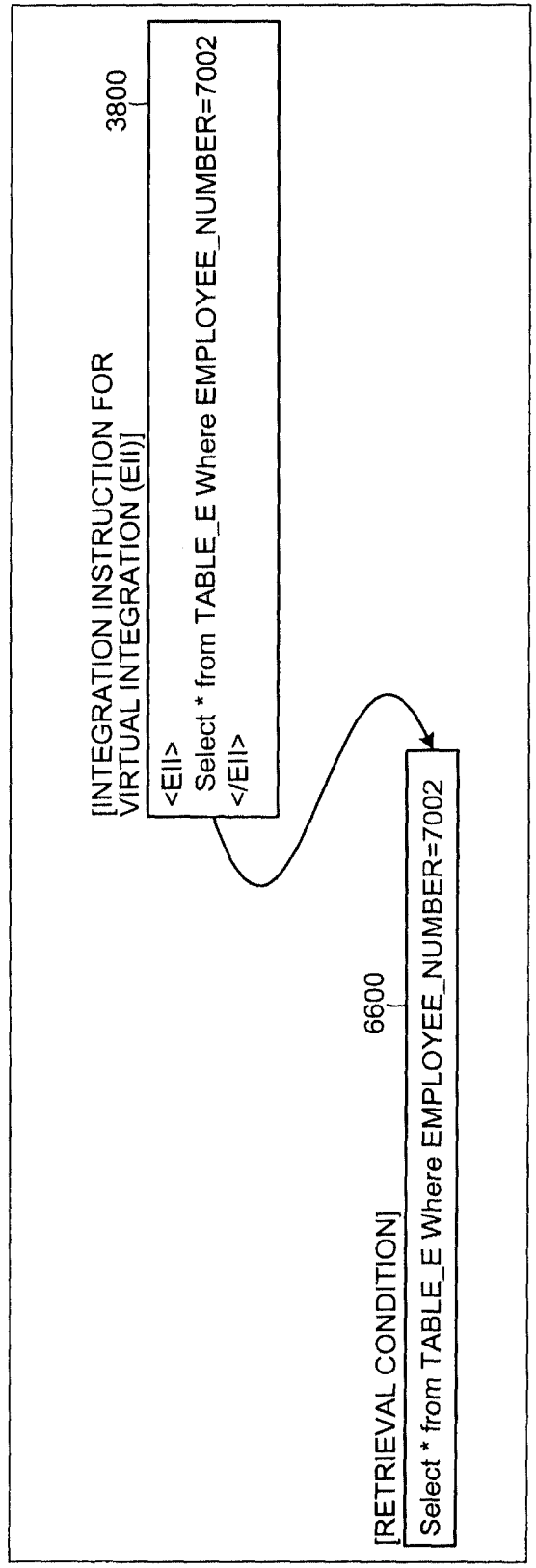
FIG. 66 is a diagram of an example of extraction of a retrieval condition (step S4200) depicted in FIG. 42.

FIG. 66 is a diagram of an example of extraction of a retrieval condition (step S4200) depicted in FIG. 42. In FIG. 66, a retrieval expression specified by <EII> tag of the virtual integration instruction information 3800 is extracted as a retrieval condition 6600. The extracted retrieval condition 6600 is input, and the PULL-type information integration process is started (step S4201), and then the query breaking up process (step S4601) is executed.

In the query breaking up process (step S4601), the mapping definition MD(E) for the logical model LE (TABLE_E) specified by the retrieval condition 6600 is acquired, and solution flags are cleared (step S4703 depicted in FIG. 47).

FIG. 67 is a diagram of initialization of the mapping definition MD(E) acquired from the retrieval condition 6600. For the mapping definition MD(E) depicted in FIG. 67, solution flags for solved columns are cleared at step S4703. At step S4704, the mapping definition (1) of the first row having a solution flag "0" is specified, and the From_COLUMN "TABLE_A.EMPLOYEE_NUMBER" of the mapping definition (1) is retrieved. The retrieval condition cleansing process (step S4705) is then carried out on the retrieved From_COLUMN "TABLE_A.EMPLOYEE_NUMBER".

FIG. 68 is a diagram of an example of the retrieval condition cleansing process. In this example, the From_COLUMN "TABLE_A.EMPLOYEE_NUMBER" of the mapping definition is determined to be a cleansing destination while the To_COLUMN "TABLE_E.EMPLOYEE_NUMBER" of the mapping definition, which is a retrieval condition 6801, is determined to be a cleansing origin, and the cleansing is carried out. The To_COLUMN "TABLE_E.EMPLOYEE_NUMBER" that is the retrieval condition 6801 and the From_COLUMN "TABLE_A.EMPLOYEE_NUMBER" that is the retrieval subject are identical in data type and type attribute.

The value "7002" of the To_COLUMN "TABLE_E.EMPLOYEE_NUMBER" that is the retrieval condition 6801 is directly copied as the retrieval value of the From_COLUMN "TABLE_A.EMPLOYEE_NUMBER" that is the retrieval subject. The From_COLUMN "TABLE_A.EMPLOYEE_NUMBER", which is a cleansing result 6802, is a terminal column. Hence, a retrieval expression 6900 is generated from the cleansing result 6802 (step S4708 depicted in FIG. 47).

Figure 69:
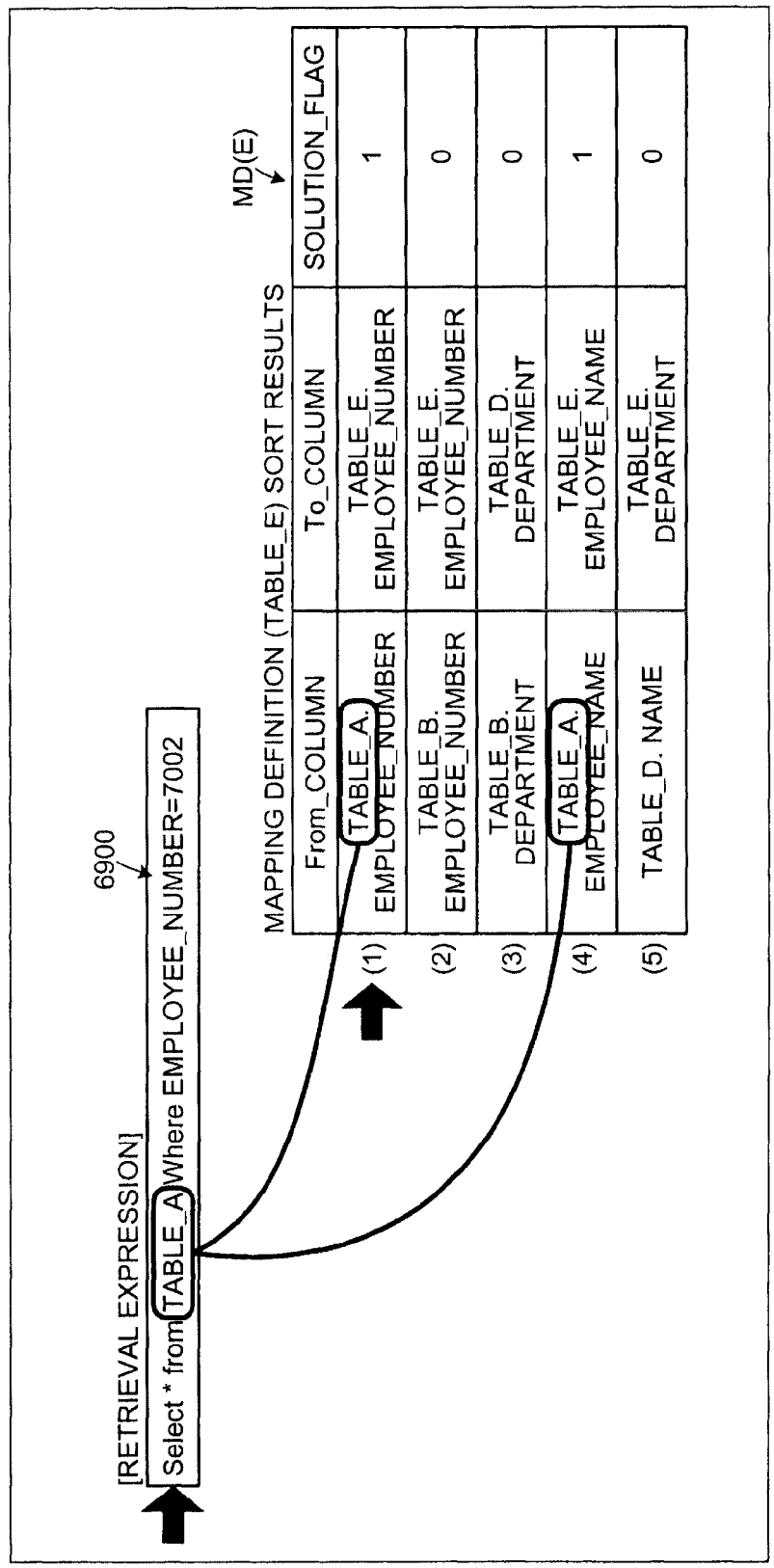
FIG. 69 is a diagram of an example of a first generation of a retrieval expression at step S4708 depicted in FIG. 47.

FIG. 69 is a diagram of an example of the first generation of a retrieval expression at step S4708 depicted in FIG. 47. The generated retrieval expression 6900 specifies the TABLE_A as a retrieval subject, thus solution flags for the rows (1) and (4) on which a "TABLE_A" item is indicated in the From_COLUMN of the mapping definition MD(E) are set to "1". In this case, because unsolved mapping definitions (2), (3), and (5) are present, the same process is carried out to generate a retrieval expression from a cleansing result again (step S4708 depicted in FIG. 47).

Figure 70:
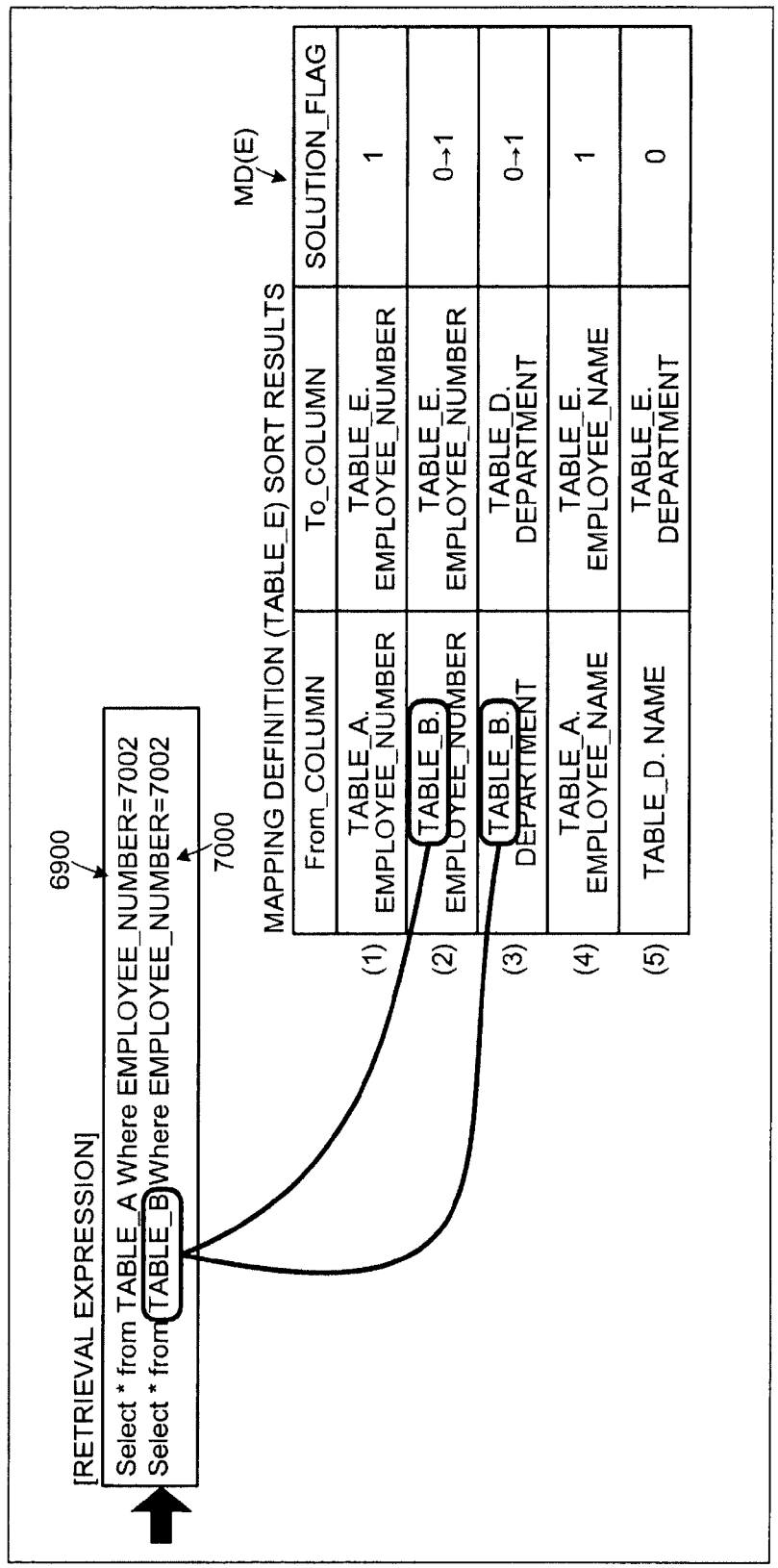
FIG. 70 is a diagram of an example of a second generation of a retrieval expression at step S4708 depicted in FIG. 47.

FIG. 70 is a diagram of an example of the second generation of a retrieval expression at step S4708 depicted in FIG. 47. In FIG. 70, a retrieval expression 7000 is newly generated. The generated retrieval expression 7000 specifies the TABLE_B as a retrieval subject and thus, solution flags for the rows (2) and (3) on which a "TABLE_B" item is present in the From_COLUMN of the mapping definition MD(E) are set to "1". The unsolved mapping definition (5) is not a mapping definition having a terminal column, which leads to a conclusion that a mapping definition to be solved is not present and thus, brings the query breaking up process (step S4602) to an end.

Subsequently, in the PULL-type information integration process (step S4201), the retrieval expressions 6900 and 7000 for the physical model P generated by the query breaking up process are specified from the head expression. The specified retrieval expression 6900 is thus executed (steps S4603 and S4604 depicted in FIG. 46).

Figure 71:
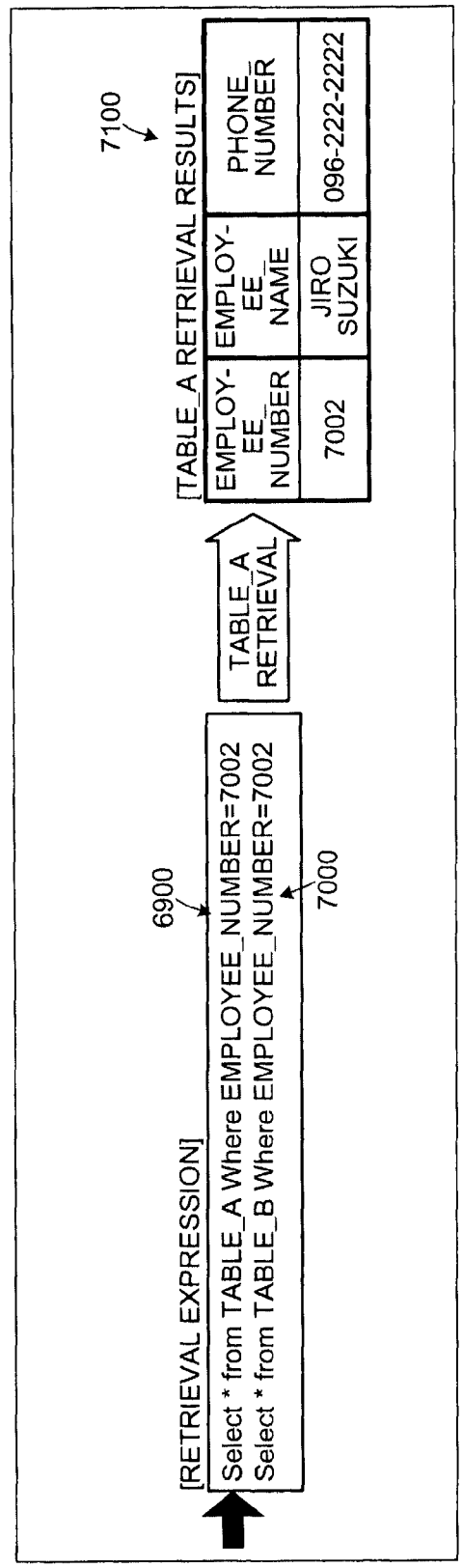
FIG. 71 is a diagram of retrieval using retrieval expressions 6900.

FIG. 71 is a diagram of retrieval using the retrieval expressions 6900. As depicted in FIG. 71, based on the retrieval expressions 6900, employee information of "EMPLOYEE_NUMBER: 7002" is retrieved from the TABLE_A according to the physical model PA. This obtains a retrieval result 7100 with respect to the TABLE_A. Subsequently, the subject data reflecting process (step S4504) is executed.

Figure 72:
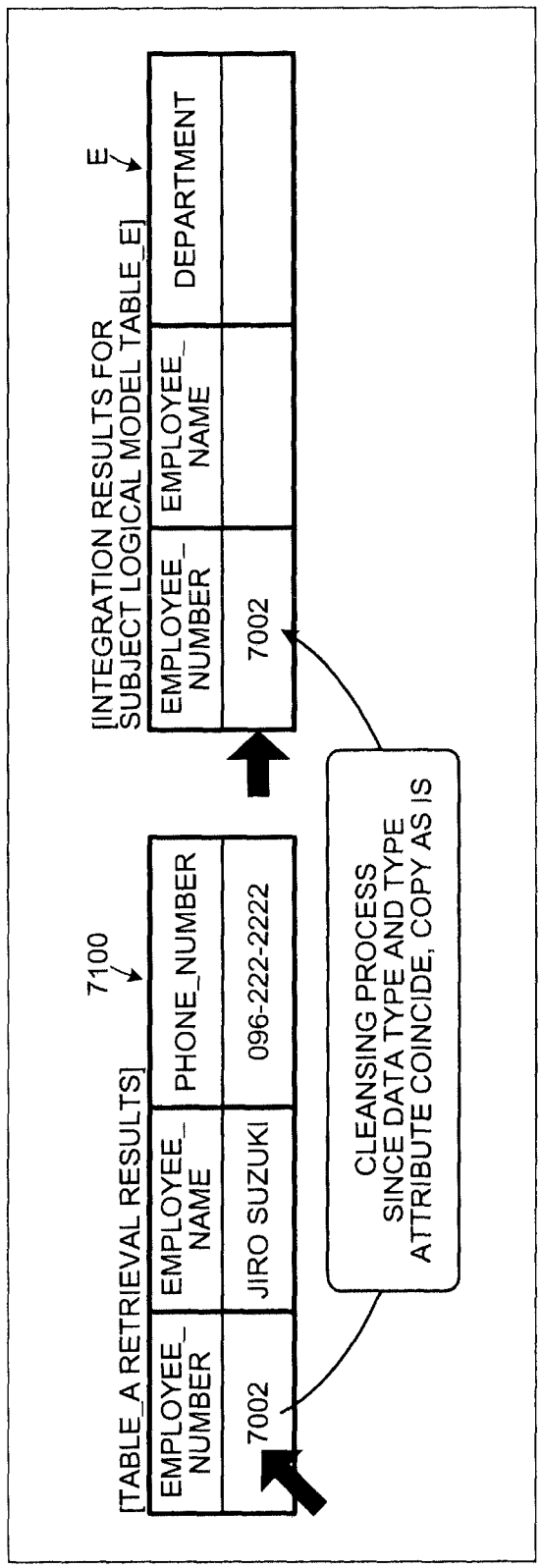
FIG. 72 is a diagram of a specific example of a first execution of the subject data reflecting process (step S4504).

FIG. 72 is a diagram of a specific example of the first execution of the subject data reflecting process (step S4504).

As depicted in FIG. 72, in the mapping definition MD(E), the first row (1), which is the row to be subjected to the process, is referred to in the subject data reflecting process (step S4504). The From_COLUMN "TABLE_A.EMPLOYEE_NUMBER" of the first row (1) can be reflected directly in the To_COLUMN "TABLE_E.EMPLOYEE_NUMBER" (step S5201:YES). Hence, the cleansing process is executed at step S5203, and the result reflecting process is executed at step S5204.

Specifically, the head value "7002" among the values "7002", "JIRO SUZUKI", and "096-222-2222" included in the retrieval result 7100 on the TABLE_A is selected as a subject data to be reflected. Because an employee number of the TABLE_A and an employee number of the TABLE_E are identical in data type and type attribute, "7002", i.e., the retrieval result for the TABLE_A, is directly copied, as an employee number, to the TABLE_E.

Figure 73:
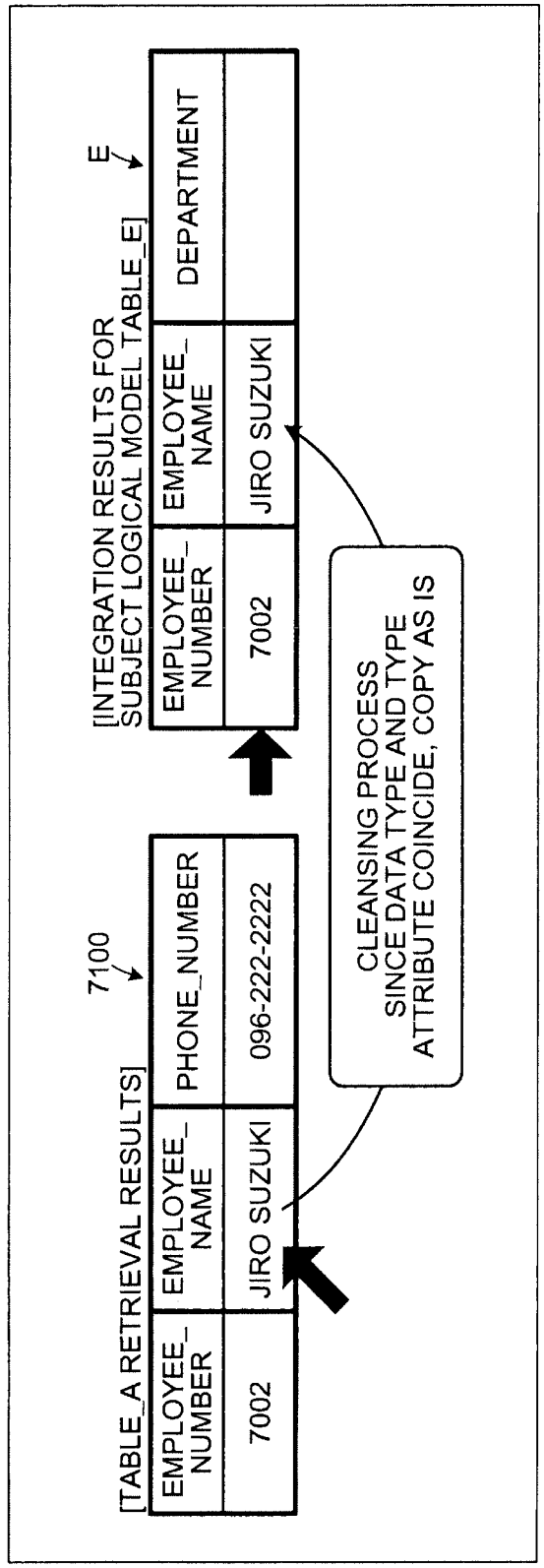
FIG. 73 is a diagram of a specific example of a second execution of the subject data reflecting process (step S4504).

FIG. 73 is a diagram of a specific example of the second execution of the subject data reflecting process (step S4504). As depicted in FIG. 73, the first row (4) of the mapping definition MD(E) is referred to in the subject data reflecting process (step S4504). The From_COLUMN "TABLE_A.NAME" of the first row (4) can be reflected directly in the To_COLUMN "TABLE_E.NAME" (step S5201 depicted in FIG. 52: YES). Hence, the cleansing process is executed at step S5203, and the result reflecting process is executed at step S5204.

Specifically, among the values "7002", "JIRO SUZUKI", and "096-222-2222" included in the retrieval result 7100 for the TABLE_A, the value "JIRO SUZUKI" is selected as subject data and is reflected. Because a name in the TABLE_A and a name in the TABLE_E are identical in data type and type attribute, "JIRO SUZUKI", i.e., the retrieval result for the TABLE_A, is directly copied to the TABLE_E as a name. Among the values included in the retrieval result 7100, the value representing a phone number is not reflected on the TABLE_E (because of the absence of a phone number in the From_COLUMN of the mapping definition MD(E)), which means subsequent data to be reflected is not present (step S5206). Hence, the subject data reflecting process (step S4504) is ended. Subsequently, the next retrieval expression is specified (step S4608).

Figure 74:
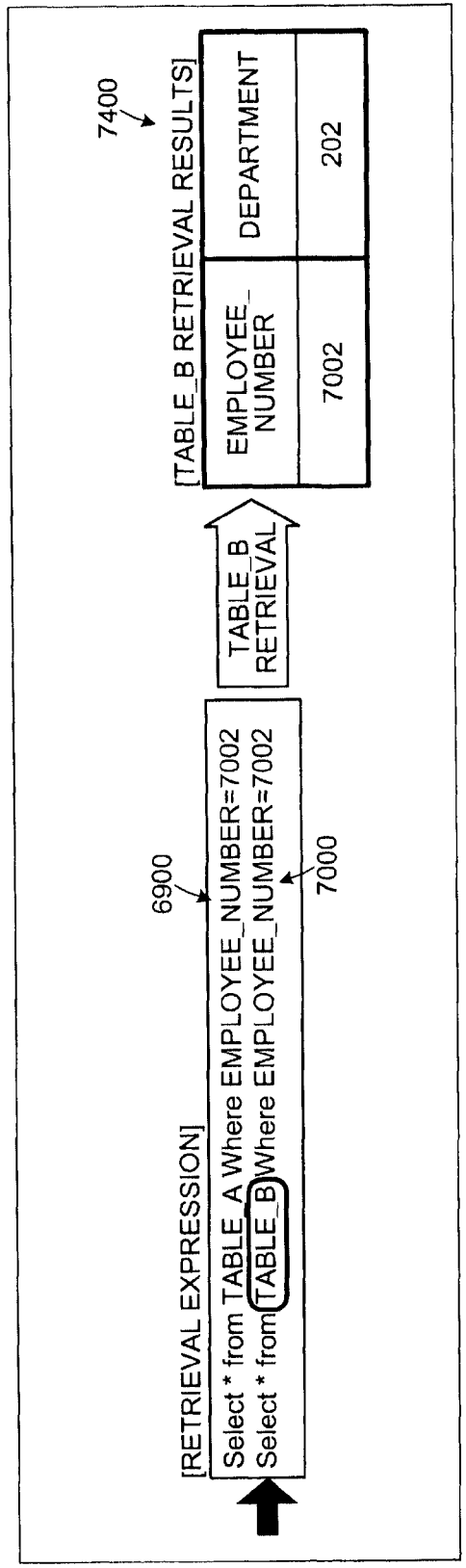
FIG. 74 is a diagram of retrieval by retrieval expression 7000.

FIG. 74 is a diagram of retrieval by the retrieval expression 7000. As depicted in FIG. 74, the retrieval expression 7000 is specified as the next retrieval expression and thus, the retrieval expression 7000 is executed acquiring a retrieval result 7400 with respect to the TABLE_B (step S4605). The subject data reflecting process (step S4504) is executed using the retrieval result 7400 for the TABLE_B as input.

In the subject data reflecting process (step S4504), the head value "EMPLOYEE_NUMBER=7002" is specified first among the values in the retrieval result 7400 for the TABLE_B, "EMPLOYEE_NUMBER=7002" and "DEPARTMENT=202". In this case, the second row (2) of the mapping definition MD(E) is referred to. The From_COLUMN "TABLE_B.EMPLOYEE_NUMBER" of the mapping definition (2) can be reflected directly in the To_COLUMN "TABLE_E.EMPLOYEE_NUMBER" (step S5201: YES depicted in FIG. 52). Hence, the cleansing process is executed at step S5203, and the result reflecting process is executed at step S5204.

The To_COLUMN "TABLE_E.EMPLOYEE_NUMBER" corresponding to the From_COLUMN "TABLE_B.EMPLOYEE_NUMBER" is an Mkey item, and a record having the same value "7002" in the employee number item is already present in the integration results E. As a result, a process subject record of the integration results E is moved onto "EMPLOYEE_NUMBER=7002" (in this case, with no other record present, the process subject record is not moved).

FIG. 75 is a diagram depicting movement of a process subject record of the integration result set E. In the subject data reflecting process (step S4504), the value "DEPARTMENT=202" is specified next among the values of the retrieval result 7400 in the TABLE_B, "EMPLOYEE_NUMBER=7002" and "DEPARTMENT=202".

FIG. 76 is a diagram of an example of a retrieval result for the TABLE_B in the subject data reflecting process (step S4504). As depicted in FIG. 76, a retrieval result 7600 with respect to the TABLE_B is acquired, and the third row (3) of the mapping definition MD(E) is referred to in the subject data reflecting process (step S4504). The From_COLUMN "TABLE_B.DEPARTMENT" of the mapping definition (3) cannot be reflected directly on the logical model L (see (3) in FIG. 11).

The table conversion process (step S5202) depicted in FIG. 52 is, therefore, executed, at which the retrieval condition cleansing process (step S4705) depicted in FIG. 45 is executed in the table conversion process. In FIG. 76, because the department of the TABLE_B is identical in data type (Integer) with the department of the TABLE_D and accompanies no type attribute, the value of the department "202" is copied directly to acquire a cleansing result 7601. With this cleansing result 7601, a retrieval expression 7602 for the TABLE_D (physical model D) is generated (step S5403 depicted in FIG. 54). Subsequently, the generated retrieval expression 7602 is executed to carry out retrieval from an intermediate table (step S5302).

FIG. 77 is a diagram of a retrieval result 7700 for the TABLE_D retrieved as an intermediate table. Since the physical model PD includes DEPARTMENTS (Integer) and NAMES (String), the department name "MANUFACTURING DEPARTMENT" can be retrieved based on the department "202". As a result, a value pointed on the TABLE_B (DEPARTMENT "202") is replaced with the NAME "MANUFACTURING DEPARTMENT" corresponding to the DEPARTMENT "202" of the TABLE_D. Subsequently, the subject data reflecting process (step S4504) is executed using the retrieval result 7700 for the TABLE_D.

Figure 78:
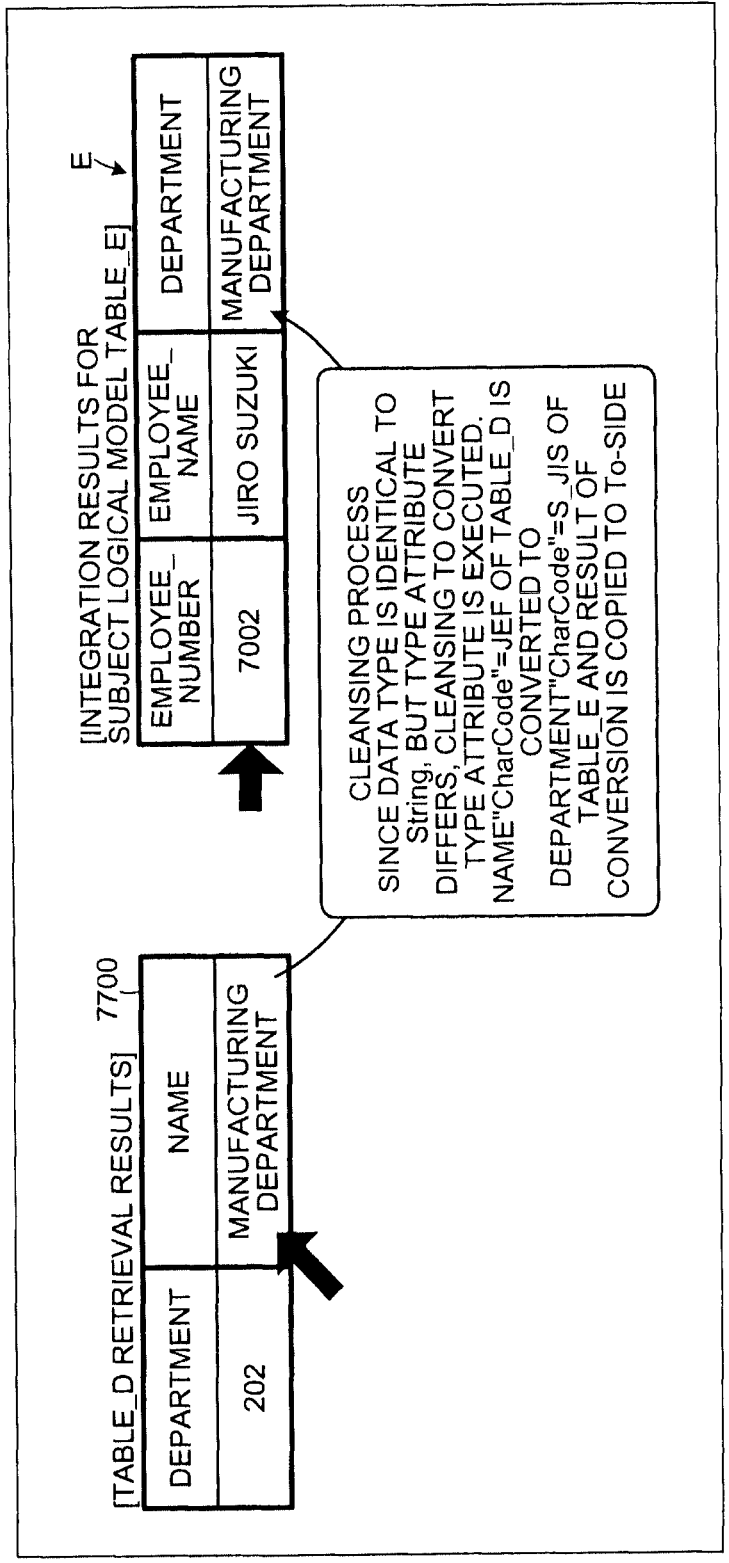
FIG. 78 is a diagram of an example of the subject data reflecting process (step S4504) executed on a retrieval result 7800 for the TABLE_D.

FIG. 78 is a diagram of an example of the subject data reflecting process (step S4504) executed on a retrieval result 7800 for the TABLE_D. As depicted in FIG. 78, the fifth row (5) of the mapping definition MD(E) is referred to in the subject data reflecting process (step S4504). The From_COLUMN "TABLE_D.NAME" of the mapping definition (5) can be reflected directly in the To_COLUMN "TABLE_E.DEPARTMENT" (step S5201: YES depicted in FIG. 52). Hence, the cleansing process is executed at step S5203, and the result reflecting process is executed at step S5204.

In the cleansing process (step S5203), both From_COLUMN "TABLE_D.NAME" and To_COLUMN "TABLE_E.DEPARTMENT" have the same data type of String (character string type) but have different CharCode type attributes and thus, type attribute conversion is carried out. Specifically, the cleansing process is executed to convert the type attribute "CharCode"=JEF of NAME the TABLE_D into the type attribute "CharCode"=S_JIS of the DEPARTMENT in the TABLE_E. The result of type attribute conversion ("MANUFACTURING DEPARTMENT" in S_JIS code) is then copied onto the To_COLUMN "TABLE_E.DEPARTMENT". Because neither data item is an Mkey item, the type attribute conversion result ("MANUFACTURING DEPARTMENT" in S_JIS code) is copied onto the DEPARTMENT item of a record of the integration results E that is a process subject at that point in time.

As a result, no data to be reflected is present (step S5206: NO), which brings the subject data reflecting process (step S4504) for the TABLE_D to an end. The retrieval expressions 6900 and 7000 generated by the query breaking up process are thus all processed, leaving no unprocessed retrieval expression (step S4607: NO), which means the PULL-type information integration process (step S4201) is successful. Hence, the integration results E are acquired as a final result.

FIG. 79 is a diagram of the integration result set E output as a virtual integration result. The integration results E in FIG. 79 are provided to the user system that has made the query to the logical model L.

A fourth embodiment will be described. The fourth embodiment is an execution example of the stream integration process (step S4007) when stream integration instruction information 3900 depicted in FIG. 39 is provided. Meta-information used as a prerequisite in the fourth embodiment is within a range of a model depicted in FIG. 12, and is used for a combination of the physical model PS depicted in FIG. 18, the physical model PD depicted in FIG. 16, the physical model PT depicted in FIG. 17, the logical model LN depicted in FIG. 21, and the mapping definition MD(N). The fourth embodiment will hereinafter be described in correlation with the flowcharts above, using FIGS. 80 to 89.

Figure 80:
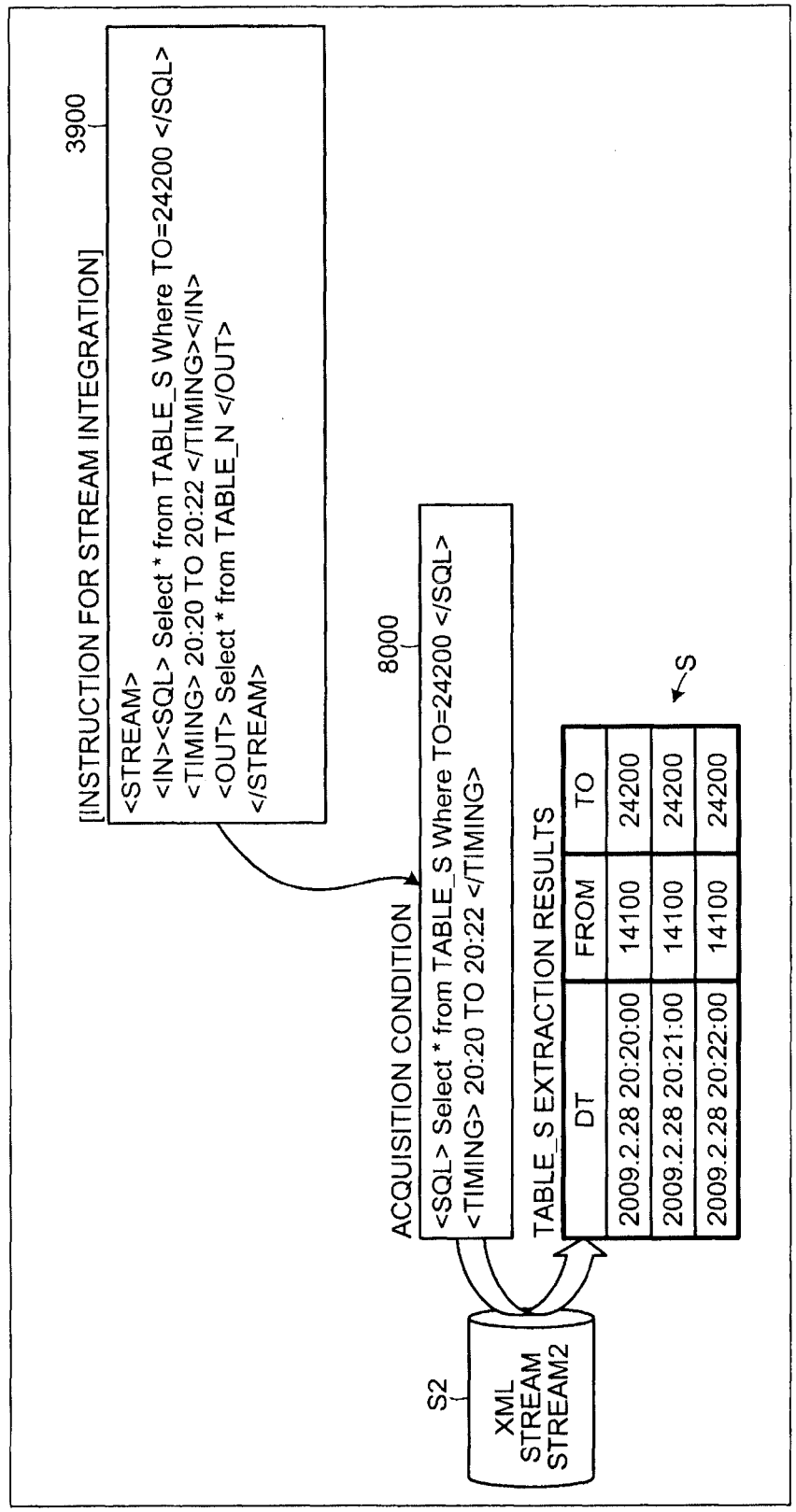
FIG. 80 is a diagram of an example of acquisition of subject data by stream integration.

FIG. 80 is a diagram of an example of acquisition of subject data by stream integration. As depicted in FIG. 80, subject data is acquired as a TABLE_S (extraction result S) from data stream S2 of the source-side 110, using an acquisition condition 8000 specified by an <IN> tag of the stream integration instruction information 3900. This acquisition process is executed by the data stream monitoring procedure depicted in FIG. 43. Specifically, the data stream S2 allocated to the TABLE_S is monitored under a start condition of "20:20" and an end condition of "20:22" that are specified by a <TIMING> tag of the acquisition condition 8000, and phone call information (FIG. 8) matching a condition "Select * From TABLE_S Where TO=24200" specified by an <SQL> tag is acquired to store the acquired phone call information in an acquisition queue.

In stream integration, the PUSH-type information integration process (step S4105) is executed by input of acquired data (extraction result S), and an acquired integration result is output to an output destination allocated to integration result information (TABLE_N) specified by an <OUT> tag. At the start of the PUSH-type information integration process, the mapping definition MD(N) for the TABLE_N specified by the <OUT> tag of the stream integration instruction information 3900 is initialized (step S4501 depicted in FIG. 45).

Figure 81:
FIG. 81 is a diagram of the mapping definition MD(N) that has been initialized.

FIG. 81 is a diagram of the mapping definition MD(N) that has been initialized. All solution flags are set to "0" to be cleared, and solution flags for the mapping definitions (1), (2), (3), and (4) each having an item of "TABLE_S" representing all input data in the From_COLUMN are set to "1" (step S4501). Upon completion of the initialization, the PUSH call flag Fpc is set to 1 (step S4502). Subsequently, the extraction result S on the TABLE_S is to be reflected on the integration result N on the logical model L (step S4503).

Figure 82:
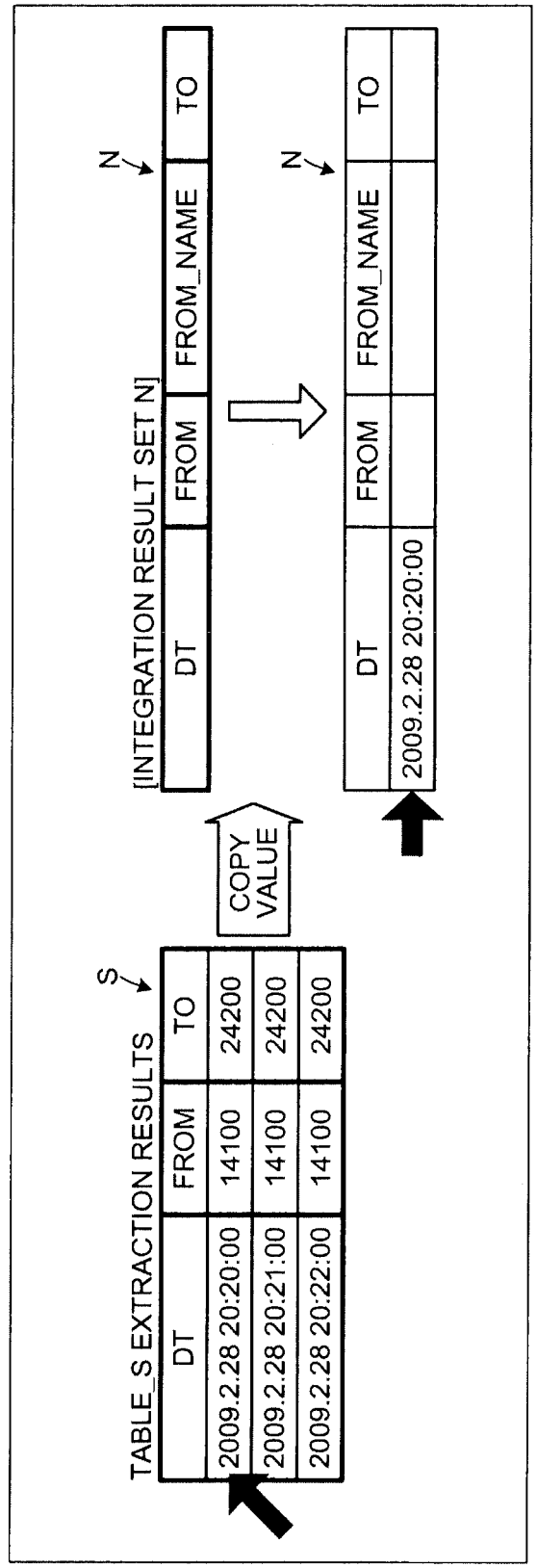
FIG. 82 is a diagram of an example of the subject data reflecting process with respect to the head subject data of an extraction result S.

FIG. 82 is a diagram of an example of the subject data reflecting process with respect to the head subject data of the extraction result S. In FIG. 82, "DT=2009.2.28.20:20:00" at the head of extraction result S is specified as the subject data, and the first row (1) of the mapping definition MD(N) in FIG. 81 is referenced in the subject data reflecting process (step S4504). The From_COLUMN "TABLE_S.DT" of the mapping definition (1) can be reflected directly in the To_COLUMN "TABLE_N.DT" (step S5201: YES depicted in FIG. 52). "TABLE_N.DT" is an Mkey item, and no record having the DT item is present in the integration result N, thus a new record is generated (step S5804) to copy "DT=2009.2.28.20:20:00" onto the DT item of the new record (step S5805).

Figures 83, 84:
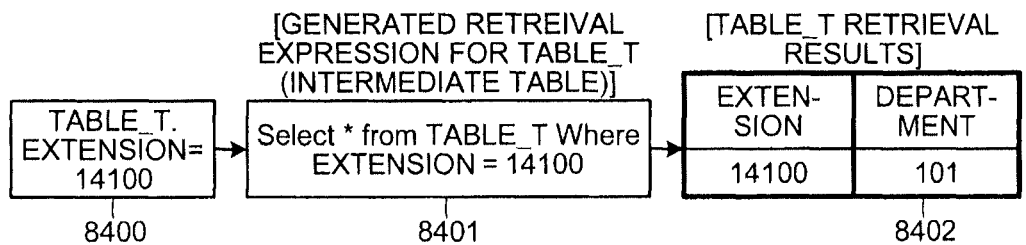
FIG. 83 is a diagram of an example of specifying the next subject data of the extraction result S.
FIGS. 84 and 85 are diagrams of examples of an intermediate table retrieval process in stream integration.

FIG. 83 is a diagram of an example of specifying the next subject data of the extraction result S. As depicted in FIG. 83, data "FROM=14100" next to the head data "DT=2009.2.28.20:20:00" is specified as the subject data (step S5207). In the mapping definition MD(N), rows having "TABLE_S.FROM" in the From_COLUMN are rows (2) and (4). The To_COLUMN of the mapping definition (4) cannot be reflected directly on the integration result N (step S5201: NO depicted in FIG. 52) and thus, the table conversion process (step S5202) is carried out.

FIG. 84 is a diagram of a first example of an intermediate table retrieval process in stream integration. The subject data specified in FIG. 83 is "FROM=14100" of the TABLE_S. On the second row (4) of the mapping definition MD(N), the To_COLUMN is "TABLE_T.EXTENSION". As a result, a retrieval condition 8400 in "TABLE_T.EXTENSION=14100" is generated, and a retrieval expression 8401 for retrieval on an intermediate table (TABLE_T) is generated using the generated retrieval condition 8400. By executing the retrieval expression 8401, a retrieval result 8402 on the TABLE_T is acquired (step S5302).

Figure 85:
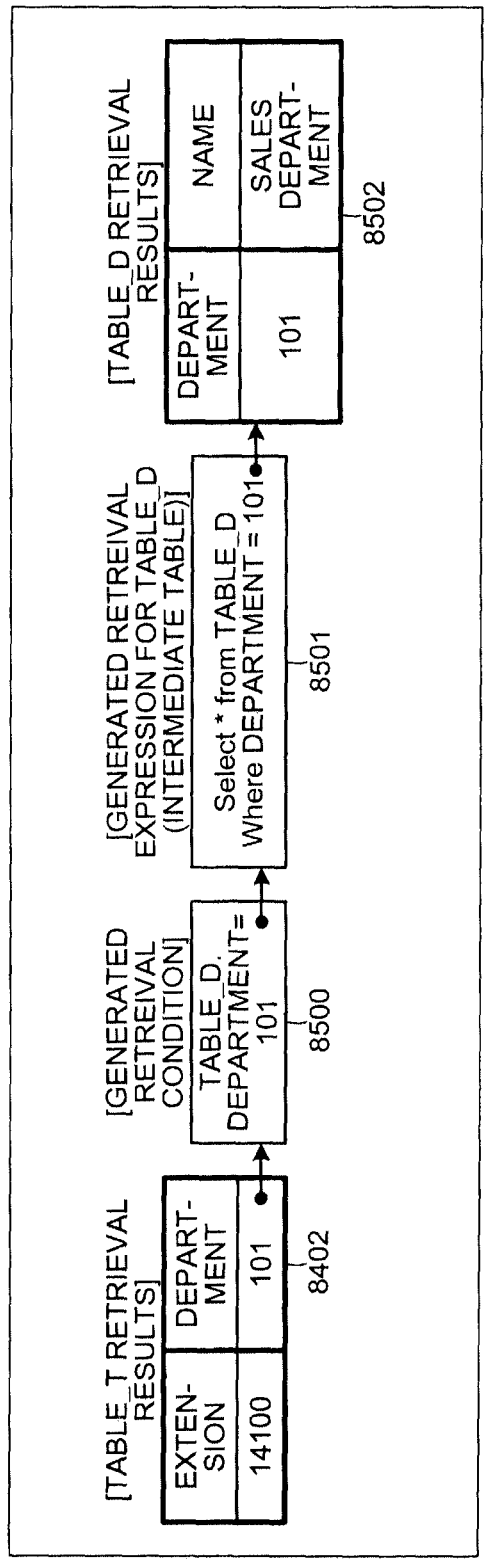

FIG. 85 is a diagram of an example (2) of an intermediate table retrieval process in stream integration. According to the retrieval result 8402 for the TABLE_T depicted in FIG. 84, "DEPARTMENT=101" of "EXTENSION=14100" is acquired. The To_COLUMN of the third row (5) of the mapping definition MD(N) having the From_COLUMN "TABLE_T.DEPARTMENT" is, however, "TABLE_D.DEPARTMENT", which does not represent the logical model L. The To_COLUMN, therefore, cannot be reflected directly on the integration result N (step S5201: NO depicted in FIG. 52). The table conversion process (step S5202) is thus executed.

Because the To_COLUMN of the third row (5) of the mapping definition MD(N) is "TABLE_D.DEPARTMENT", a retrieval condition 8500 "TABLE_D.DEPARTMENT=101" is generated. A retrieval expression 8501 for retrieval from an intermediate table (TABLE_D) is then generated, using the generated retrieval condition 8500. By executing the retrieval expression 8501, a retrieval result 8502 for the TABLE_D is acquired (step S5302).

Figure 86:
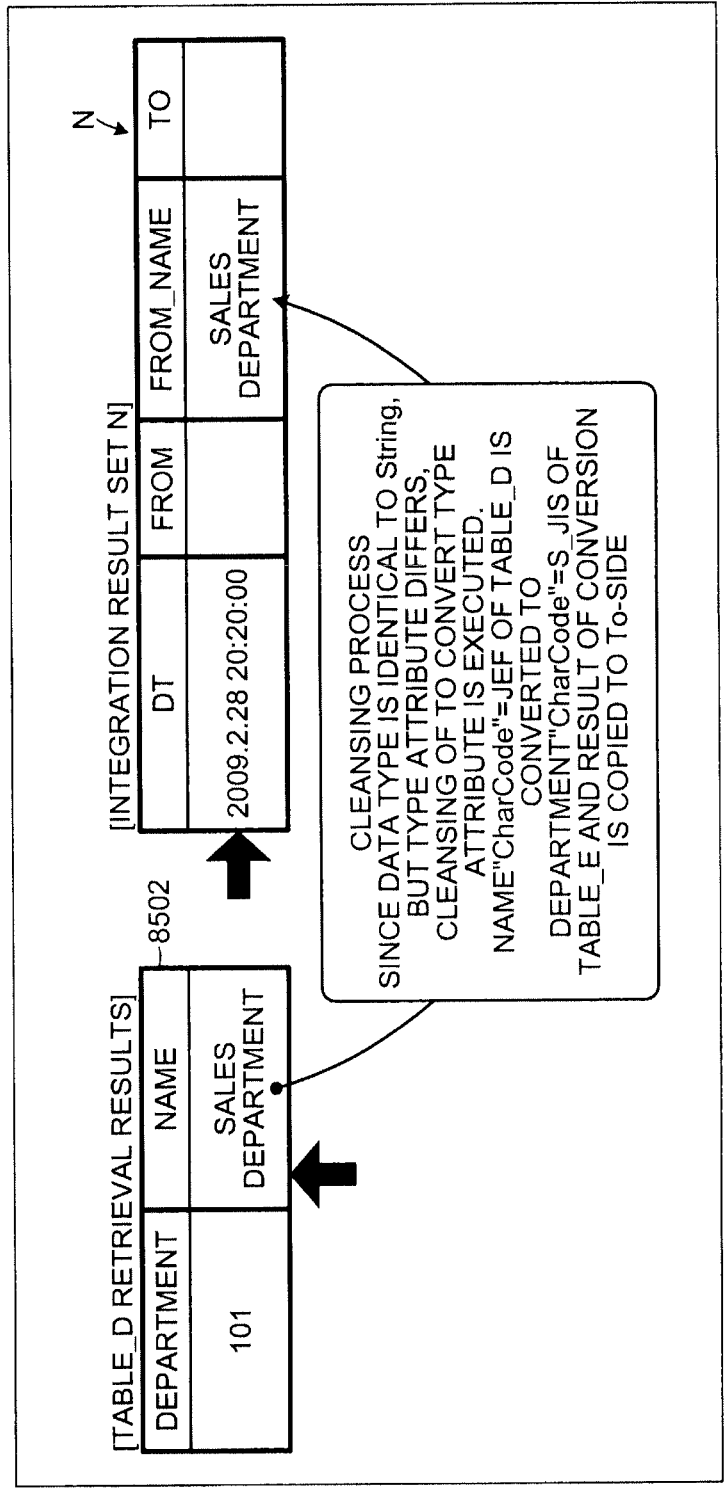
FIG. 86 is a diagram of an example of the subject data reflecting process (step S4504) on a retrieval result 8502 for the TABLE_D.

FIG. 86 is a diagram of an example of the subject data reflecting process (step S4504) on the retrieval result 8502 for the TABLE_D. As depicted in FIG. 86, the sixth row (6) of the mapping definition MD(N) is referred to in the subject data reflecting process (step S4504). The From_COLUMN "TABLE_D.NAME" of the mapping definition (6) can be reflected directly in the To_COLUMN "TABLE_N.FROM_NAME" that is the integration result information N (step S5201: YES depicted in FIG. 52). Hence, the cleansing process is executed at step S5203, and the result reflecting process is executed at step S5204.

In the cleansing process (step S5203), both From_COLUMN "TABLE_D.NAME" and To_COLUMN "TABLE_N.FROM_NAME" have the same data type of String (character string type) but have different CharCode type attributes, thus cleansing is carried out to convert the CharCode type attribute of the From-side into that of the To-side. Specifically, the cleansing process is executed to convert the type attribute "CharCode"=JEF of the name of the TABLE_D into the type attribute "CharCode"=S_JIS of the department of the TABLE_E.

Subsequently, in the result reflecting process (step S5204), because neither the From_COLUMN nor the To_COLUMN is an Mkey item, a type attribute conversion result ("SALES DEPARTMENT" in S_JIS code) is copied onto the To_COLUMN "TABLE_N.FROM_NAME" (step S5811). Subsequently, the procedure returns to the extraction result S (FIG. 83) to specify the next mapping definition (2) for the subject data "FROM=14100" (step S5207).

Figure 87:
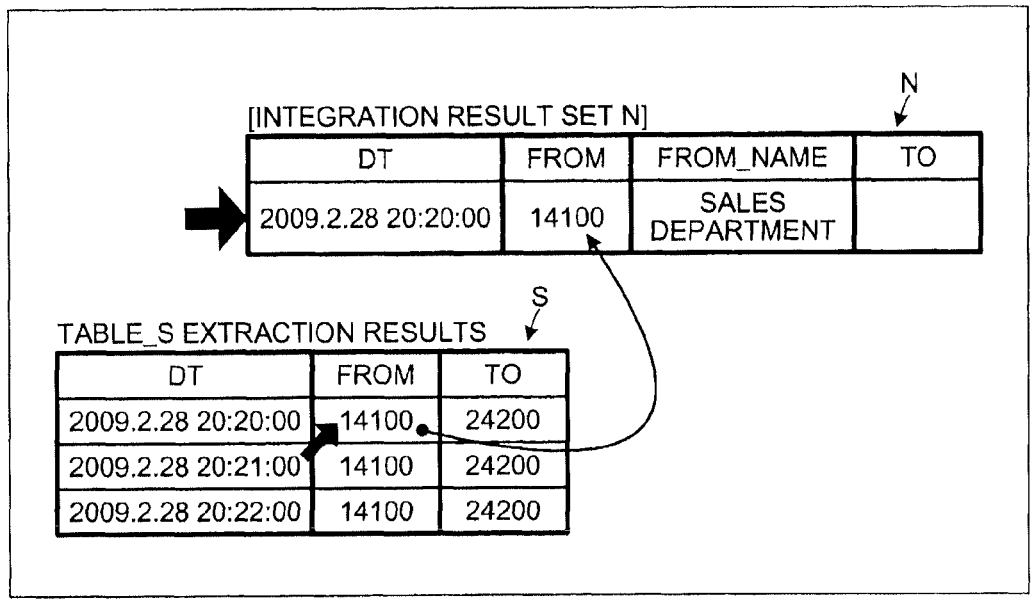
FIGS. 87 and 88 are diagrams of examples of the subject data reflecting process (step S4504) on the extraction result S for the TABLE_S.

FIG. 87 is a diagram of a first example of the subject data reflecting process (step S4504) on the extraction result S for the TABLE_S. As depicted in FIG. 87, the fourth row (2) of the mapping definition MD(N) is referred to in the subject data reflecting process (step S4504). The From_COLUMN "TABLE_S.FROM" of the mapping definition (2) can be reflected directly in the To_COLUMN "TABLE_N.FROM" (step S5201: YES depicted in FIG. 52). Hence, the cleansing process is executed at step S5203, and the result reflecting process is executed at step S5204. As a result, the value "14100" of "TABLE_S.FROM" is copied directly onto "TABLE_N.FROM".

Figure 88:
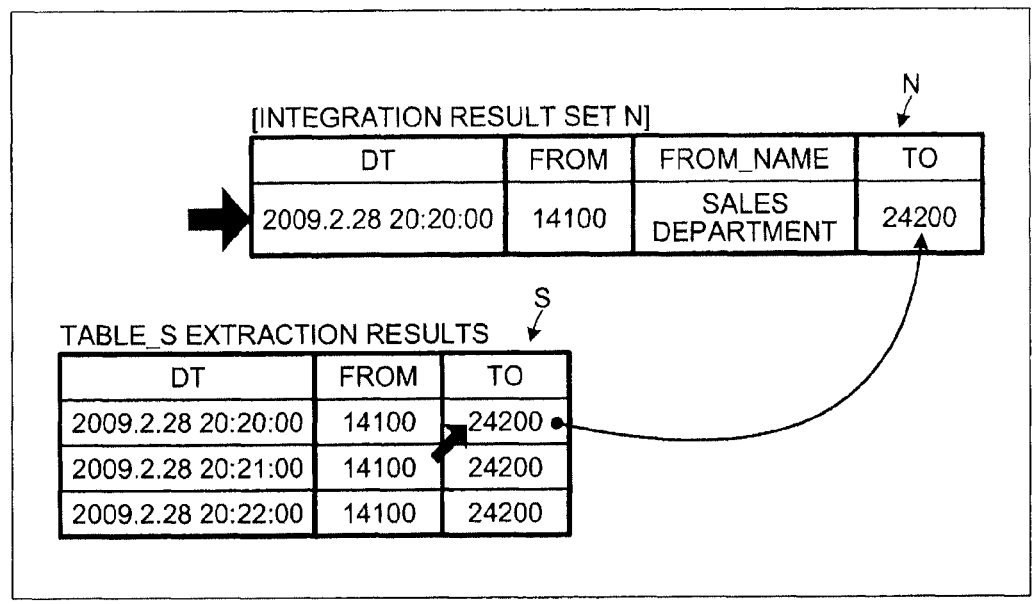

FIG. 88 is a diagram of a second example of the subject data reflecting process (step S4504) on the extraction result S for the TABLE_S. As depicted in FIG. 88, the fifth row (3) of the mapping definition MD(N) is referred to in the subject data reflecting process (step S4504). The From_COLUMN "TABLE_S.TO" of the mapping definition (3) can be reflected directly in the To_COLUMN "TABLE_N.TO" (step S5201: YES depicted in FIG. 52).

Hence, the cleansing process is executed at step S5203, and the result reflecting process is executed at step S5204. As a result, the value "24200" of "TABLE_S.TO" is copied directly onto "TABLE_N.TO" (step S5811). At this point, processing the first record of the extraction result S is finished. The second record and third record are also processed in the same manner.

Hence, the subject data reflecting process (step S4504) on the entire extraction result S has been completed, and an unprocessed input data is not present (step S4506: NO) nor is a mapping definition having an unsolved terminal column in the From_COLUMN. As a result, the PUSH-type information integration process (step S4105) is ended without execution of the PULL-type information integration process (step S4201).

FIG. 89 is a diagram of an integration result set N output as a stream integration result. If the logical model LN is allocated to a data stream, the integration result set N depicted in FIG. 89 is sent out to the data stream to which the logical model LN is allocated. If the logical model LN is allocated to physical data, such as a file and DB, the integration result set N is registered to the file or DB to which the logical model LN is allocated. PUSH-type information integration is executed in stream integration, but virtual integration of dynamically acquiring an intermediate table (TABLE_D, TABLE_T) for integration in PULL-type operation is also used in stream integration. Stream integration, therefore, may be referred to as mix-type information integration (see FIG. 4).

Figure 94:
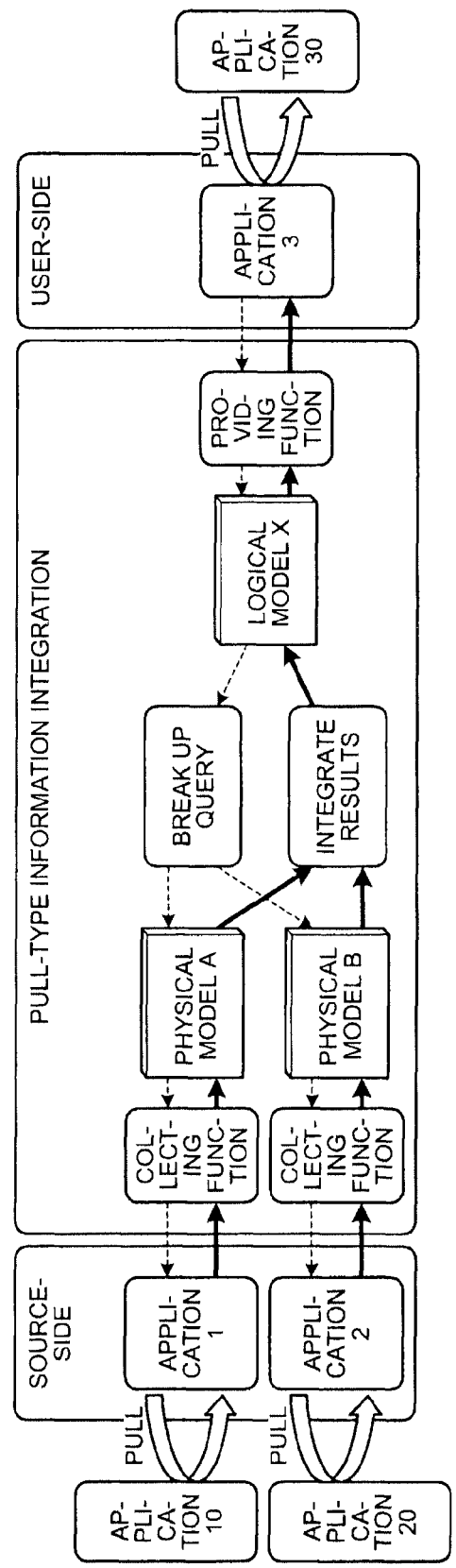
FIG. 94 is a diagram of use of an application program as the information source or as a user-side (PULL-type).

FIG. 94 is a diagram of use of an application program as the information source or as the user-side (PULL-type). FIG. 94 depicts an example of a PULL-type information integration method (FIG. 2) of using an application program as the information source or as the user-side.

The information source corresponding to the physical model A depicted in FIG. 94 is an application program (application 1), which is connected to another application program (application 10). The application 10 is a PULL-type information source application program of carrying out processing in response to an input query and outputting data corresponding to the input query as the result of processing. The application 1 is a program that interfaces between a collecting unit and the application 10.

When receiving a query to the physical model A, the collecting unit sends the query to the application 1, which converts the received query into a query to the application 10 as needed to send the converted query to the application 10.

The application 10 processes the received query, and returns the result of the processing to the application 1. The application 1 converts the process result received from the application 10 as needed to send the converted process result to the collecting unit, which then sends the process result as the result of the query to the physical model A, to the information integration engine. An application 2 and an application 20 corresponding to the physical model B also operate in the same manner.

This operation of the application 1 corresponds to allocation of the TABLE_1 of the RDB 1 depicted in FIG. 26 to the physical model PA (TABLE_A) in FIG. 11, as depicted in the third embodiment, which means the operation of the information source from the perspective of the information integration engine is equivalent to that of the third embodiment. Therefore, the information integration process is executed in the same manner as in the third embodiment.

In FIG. 94, the user-side corresponding to the logical model X is an application program (application 3), which is connected to another application program (application 30). The application 30 is the PULL-type user application program of issuing a query and receiving the result of processing the query. The application 3 is an application program that interfaces between a providing unit and the application 30.

When receiving a query issued by the application 30, the application 3 converts the query into a query to the logical model X as needed, and sends the converted query to the providing unit, which then inputs the query to the information integration engine. The information integration engine carries out the PULL-type information integration process with respect to the input query to the logical model X and sends an integration result on the query to the providing unit. The providing unit sends the received integration result to the application 3, which converts the integration result as needed to send the converted integration result to the application 30. The application 30 continues the process using the received integration result.

This operation of the application 3 corresponds to the application program of delivering the virtual integration instruction information depicted in FIG. 38 to the logical model LE (E) depicted in FIG. 11 and receiving the result of the virtual integration process, as depicted in the third embodiment, which means the operation of the user-side from the perspective of the information integration engine is equivalent to that of the third embodiment. Therefore, the information integration process is executed in the same manner as in the third embodiment.

Figure 95:
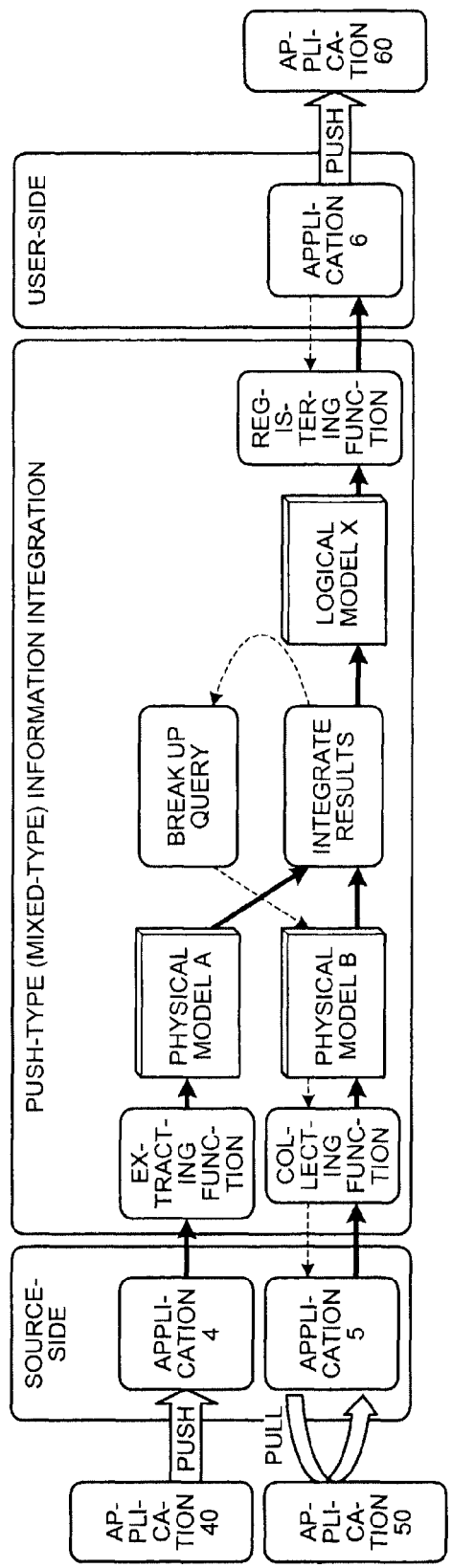
FIG. 95 is a diagram of an example of use of an application program as the information source or as the user-side (PUSH-type/mixed-type).

FIG. 95 is a diagram of an example of use of an application program as the information source or as the user-side (PULL-type/mixed-type). FIG. 95 depicts an example of a PULL-type and mixed-type information integration method (FIGS. 3 and 4) of using an application program as the information source or as the user-side. The information source corresponding to the physical model A depicted in FIG. 95 is an application program (application 4), which is connected to another application program (application 40). The application 40 is an information source application program of outputting an execution result to a preset output destination in PUSH-type operation. The application 4 is a program that interfaces between and extracting unit and the application 40.

When a process result to be sent to the application 4 arises, the application 40 sends the process result to the application 4. The application 4 converts the received process result from the application 40 as needed to send the converted process result to the extracting unit, which then inputs the process result as data for the physical model A to the information integration engine. An application 5 and an application 50 corresponding to the physical model B operate in the same manner as the application 2 and the application 20.

The operation of the application 4 corresponds to allocation of the CSV file "C:\Table-A.csv" depicted in FIG. 31 to the physical model PA (TABLE_A) depicted in FIG. 11, as described in the first embodiment. The operation of the application 5 corresponds to allocation of the TABLE_2 depicted in the RDB 2 depicted in FIG. 26 to the physical model PB (TABLE_B) depicted in FIG. 11, i.e., the operation of the information sources from the perspective of the information integration engine is equivalent to that of the first embodiment. Therefore, the information integration process is executed in the same manner as in the first embodiment.

In FIG. 95, the user-side corresponding to the logical model X is an application program (application 6), which is connected to another application program (application 60). The application 60 is the PUSH-type user application program of receiving an integration result from the application 6 in PUSH-type operation to carry out processing. The application 6 is an application program that interfaces between a registering unit and the application 60.

When the PULL-type or mixed-type information integration engine sends an integration result as the logical model X to the registering unit, the registering unit sends the received integration result to the application 6, which then converts the integration result as needed to send the converted integration result to the application 60. The application 60 carries out processing using the received integration result.

The operation of the application 6 corresponds to allocation of the CSV file "C:\Table-E.csv" depicted in FIG. 28 to the logical model LE (TABLE_E) depicted in FIG. 11, as described in the first embodiment, which means the operation of the user-side from the perspective of the information integration engine is equivalent to that of the first embodiment. Therefore, the information integration process is executed in the same manner as in the first embodiment.

The applications 1 to 6 depicted in FIGS. 94 and 95 may be provided as client applications corresponding to the applications 10 to 60. For applications in service-oriented architecture (SOA) for service coordination through XML-based communication, the applications 10, 20, and 3 serve as a "service provider" that carriers out retrieval service of returning a retrieval result in response to a query, while the applications 1, 2, and 30 serve as a "service requester" that makes a request to the service provider for retrieval service and receives the result of the request. The applications 4 and 40 and the applications 6 and 60 carry out PUSH-type service of delivering the result of a necessary process to the next process.

In this manner, providing the information source and the user-side as application programs allows use of the information integrating apparatus of the present embodiments as an adaptor for connecting an application coordinating unit, information, and an information system to another application program.

As described above, according to the embodiments, the single integration engine 101 is capable of realizing three types of integration processes including physical integration, virtual integration, and stream integration, using common meta-information that is definition-based without integration process logic description. This enables flexible realization of the property of the information source, an information integration method optimal for an integration object of the user-side, or a combination thereof. The meta-information is allocated to an entity using pre-setting information, thereby improving the independency of the meta-information and facilitating information integration on various entities and applications.

An integration process as a mixture of physical integration, virtual integration, and stream integration is further realized. For example, in a case of using virtual integration in stream integration, stream integration is carried out on data of a transmission origin (FROM), a transmission destination (TO), and a date (DT) streaming through a phone line, and the name of the transmission origin (FROM_NAME) is added by virtual integration, thereby enabling display of the name of the transmission origin on a telephone.

Information correlating a phone number with a name used in stream integration is integrated by virtual integration by directly using master information of a system on operation. In this case, even if an organizational change occurs on the system, the organizational change is automatically reflected on streaming data. Allocating output from stream integration to actual data in the form of an XML file, DB, etc., enables saving a transmission/reception record.

In a case of using virtual integration in physical integration, information subjected to changes on a need-basis, such as an organization chart, is often required even in physical integration of employee information. Although conventionally, physical integration is carried out by collecting necessary information in advance and inputting the collected information according to a conventional technique, according to the present embodiments, the integration process of using the latest information excluding data to be processed is realized through virtual integration. This ensures the recency of information and prevents errors. For example, the latest department information can be used when an employee list is made. It is, therefore, possible to make the best use of the advantages of virtual integration in which double management is unnecessary.

The information integrating method described in the present embodiments may be implemented by executing a prepared program on a computer such as a personal computer and a workstation. The program is stored on a non-transient computer-readable recording medium such as a hard disk, a flexible disk, a CD-ROM, an MO, and a DVD, read out from the recording medium, and executed by the computer. The program may be a transmission medium that can be distributed through a network such as the Internet.

The embodiments effect improved convenience in the integration of information through a reduction in development/operation burden and cost, more efficient information integration, and expanded use of information integration.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information integrating apparatus, comprising:
   a memory; and
   a processor coupled to the memory and configured to execute a process including:

storing, into the memory, meta-definitions that include physical models, logical models, and a mapping definition, the physical models being data models on an information source side, the logical models being data models on a user-side that uses integrated information, the mapping definition indicating corresponding relations between the physical models and the logical models;

executing a first integration process that integrates information from the physical models and information from the logical models by referring to the mapping definition;

executing a second integration process that includes a breaking up process and a collection process, the breaking up process breaking up a query for the logical models into a query for the physical models by referring to the mapping definition and the collection process collecting retrieved information by the query for the physical models;

detecting a first instruction from the information source side or a second instruction from the user side, the first instruction being an instruction to integrate, by the first integration process, information from the physical models, and the information from the logical models, into a first integration result, the second instruction being an instruction to integrate, by the second integration process, the information from the physical models and the information from the logical models into a second integration result;

controlling the first integration process, when the detecting detects the first instruction or the second integration process when the detecting detects the second instruction;

outputting to the user-side, the first integration result when the detecting detects the first instruction, or the second integration result when the detecting detects the second instruction, wherein the processor is configured so that the controlling, when an unsolved mapping definition is present in the first integration result, further generates a third integration result by referring to the unsolved mapping definition, the physical models and the logical models, controls the breaking up process, the collection process and the first integration process and the second integration process, and executes the breaking up process on a query for the logical models on the user-side, the collection process with respect to information other than the query that is for the physical models and obtained by the breaking up process, and the first integration process and the second integration process on the information from the physical model collected by the collection process, and the outputting further outputs to the user-side, the first integration result and the third integration result, when an unsolved mapping definition is present in the first integration result.

2. The information integrating apparatus according to claim 1, further including extracting information to be integrated from an information group stored in the information sources, wherein the first integration process, by referring to the mapping definition, integrates the information from the physical models extracted by the extracting and the information from the logical models, and the outputting further registers to a given database on the user-side, the first integration result or the second integration result obtained by the detecting.

3. The information integrating apparatus according to claim 1, wherein the storing further stores pre-setting information allocating the physical models to information in the information sources, and the executing the first integration process integrates the information allocated to the physical models by the pre-setting information and the information from the logical models.

4. The information integrating apparatus according to claim 3, wherein the pre-setting information includes additional information, when a given attribute has names that differ in the physical models and in the information in the information source, the additional information indicating that the names represent the given attribute, and the executing the first integration process, based on the additional information, executes the first integration process integrating the information allocated to the physical model and the information from the logical model.

5. The information integrating apparatus according to claim 2, wherein the storing further stores pre-setting information allocating the logical models to a given database, and the outputting further records to the given database allocated to the logical model by the pre-setting information.

6. The information integrating apparatus according to claim 5, wherein the pre-setting information includes additional information, when a given attribute has names that differ in the physical models and in the information in the information source, the additional information indicating that the names represent the given attribute, and the executing the first integration process, based on the additional information, records to an attribute in the given database allocated to the logical model.

7. The information integrating apparatus according to claim 2, wherein the storing further stores pre-setting information allocating the physical models to information in the information sources and allocating an extraction condition for the extracting, and the extracting, according to the extracting condition of the pre-setting information, further extracts information to be integrated, from an information group stored in the information sources.

8. The information integrating apparatus according to claim 1, wherein the storing further stores pre-setting information allocating the physical models to a data stream in the information sources, and the acquiring, based on the pre-setting information, further acquires information to be integrated, from the data stream allocated to the physical models.

9. The information integrating apparatus according to claim 8, wherein the storing further stores pre-setting information allocating the logical models to a data stream on the user-side, and the outputting, based on the pre-setting information, further sends out to the data stream on the user-side, the first integration result or the second integration result obtained by the detecting.

10. The information integrating apparatus according to claim 1, wherein the physical models and the logical models have a type attribute indicating, for an item, data type and value, further comprising:

converting, when on an input side and on an output side, the data type or the type attribute of the mapping definition is different, a value input as the data type on the input side to the data type on the output side and outputs the converted value, or converts the value input as the type attribute on the input side to the type attribute on the output side and outputs the converted value, wherein the first integration process is executed with respect to the value of the item converted from the input value of the item in the physical models to the value of the item on the output side by the converting, and the executing the second integration process is performed on a query that is for the item in the physical models converted by the converting from an input query for an item in the logical models.

11. The information integration apparatus according to claim 1, wherein the physical models and the logical models are table structure data models, and the query is an SQL statement.

12. The information integration apparatus according to claim 1, wherein the physical models and the logical models are tree-structure data models, and the query is an XQuery statement.

13. The information integrating apparatus according to claim 1, further comprising acquiring the information to be integrated from a data stream, among data streams in the information sources, wherein the first integrating process, by referring to the mapping definition, integrates the information from the physical models acquired by the acquiring and the information from the logical models, and the outputting further sends out to a data stream on the user-side, the first integration result or the second integration result obtained by the detecting.

14. An information integrating method of a computer having access to a storage unit storing meta-definitions that include physical models, logical models, and a mapping definition, the physical models being data models on an information source side, the logical models being data models on a user-side that use integrated information, the mapping definition indicating corresponding relations between the physical models and the logical models, the method comprising:

executing a first integration process that includes integrating information from the physical models and information from the logical models by referring to the mapping definition;

executing a second integration process that includes breaking up a query for the logical models into a query for the physical models by referring to the mapping definition, and collecting information retrieved by the query for the physical models;

detecting a first instruction or a second instruction, the first process instruction being an instruction to integrate, by the first integration, information from the physical models and information from the logical models into a first integration result the second instruction being on instruction to integrate, by the second integration process, the information from the physical models and the information from the logical models into a second integration result;

controlling the integrating, when the first instruction is detected at the detecting or when the second instruction is detected at the detecting;

outputting to the user-side, the first integration result when the first instruction is detected at the detecting, or the second integration result when the second instruction is detected at the detecting, and wherein the computer is configured so that the controlling, when an unsolved mapping definition is present in the first integration result, further generates a third integration result by referring to the unsolved mapping definition, the physical models and the logical models, controls the breaking up process, the collection process and the first integration process and the second integration process, and executes the breaking up process on a query for the logical models on the user-side, the collection process with respect to information other than the query that is for the physical models and obtained by the breaking up process, and the first integration process and the second integration process on the information from the physical model collected by the collection process, and the outputting further outputs to the user-side, the first integration result and the third integration result, when an unsolved mapping definition is present in the first integration result.

15. A non-transient, computer-readable recording medium storing therein an information integrating program that causes a computer having access to a storage unit storing meta-definitions that include physical models, logical models, and a mapping definition, the physical models being data models on an information source side, the logical models being data models on a user-side that use integrated information, the mapping definition indicating corresponding relations between the physical models and the logical models, to execute:

executing a first integration process that includes integrating information from the physical models and information from the logical models;

executing a second integration process that includes breaking up a query for the logical models into a query for the physical models by referring to the mapping definition, and collecting information retrieved by the query for the physical models;

detecting a first instruction or a second instruction, the first instruction being an instruction to integrate, by the first integration process, information from the physical models and information from the logical models, into a first integration result, to integrate, by the second integration process, the information from the physical models and the information from the logical models, into a second integration result;

controlling the integrating, when the first instruction is detected at the detecting or when the second instruction is detected at the detecting;

outputting to the user-side, the first integration result when the first instruction is detected at the detecting, or the second integration result when the second instruction is detected at the detecting, and wherein the computer is configured so that the controlling, when an unsolved mapping definition is present in the first integration result, further generates a third integration result by referring to the unsolved mapping definition, the physical models and the logical models, controls the breaking up process, the collection process and the first integration process and the second integration process, and executes the breaking up process on a query for the logical models on the user-side, the collection process with respect to information other than the query that is for the physical models and obtained by the breaking up process, and the first integration process and the second integration process on the information from the physical model collected by the collection process, and the outputting further outputs to the user-side, the first integration result and the third integration result, when an unsolved mapping definition is present in the first integration result.

* * * * *